United States Patent
Takashima et al.

(10) Patent No.: US 6,563,794 B1
(45) Date of Patent: May 13, 2003

(54) BOUNDARY DEVICE FOR PERFORMING A CONNECTION CONTROL AT A BOUNDARY BETWEEN TWO COMMUNICATIONS NETWORKS

(75) Inventors: Kenya Takashima, Kanagawa (JP); Koji Nakamichi, Kanagawa (JP), jpx; Naotoshi Watanabe, Kanagawa (JP); Toshio Soumiya, Kanagawa (JP); Yutaka Ezaki, Kanagawa (JP); Kazunori Murata, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/379,833

(22) Filed: Aug. 24, 1999

(30) Foreign Application Priority Data

Aug. 28, 1998 (JP) ............................. 10-244155

(51) Int. Cl.[7] .............................................. H04L 12/66
(52) U.S. Cl. ....................... 370/236; 370/401; 370/466
(58) Field of Search .............................. 370/236, 236.1, 370/353, 354, 355, 356, 401, 466; 709/243, 249

(56) References Cited

U.S. PATENT DOCUMENTS

| | | | | |
|---|---|---|---|---|
| 5,490,141 A | * | 2/1996 | Lai et al. ..................... | 370/352 |
| 5,835,710 A | * | 11/1998 | Nagami et al. .............. | 370/351 |
| 5,892,924 A | * | 4/1999 | Lyon et al. .................. | 370/405 |
| 5,903,559 A | * | 5/1999 | Acharya et al. ............. | 370/254 |
| 6,021,263 A | * | 2/2000 | Kujoory et al. ............. | 370/409 |
| 6,188,689 B1 | * | 2/2001 | Katsube et al. ............. | 370/252 |
| 6,208,653 B1 | * | 3/2001 | Ogawa et al. .............. | 370/229 |
| 6,343,326 B2 | * | 1/2002 | Acharya et al. ............ | 709/238 |
| 6,356,546 B1 | * | 3/2002 | Beshai ....................... | 370/358 |

FOREIGN PATENT DOCUMENTS

| | | |
|---|---|---|
| JP | 9-214504 | 8/1997 |
| JP | 9-238143 | 9/1997 |

* cited by examiner

*Primary Examiner*—Hassan Kizou
*Assistant Examiner*—Dmitry Levitan
(74) *Attorney, Agent, or Firm*—Katten Muchin Zavis Rosenman

(57) ABSTRACT

Control messages for securing a communication quality are exchanged via a dedicated connection within an ATM network when a sending terminal in an IP network delivers data to a receiving terminal in another IP network via the ATM network. A resource reservation message sent from the receiving terminal is parsed by a boundary device located at the boundary between the IP and the ATM network, and a data transfer connection is established within the ATM network based on the information of the resource reservation message.

40 Claims, 64 Drawing Sheets

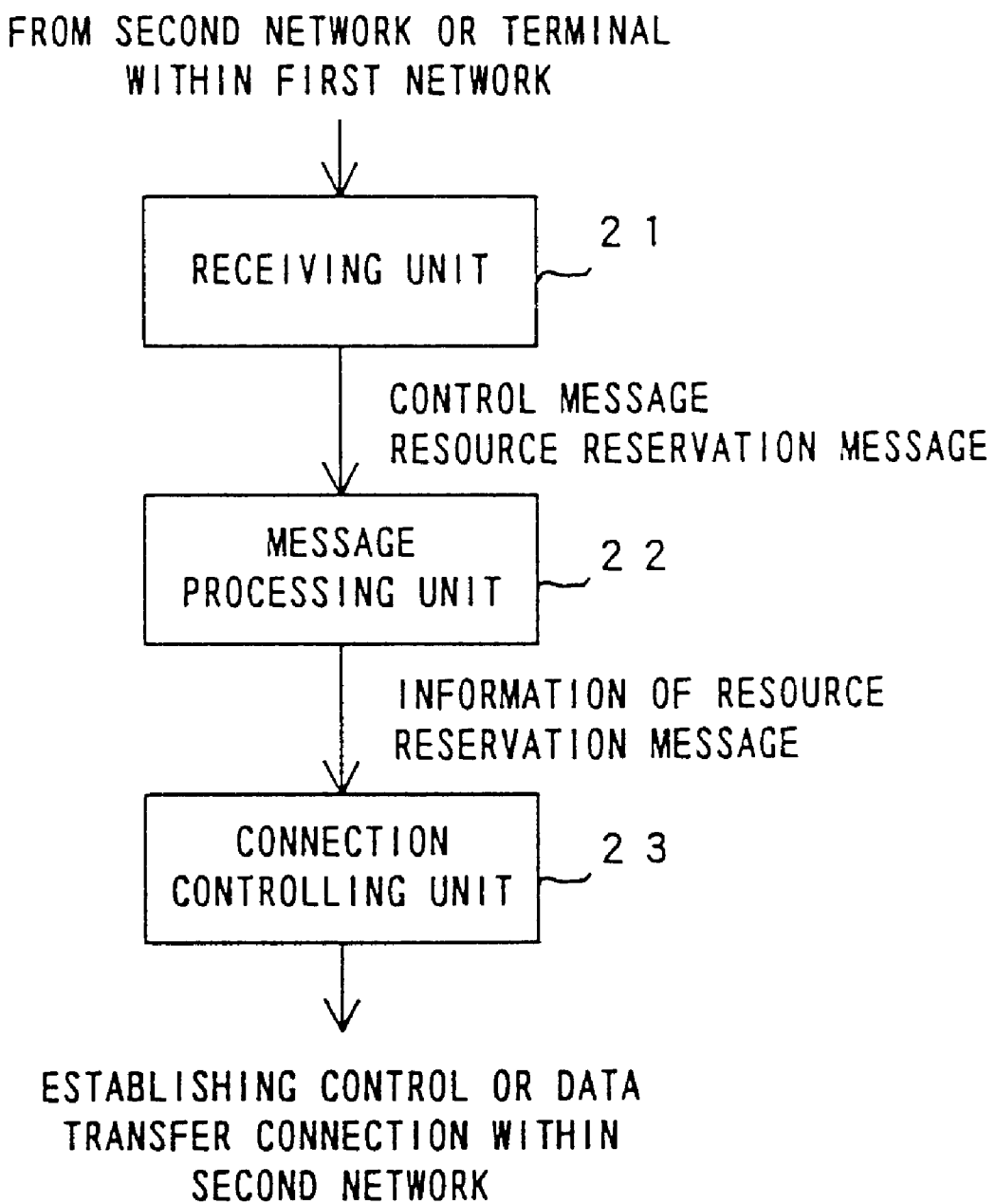
F I G. 2A

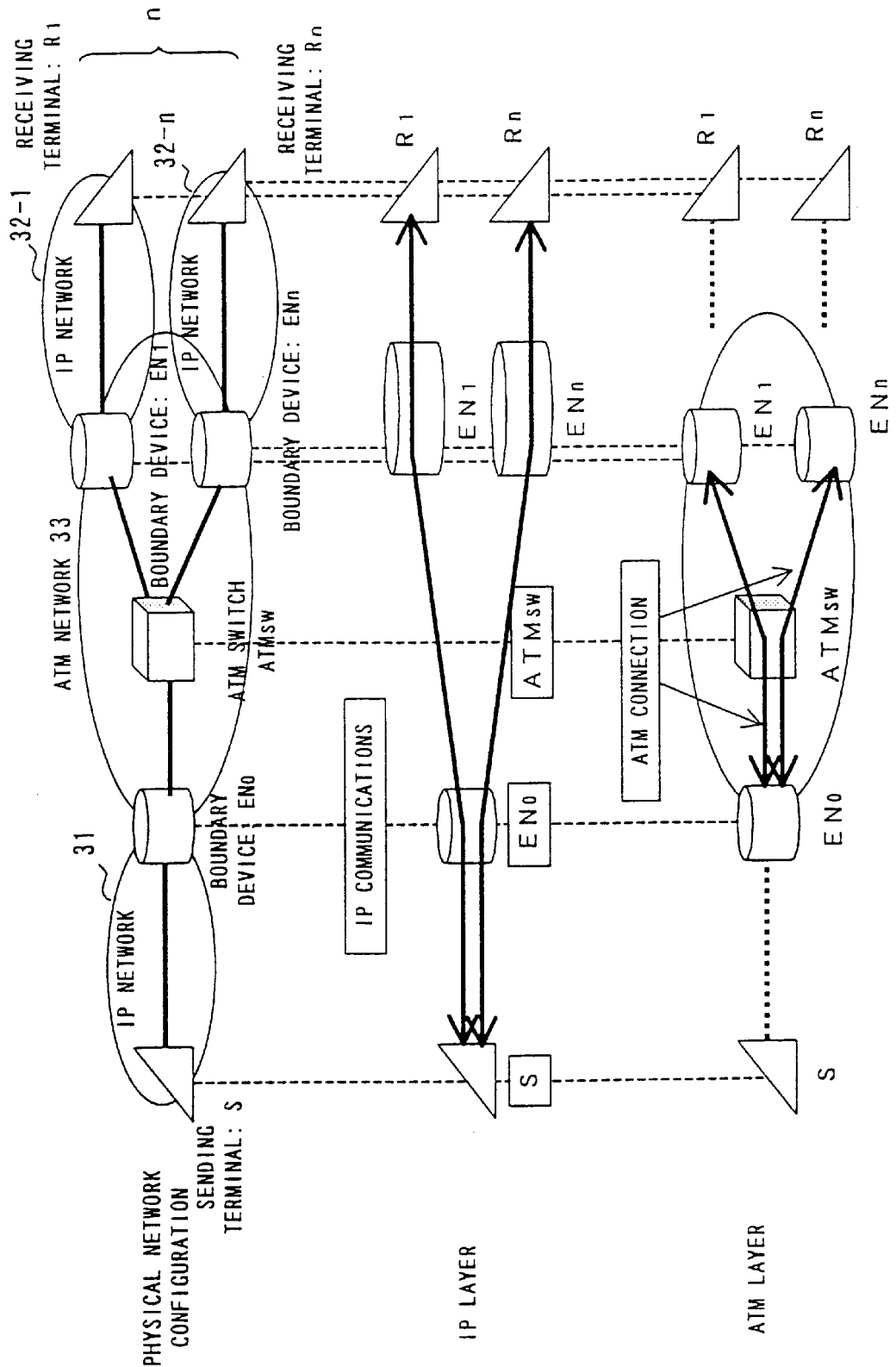
F I G. 3

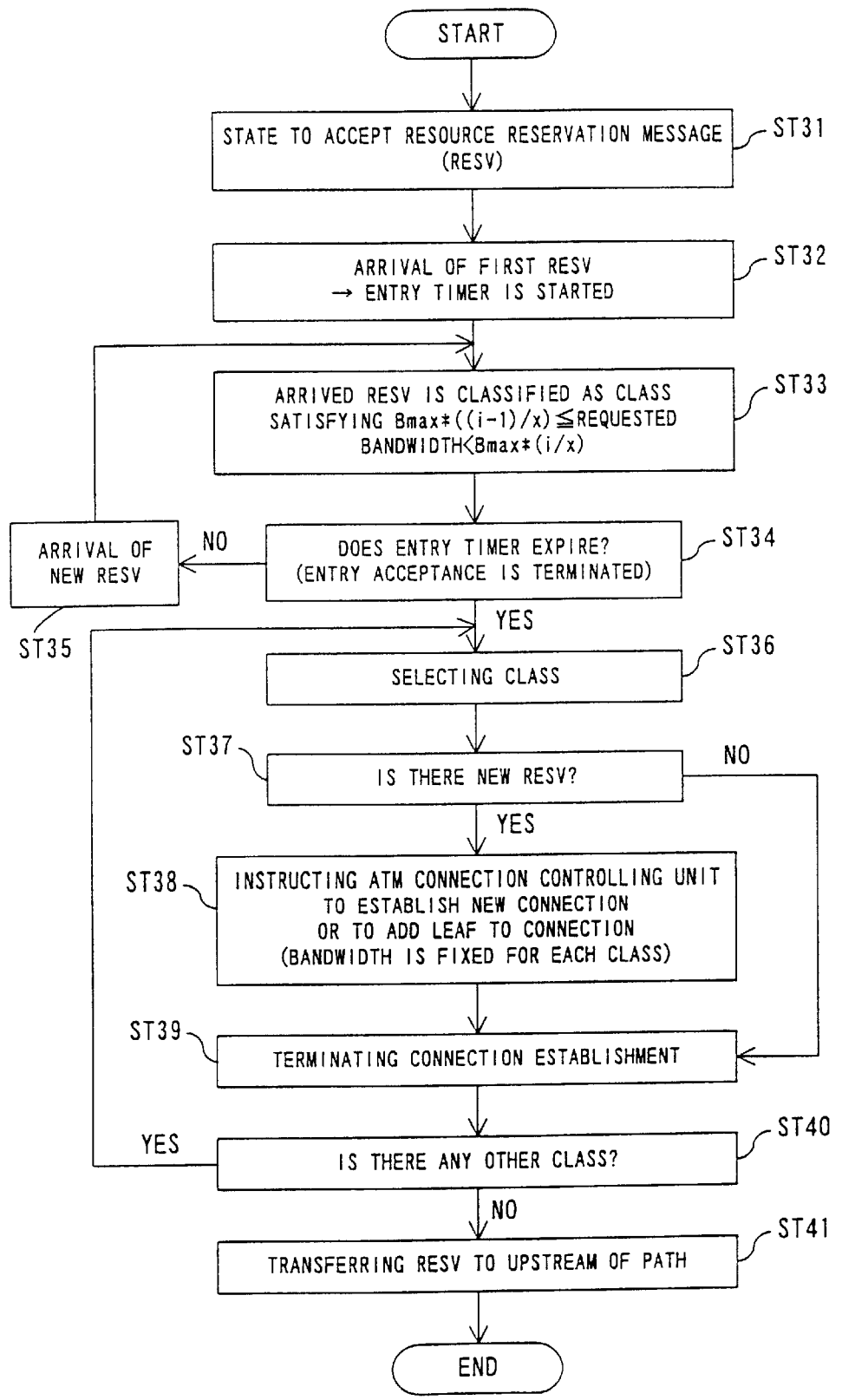
F I G. 2 5

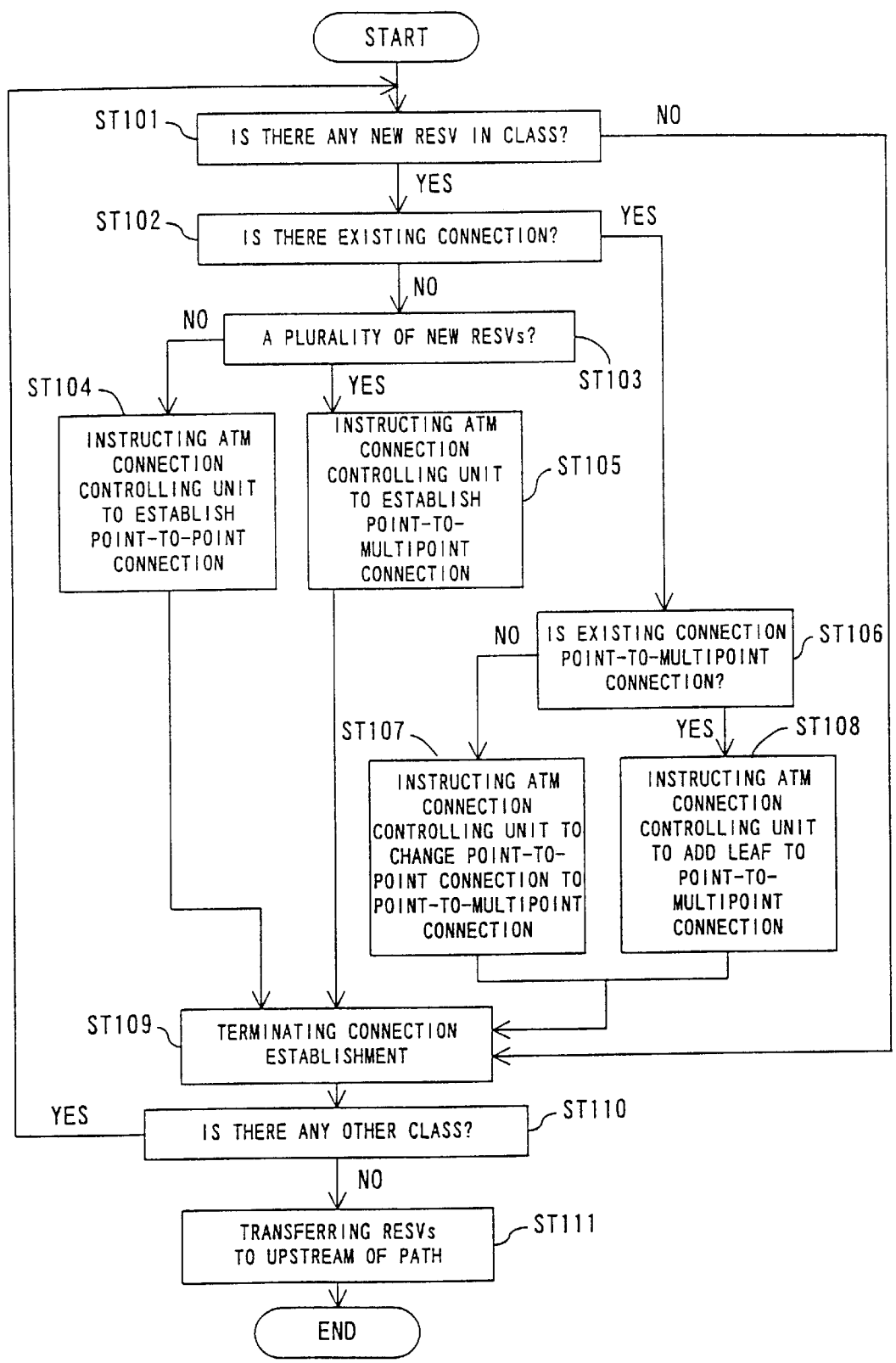
F I G. 3 3

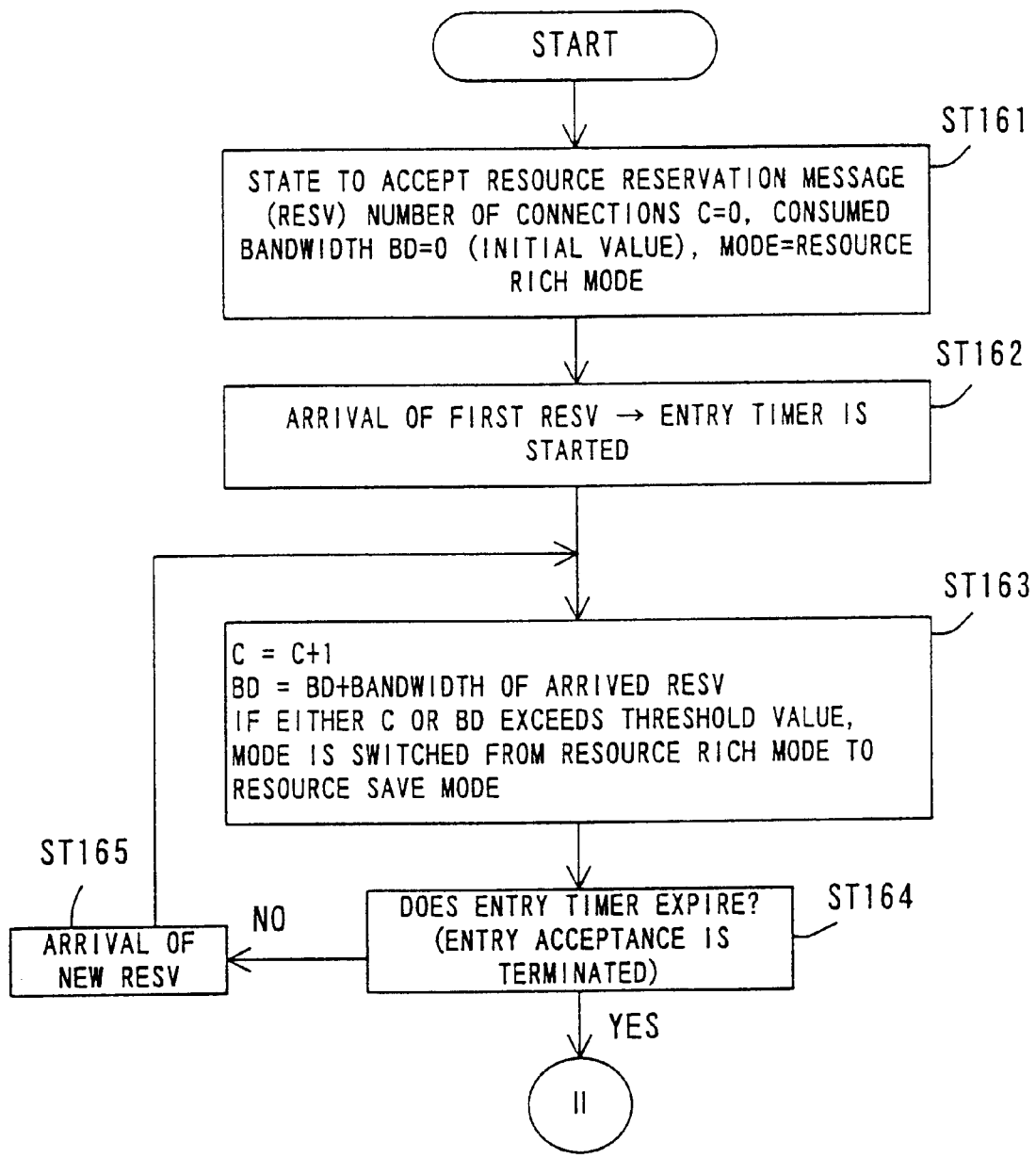
F I G. 4 4

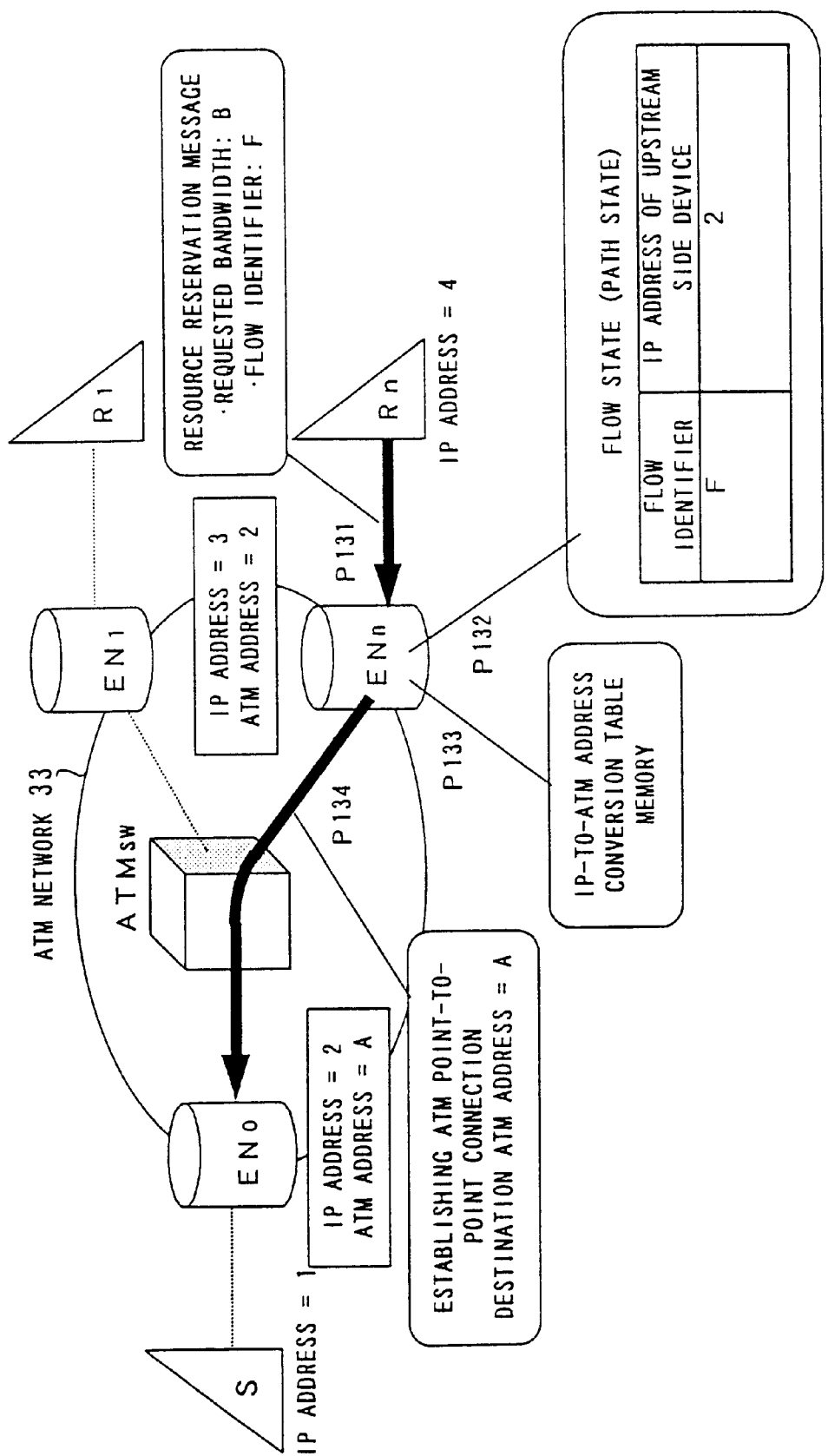
F I G. 47

| IP ADDRESS OF BOUNDARY DEVICE | ATM ADDRESS OF BOUNDARY DEVICE |
|---|---|
| 2 | A |
| 3 | 2 |
|  |  |
| ┆ | ┆ |
|  |  |

FIG. 48

| RSVP FLOW IDENTIFIER | VPI/VCI |
|---|---|
| F | 11/12 |
| | |
| | |
| ┊ | ┊ |
| | |

FIG. 50

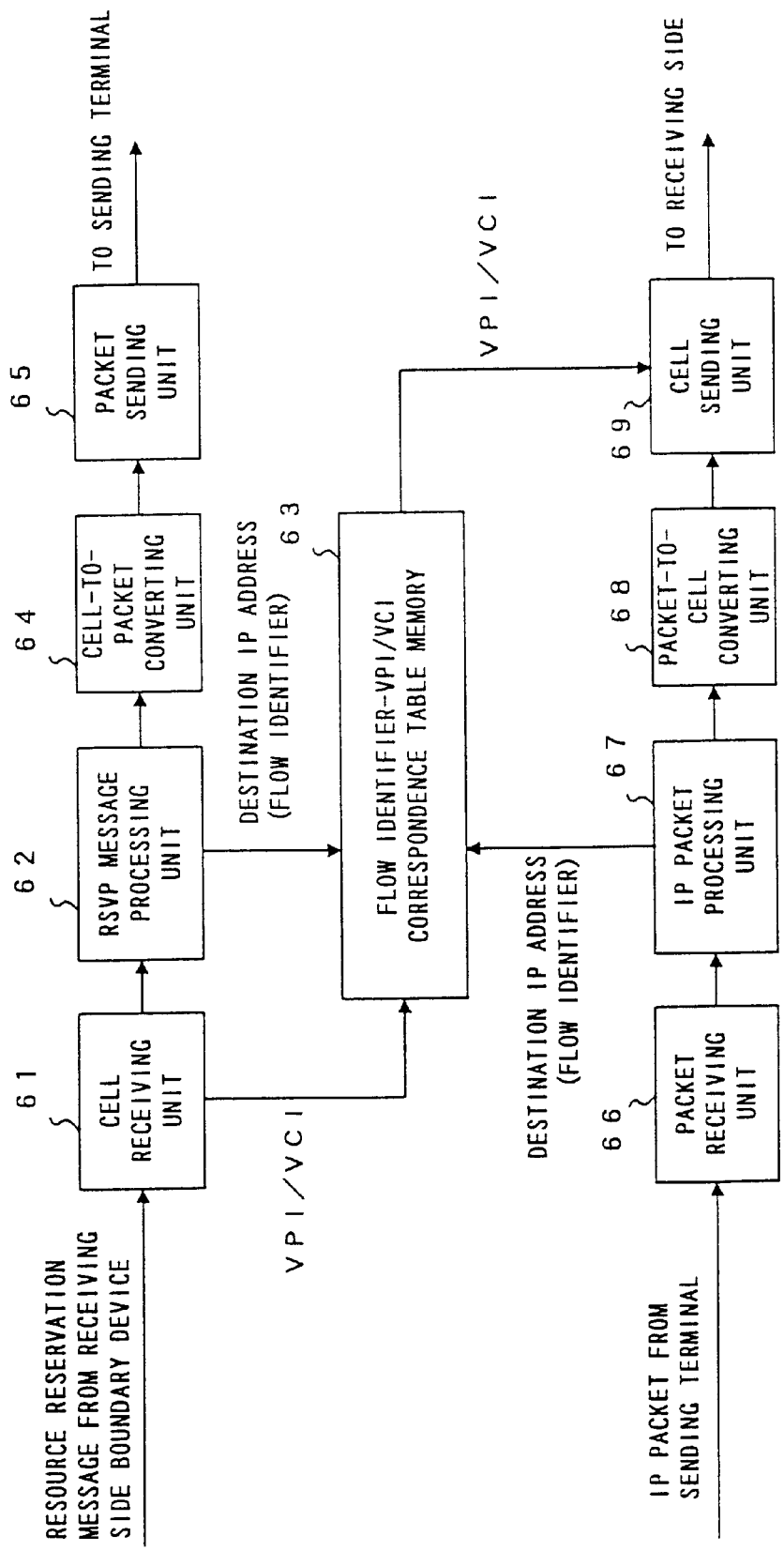
F I G. 53

| RSVP FLOW IDENTIFIER | ATM ADDRESS + ATM CONNECTION REFERENCE IDENTIFIER |
|---|---|
| F | 2 + C R 1 |
|  |  |
|  |  |
| ⋮ | ⋮ |
|  |  |

F I G.  5 5

| RSVP FLOW IDENTIFIER | LIJ CALL IDENTIFIER |
|---|---|
| F | 13 |
|  |  |
|  |  |
| ¦ | ¦ |
|  |  |

FIG. 60

BOUNDARY DEVICE FOR PERFORMING A CONNECTION CONTROL AT A BOUNDARY BETWEEN TWO COMMUNICATIONS NETWORKS

BACKGROUND OF THE INVENTION

1. Field of the Invention

The present invention relates to a boundary device for mapping a resource reservation protocol intended to perform a communication quality control in an Internet Protocol (IP) network within a network configuration where an Asynchronous Transfer Mode (ATM) network exists between a sending terminal in one IP network and a receiving terminal in another IP network, and a method thereof.

2. Description of the Related Art

In recent years, the Internet being a communications network among computers has been making rapid progress with an increasing number of IP applications. Especially, the Internet has been advancing as a communications tool which is easier to use and realizes strong feelings of presence with the superposition of video and voice data and use of hyperlinks, which are realized by the WWW (World Wide Web).

Fundamentally, each node independently determines the route of an IP packet referred to as a datagram not by establishing a connection, but by making an end-to-end negotiation in an IP network. In a communications network performing such connectionless communications, data packets are normally routed and transferred for each hop (hop-to-hop transfer).

However, with the progress of the Internet, a network delay problem becomes more and more serious. One reason may be that a transfer means or a technique cannot catch up with an increase in network traffic. The principal cause, however, is the fact that the Internet is on the basis of a best-effort transfer.

Under a best-effort transfer environment where IP packets are transferred with the best effort, a repeater station at which packets arrive does not makes a distinction between the packets depending on users or applications, and only makes an effort to transfer the arrived packets to the next stage. Packets which cannot be transferred and overflow from a buffer are discarded.

Packet discarding is detected by a TCP (Transmission Control Protocol) higher than an IP layer at an end station, and is prevented by a retransmission procedure. However, there are problems in that packets not required for retransmission stay in a network, and that a transfer delay is not guaranteed for a real-time application.

To overcome such problems, a method for implementing the QOS (Quality Of Service) on the Internet was discussed in the IETF (Internet Engineering Task Force). A QOS control technique in an IP layer, which is based on the Version 1 of an RSVP (Resource Reservation Protocol), was standardized, and its implementation method has been studied up to now.

The RSVP is a control protocol for making a resource reservation in an IP layer, and performs the control shown in FIG. 1A. Under this control, control messages are exchanged between routers 2 supporting the RSVP in an IP network 1, an information sender (sending terminal) 3, and a receiver (receiving terminal) 4. With the exchange of the control messages, memory resources, etc. on a transmission line or within a router are reserved beforehand for an application of the sender 3, and its communication quality (QOS) is guaranteed. Normally, the sender 3 can provide the same information to a plurality of receivers 4 with a one-to-multiple communication. First of all, the sender 3 sends to the receiver 4 a Path message describing the traffic characteristic of information (contents) to be sent. The Path message is transferred along a transfer route (via routers), and distributed to each receiver 4.

The receiver 4 returns to the sender 3 a resource reservation message (Reserve message) describing a resource for which a reservation is required by referencing the contents described in the Path message. An intermediate router 2 merges reservation requests from a plurality of receivers 4, transfers the merged request to an upstream router 2 or the sender 3, and reserves transmission lines or memory resources for the plurality of receivers 4.

Next, the outline of a resource reservation mechanism using the RSVP is explained. The following explanation is based on the "RSVP (Resource ReSerVation Protocol)—Version 1 Functional Specification" of the RFC (Request for Comments) 2205.

With the RSVP, a data flow for a particular destination and a transport layer protocol is defined as a session. A destination in a certain session is normally defined by "DestAddress". This corresponds to an IP destination address of a data packet.

The procedure for making a resource reservation is composed of the following steps (1) through (4). Here, all of a sending terminal (sending side host), a receiving terminal (receiving side host), and nodes (routers) on a path are assumed to comprise the RSVP.

(1) Session establishment: a route between a sending and a receiving terminal is established by some routing protocol or other. Additionally, the receiving terminal joins a multicast group stipulated by the "DestAddress" according to an IGMP (Internet Group Multicast Protocol), etc.

(2) Path message transmission: a sending terminal periodically sends a Path message to a route established by a routing protocol (that is, to each DestAddress). The Path message describes the IP address of a sender, the information about the data such as a traffic characteristic, etc., which are sent by the sending terminal, and the IP address of a previous hop.

Each of the nodes on the path stores as a path state the information about the sending terminal and its session based on the information included in the Path message. Upon receipt of the Path message, each of the nodes updates its path state according to the contents of the Path message, and transfers the Path message to the next hop (node). Eventually, the Path message reaches all of receiving terminals.

(3) Resv message transmission: each of the receiving terminals sends a Resv message to the sending terminal. The Resv message is sent to a previous IP address (on an upstream side) stored in the path state of each of the nodes. This Resv message describes the QOS information requested by a receiving terminal, the information about a bandwidth reservation format, or the IP address of the destination node to which the Resv message is sent (that is, the previous IP address), etc.

(4) Process performed by each of the nodes receiving the Resv message: an RSVP controlling unit within each of the nodes, which has received the Resv message, makes a bandwidth reservation. The RSVP controlling unit stores reservation information as a reservation state based on the QOS information, the information about the bandwidth reservation format, etc. within the Resv message.

Additionally, the RSVP controlling unit considers (merges) the reservation states obtained from respective routes, and finally stores the information for reserving a bandwidth as a traffic control state.

The RSVP controlling unit requests a traffic controlling unit within each of the nodes to reserve a bandwidth based on the information of the traffic control state. The traffic controlling unit comprises an admission controlling unit, which determines whether or not the requested QOS can be admitted. If this QOS can be admitted, a bandwidth is secured according to the contents of the reservation request. At this time, the Resv message is sent to the previous IP address stored in the path state of the corresponding node. If the QOS cannot be admitted, the Resv message is discarded and an error message is sent to the receiving terminal.

As a communications network having a form different from that of an IP network which performs such a communication quality control, an ATM network exists. The ATM is a transfer technique that is formed into specification by the ITU-T (International Telecommunication Union-Telecommunication Standardization Sector), etc. as a solution to a future broadband ISDN (Integrated Services Digital Network).

Originally, the ATM was intended to perform an efficient transfer and cost-effective network management regardless of media types by uniformly handling all services with short cells of fixed-length packets (of 53 bytes) and by transferring the cells. Thereafter, attempts are made to apply the ATM to an ATM LAN (Local Area Network), etc. by taking full advantage of its robust QOS control technique, and to apply to a service requiring high real-time performance, such as a video transfer, etc.

The ATM is on the basis of a connection-oriented communication, which is made after a virtual connection is pre-established with a VP (Virtual Path) or a VC (Virtual Channel) in a network composed of terminals and an ATM switch (exchange). The VP/VC is identified by a VPI (Virtual Path Identifier)/VCI (Virtual Channel Identifier), which is assigned to a header of an ATM cell. These identifiers are also referred to as ATM connection identifiers.

As a method for setting a VP/VC, a PVP/PVC (Permanent VP/Permanent VC), which is semi-permanently set by a management system (OPS), etc., and an SVP/SVC (Switched VP/Switched VC) set by a signaling procedure when an application demands exist. When a VP/VC is set, a user secures the VP/VC by declaring a bandwidth and a quality class, which are required for a communication.

With the procedure for establishing/releasing an SVP/SVC, a call is established/released by exchanging signaling messages stipulated by the ITU-T Q.2900 series.

FIG. 1B shows the procedure for establishing such a connection. In this figure, ATM switches (ATM SWs) 12 are arranged within an ATM network 11, and data are transferred between a sending terminal 13 and a receiving terminal 14.

When a call is established, a Setup message is sent from the sending terminal 13, and negotiations are made between the sending terminal 13, the ATM switches 12, and the receiving terminal 14. When a Connect message sent from the receiving terminal 14 reaches the sending terminal 13, a channel (connection) for user data is established.

Additionally, in the ATM, a message from one sender (Root) can be distributed by switches to a plurality of receivers (leaves) with a point-to-multipoint call establishing procedure as shown in FIG. 1C. In this case, setup messages (SETUP #1 and SETUP #2) are sent from a sender 15 to an initial receiver 18 via a switch 16, so that a call is established between the sender 15 and the receiver 18. Then, the next receiver 19 is added by an Add party message (ADD PARTY).

At this time, the switch 16 sends Setup messages (SETUP #3 and SETUP #4) to a receiver 19 via a switch 17 upon receipt of the message ADD PARTY from the sender 15. On receiving a Connect message (CONNECT) from the receiver 19, the switch 16 returns an Add party ack. message (ADD PARTY ACK.) to the sender 15. In this way, the receiver 19 is added as a party to the connection established between the sender 15 and the receiver 18.

Similarly, the sender 15 sends another Add party message, so that the third receiver 20 is added to the above described connection. Also fourth and subsequent receivers can be added with a similar procedure. Also the procedure for establishing a point-to-multipoint call, which is initiated by a receiver, is stipulated by the ATM Forum in addition to the above described procedure.

However, the following problems may arise when IP packets are transferred in the ATM by connecting the above described conventional IP and ATM networks.

An ATM transfer of IP packets itself is frequently made in a WAN (Wide Area Network), etc. In this case, a boundary device having both IP and ATM communications capabilities is arranged at a boundary between an IP and an ATM network. In this case, however, an IP packet transfer within the ATM network is a best-effort transfer using a connection of a point-to-point call (point-to-point connection), and a communication quality guarantee capability possessed by the ATM network is not effectively utilized.

With the advent of the RSVP being a signaling protocol within an IP network, it becomes possible to guarantee the quality within the IP network. However, a method for applying the RSVP to an ATM network has not been settled yet. Therefore, quality guarantee using the RSVP cannot be currently implemented between users within an IP network via an ATM network.

Additionally, to realize a QOS guarantee service on the Internet, an integrated service is currently being standardized by the IETF. Only proposal made as a signaling protocol for this service is the RSVP.

SUMMARY OF THE INVENTION

An object of the present invention is to provide a boundary device for mapping a communication quality control protocol such as an RSVP in an IP communication to an ATM communication, and a method thereof.

A boundary device according to the present invention comprises a receiving unit, a message processing unit, and a connection controlling unit. This device is intended to control a communication at a boundary between a first network that routes and transfers data packets in units of hops, and a second network that transfers data cells based on an established connection.

In a first aspect of the present invention, the message processing unit performs a communication quality control by processing control messages of a communication quality control protocol in the first network. The connection controlling unit establishes a control connection for transferring the control messages within the second network.

In a second aspect of the present invention, the receiving unit receives a resource reservation message of a communication quality control protocol in the first network via the second network. The message processing unit parses the resource reservation message. The connection controlling unit establishes a data transfer connection within the second network based on the information of the resource reservation message.

In a third aspect of the present invention, the receiving unit receives from a terminal within the first network a resource reservation message of a communication quality control protocol in the first network. The message processing unit parses the resource reservation message. The connection controlling unit establishes a data transfer connection within the second network based on the information of the resource reservation message.

Additionally, the present invention provides also a communication controlling method in a network including a first and a second network that route and transfer data packets in units of hops, and a third network that is arranged between the first and the second network and transfers data cells based on an established connection.

In a fourth aspect of the present invention, a control connection for transferring control messages of a communication quality control protocol in the first and the second network is established within the third network, and the control messages are transferred by using the established control connection between the first and the second network. Then, a data transfer connection is established within the third network based on the information of the control messages.

In a fifth aspect of the present invention, a resource reservation message of a communication quality control protocol within the first and the second network is transferred from the second to the first network via the third network. The resource reservation message is then parsed at the boundary between the first and the third network, and a data transfer connection is established within the third network based on the information of the resource reservation message.

In a sixth aspect of the present invention, a resource reservation message of a communication quality control protocol within the first and the second network is transferred from the second to the first network via the third network. The resource reservation message is then parsed at the boundary between the second and the third network, and a data transfer connection is established within the third network based on the information of the resource reservation message.

BRIEF DESCRIPTION OF THE DRAWINGS

FIG. 2A shows the principle of a boundary device according to the present invention;

FIG. 3 shows the relationship between an IP and an ATM network;

FIG. 25 is a flowchart showing the fourth process performed by the sending side boundary device;

FIG. 33 is a flowchart showing the seventh process performed by the sending side boundary device;

FIG. 44 is a flowchart showing the tenth process performed by the sending side boundary device (No. 1);

FIG. 47 shows the operations for establishing a leaf-initiated point-to-point connection;

FIG. 48 shows an IP-to-ATM address conversion table memory;

FIG. 50 shows a flow identifier-VPI/VCI correspondence table memory;

FIG. 53 is a block diagram showing the configuration of a second sending boundary device;

FIG. 55 shows a flow identifier-connection information correspondence table memory;

FIG. 60 shows a flow identifier-LIJ identifier correspondence table memory.

DESCRIPTION OF THE PREFERRED EMBODIMENTS

Figure 1A:
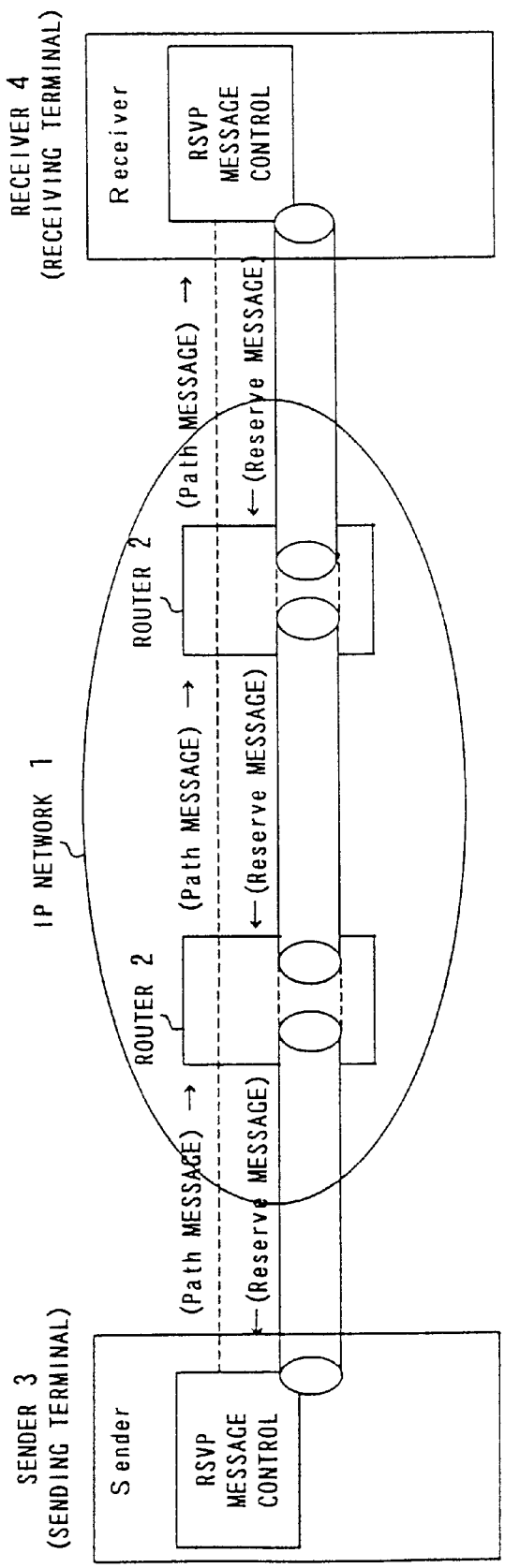
FIG. 1A is a schematic diagram showing an RSVP control.
Figure 1B:
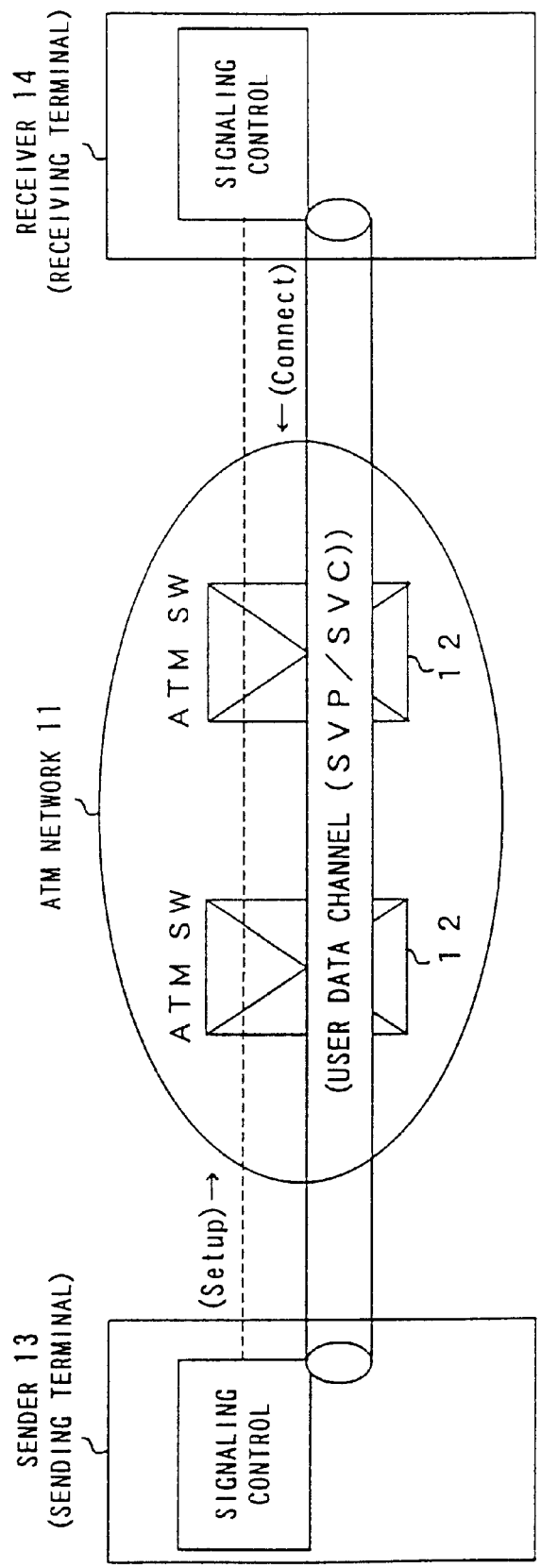
FIG. 1B is a schematic diagram showing an ATM connection control.
Figure 1C:
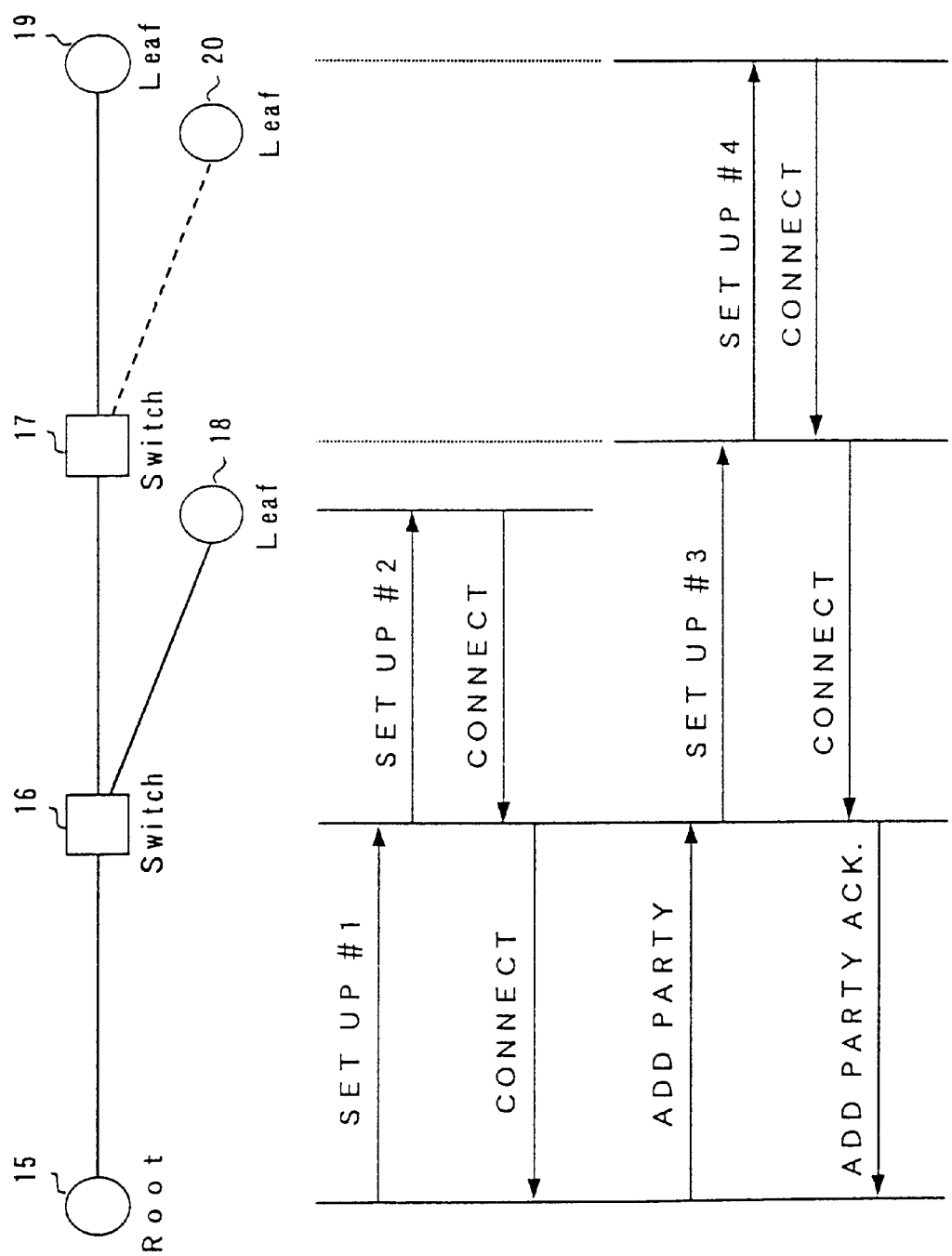
FIG. 1C is a schematic diagram showing a point-to-multipoint call control.

Provided below are the explanations about the details of preferred embodiments according to the present invention, by referring to the drawings.

FIG. 2A shows the principle of a boundary device according to the present invention. The boundary device shown in this figure comprises a receiving unit 21, a message processing unit 22, and a connection controlling unit 23. This boundary device controls communications at the boundary between a first network that routes and transfers data packets in units of hops, and a second network that transfers data cells based on an established connection.

Here, the first network and the data packets respectively correspond to, for example, an IP network and packets of control data, user data (application data), etc. In the meantime, the second network and the data cells respectively correspond to, for example, an ATM network and cells of control data, user data (application data), etc.

According to a first principle of the present invention, the message processing unit 22 processes control messages of a communication quality control protocol within the first network, and performs a communication quality control. The connection controlling unit 23 establishes a control connection for transferring control messages within the second network.

Here, the control messages correspond to the above described RSVP Path message, Reserve message, etc., and are transferred from the first to the second network. The connection controlling unit 23 establishes a connection dedicated to the control messages by using a permanent connection such as a PVP/PVC, etc. so as to transfer the control messages within the second network.

By establishing the permanent connection dedicated to the control messages separately from the data transfer connection as described above, the communication qualities of the control messages within the second network can be guaranteed. Accordingly, the quality of a data communication within the second network can be controlled according to the control messages whose qualities are guaranteed, so that the communication quality control protocol within the first network is suitably mapped to the second network.

According to a second principle of the present invention, the receiving unit 21 receives a resource reservation message of a communication quality control protocol within the first network via the second network. The message processing unit 22 parses the resource reservation message, and the connection controlling unit 23 establishes a data transfer connection within the second network based on the information of the resource reservation message.

For example, the first network includes a sending terminal that sends data packets, and the receiving unit 21 receives a resource reservation message via the second network from another network including a receiving terminal which receives the data packets. Accordingly, the boundary device according to the second principle corresponds to the sending side boundary device located at the boundary between the first and the second network.

A data transfer connection is established by parsing the resource reservation message received by the sending side boundary device, so that a point-to-multipoint call suitable for delivering data to a plurality of receiving terminals can be easily established. As a result, the communication quality control protocol within the first network can be linked to the point-to-multipoint call connection control within the second network.

According to a third principle of the present invention, the receiving unit 21 receives a resource reservation message of a communication quality control protocol within the first network from a terminal within the first network. The message processing unit 22 parses the resource reservation message, and the connection controlling unit 23 establishes a data transfer connection within the second network based on the information of the resource reservation message.

For example, the first network includes a receiving terminal which receives data packets, and the receiving unit 21 receives a resource reservation message sent from the receiving terminal. The boundary device transfers the resource reservation message via the second network to another network including a sending terminal which sends the data packets. Accordingly, the boundary device according to the third principle corresponds to the receiving side boundary device located at the boundary between the first and the second network.

A data transfer connection is established by parsing the resource reservation message received by the receiving side boundary device, so that the data transfer connection can be quickly provided in response to the resource request from a receiving terminal. As a result, the communication quality control protocol within the first network can be linked to the connection control within the second network.

As described above, with the boundary device according to the present invention, the quality guarantee mechanism such as the RSVP, etc. can be linked to the quality control based on a connection of the ATM, etc., whereby communication quality higher than the quality control closed only for an IP layer can be obtained.

Figure 11:
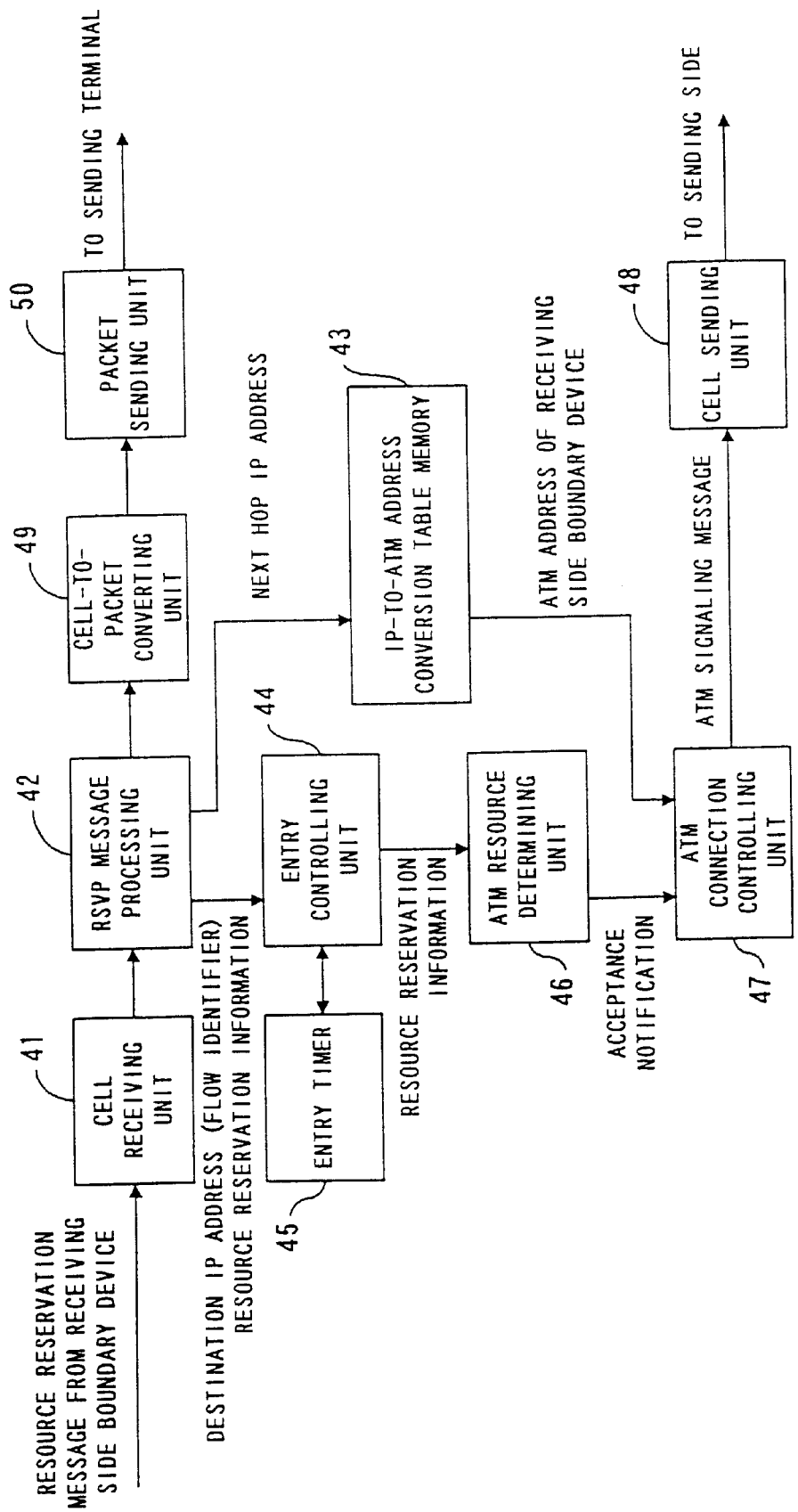
FIG. 11 shows the configuration of a first sending side boundary device.
Figure 52:
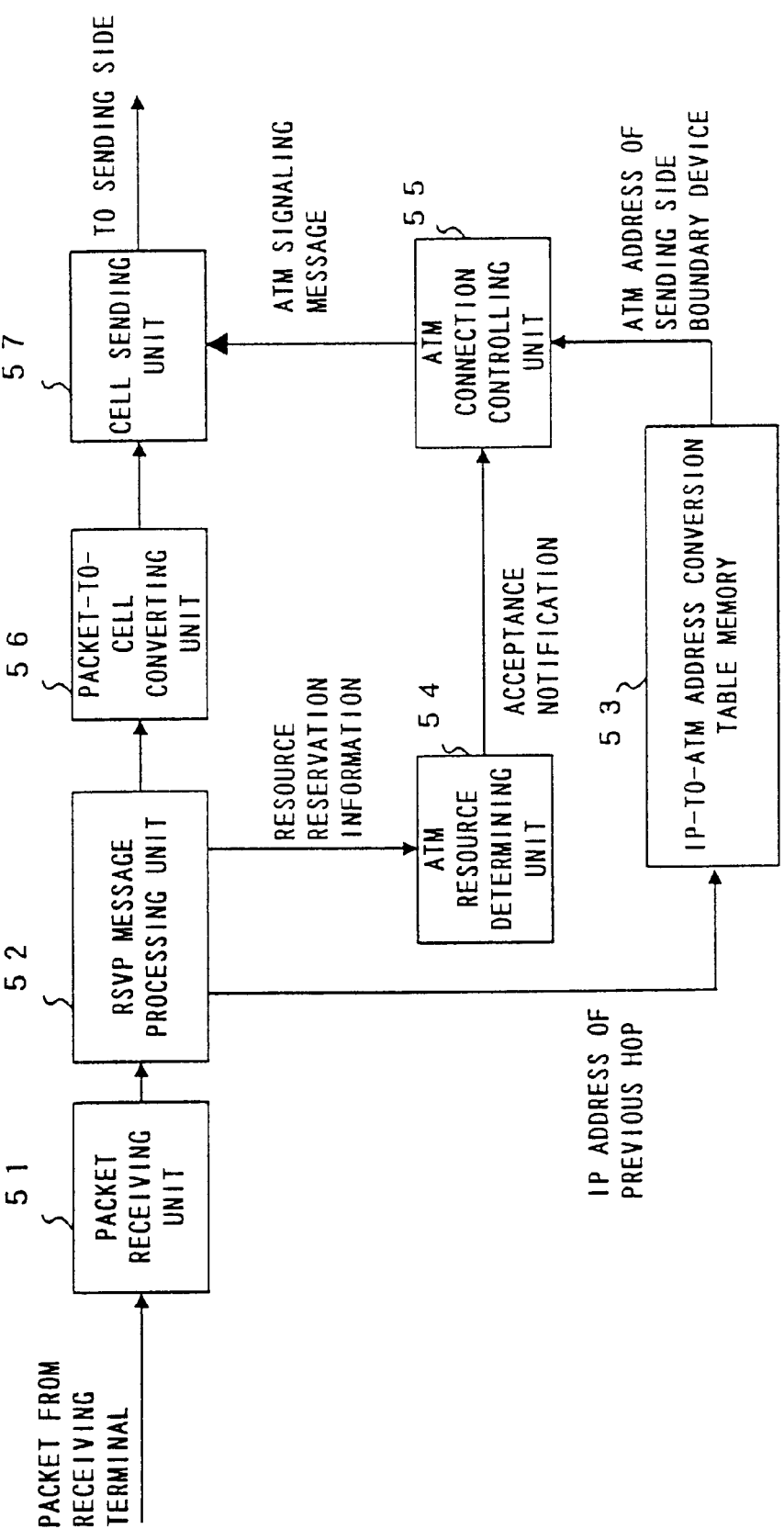
FIG. 52 is a block diagram showing the configuration of a first receiving side boundary device.
Figure 57:
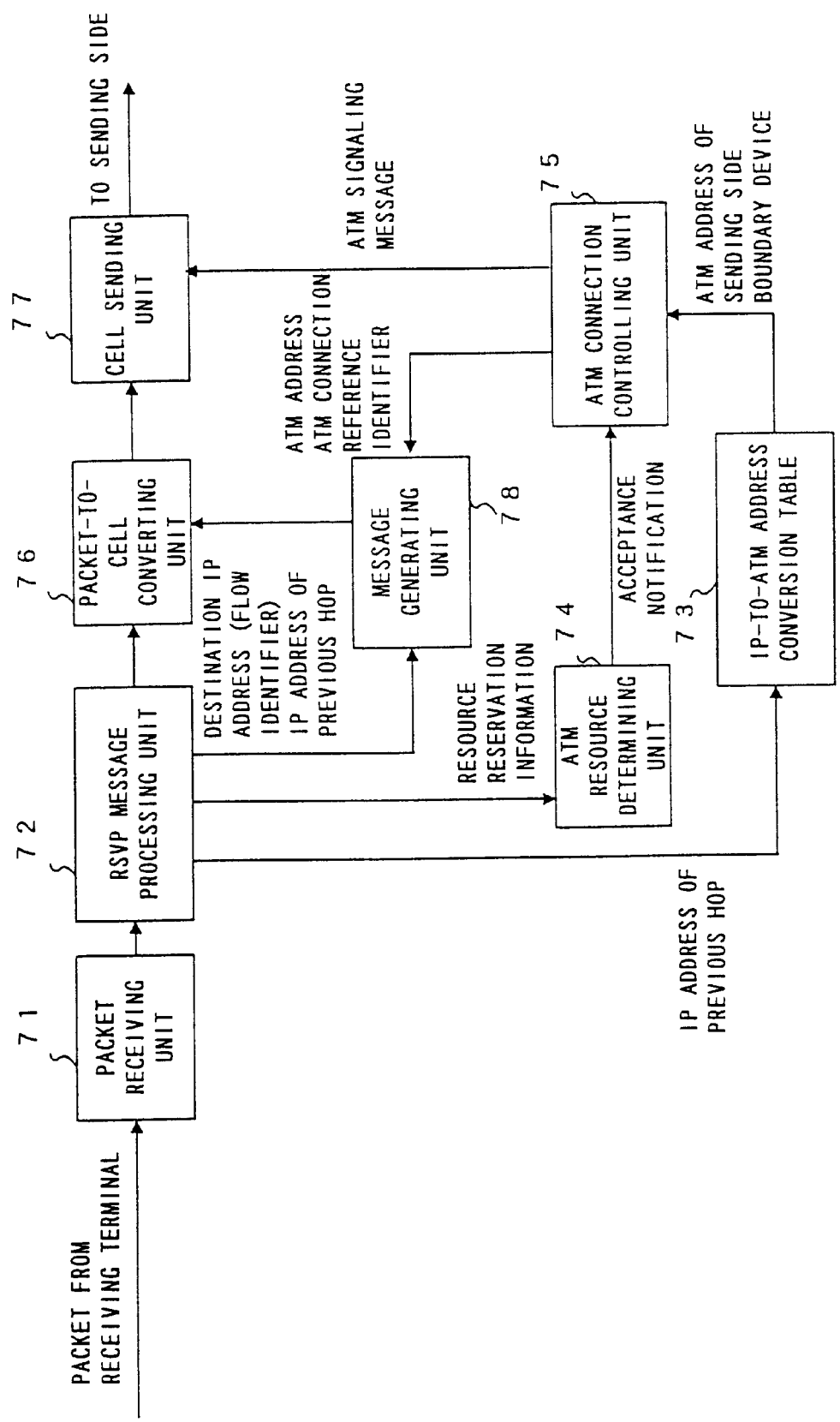
FIG. 57 is a block diagram showing the configuration of a second receiving side boundary device.
Figure 58:
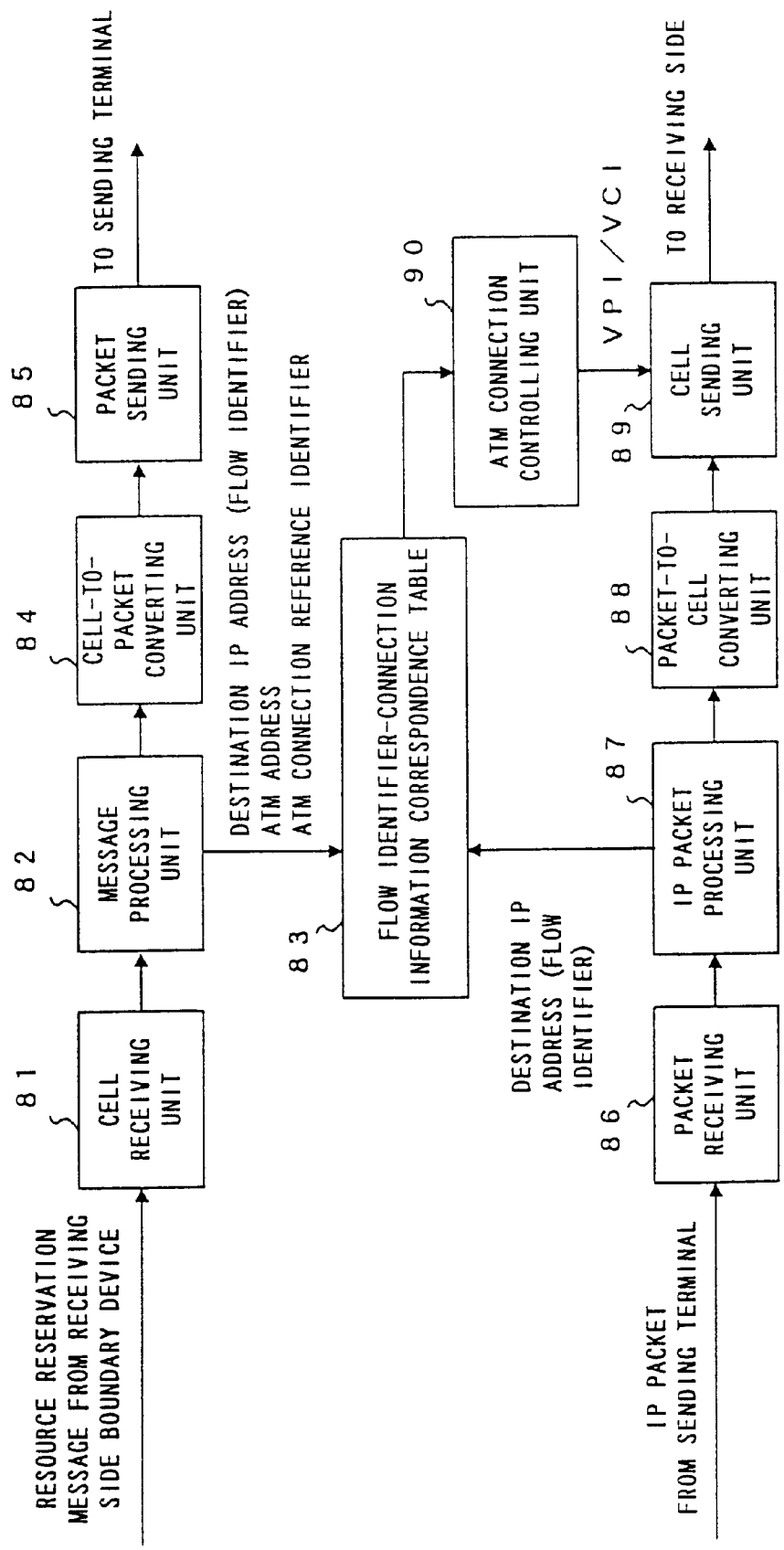
FIG. 58 is a block diagram showing the configuration of a third sending side boundary device.

The receiving unit 21 shown in FIG. 2A corresponds to, for example, a cell receiving unit 41 shown in FIG. 11, a packet receiving unit 51 shown in FIG. 52, a cell receiving unit 61 shown in FIG. 53, a packet receiving unit 71 shown in FIG. 57, and a cell receiving unit 81 shown in FIG. 58.

The message processing unit 22 shown in FIG. 2A, corresponds to, for example, an RSVP message processing unit 42 shown in FIG. 11, an RSVP messasge processing unit 52 shown in FIG. 52, and RSVP messsage processing unit 62 shown in FIG. 53, an RSVP message processing unit 72 shown in FIG. 57, and a message processing unit 82 shown in FIG. 58.

The connection controlling unit 23 shown in FIG. 2A corresponds to, for example, an ATM connection controlling unit 47 shown in FIG. 11, an ATM connection controlling unit 55 shown in FIG. 52, and an ATM connection controlling unit 75 shown in FIG. 57.

Additionally, the present invention provides also a communication controlling method in a network including a first and a second network that route and transfer data packets in units of hops, and a third network that is arranged between the first and the second network and transfers data cells based on an established connection. Here, the first and the second network correspond to, for example, IP networks, while the third network corresponds to, for example, an ATM network.

With a communication controlling method according to a fourth principle of the present invention, a control connection for transferring control messages of a communication quality control protocol within the first and the second network is established within the third network, and the control messages are transferred between the first and the second network by using the established control connection. A data transfer connection is then established within the third network based on the information of the control messages.

By establishing the connection dedicated to the control messages separately from the data transfer connection as described above, the communication qualities of the control messages within the third network can be guaranteed. Accordingly, the communication quality control protocol within the first and the second network is suitably mapped to the third network.

With a communication controlling method according to a fifth principle of the present invention, a resource reservation message of a communication quality control protocol within the first and the second network is transferred from the second to the first network via the third network. The resource reservation message is then parsed at the boundary between the first and the third network, so that a data transfer connection is established within the third network based on the information of the resource reservation message.

For example, the first network includes a sending terminal which sends data packets, while the second network includes a receiving terminal which receives data packets. The first network receives a resource reservation message from the second network via the third network. Accordingly, the boundary between the first and the third network corresponds to the boundary on the sending side of data packets.

The resource reservation message is parsed at the boundary on the sending side and a data transfer connection is established, so that a point-to-multipoint call suitable for delivering data to a plurality of receiving terminals can be easily established. Accordingly, the communication quality control protocol within the first and the second network can be linked to the point-to-multipoint call connection control within the third network, in the same way as the second principle.

With a communication controlling method according to a sixth principle of the present invention, a resource reservation message of a communication quality control protocol within the first and the second network is transferred from the second to the first network via the third network. The resource reservation message is then parsed at the boundary between the second and the third network, so that a data transfer connection is established within the third network based on the information of the resource reservation message.

For example, the first network includes a sending terminal which sends data packets, while the second network includes a receiving terminal which receives data packets. The second network transfers the resource reservation message sent from the receiving terminal to the first network via the third network. Accordingly, the boundary between the second and the third network corresponds to the boundary on the receiving side of data packets.

The resource reservation message is parsed at the boundary on the receiving side and a data transfer connection is established, so that the data transfer connection can be quickly provided in response to the resource request from the receiving terminal. Accordingly, the communication quality control protocol within the first and the second network can be linked to the connection control within the third network, in the same way as the third principle.

As described above, the resource reservation mechanism controlled by the RSVP is linked to the connection control which takes full advantage of the quality control or the point-to-multipoint call control of the ATM, so that the RSVP resource requests issued from a plurality of users can be flexibly supported within an ATM network. Consequently, end-to-end quality guarantee can be simultaneously provided to the plurality of users between the IP networks interposing an ATM network.

The procedure for making an RSVP resource reservation is performed by the resource reservation message (Reserve message) from a receiver (receiving terminal) as described above. When an ATM switch arranged as a boundary device (IP-ATM linking device) at the boundary between an ATM and an IP network receives the resource reservation message, it is natural that the ATM switch should establish an ATM connection guaranteeing the quality requested by the RSVP at this timing.

The method for establishing an ATM connection at this time is considered to be classified depending on the position of an intra-network device establishing the ATM connection. Namely, two method types are considered: a method with which an ATM switch located at the boundary on a sending terminal side establishes an ATM call at the timing of receiving a resource reservation message; and a method with which an ATM switch located at the boundary on a receiving terminal side establishes an ATM call at the timing of receiving a resource reservation message.

Figure 2B:
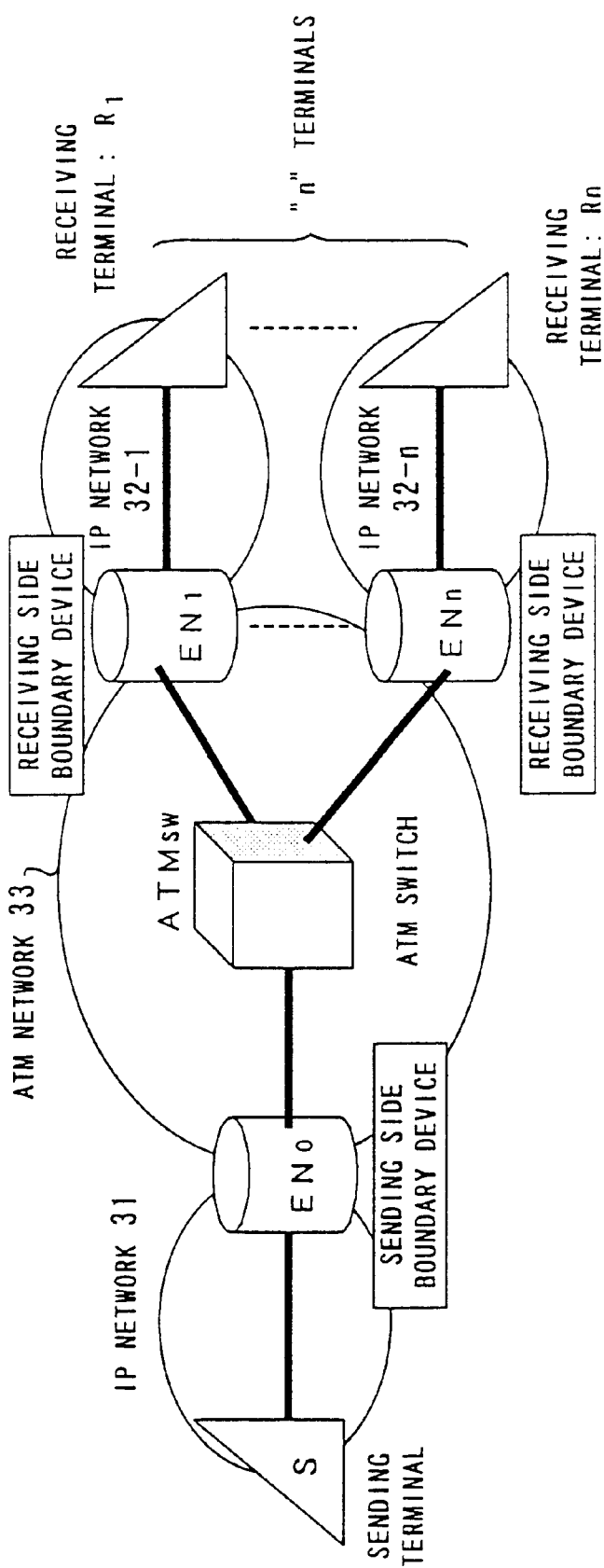
FIG. 2B shows the configuration of a network.

FIG. 2B shows the configuration of a communications network including boundary devices according to the present invention. The network shown in this figure is composed of IP networks 31 and 32-1 through 32-n, and an ATM network 33 existing in between. Here, a one-to-multiple data transfer is assumed to be made between a sending terminal S within the IP network 31 and receiving terminals $R_1$ through $R_n$ respectively within the IP networks 32-1 through 32-n via the ATM network 33.

The ATM network 33 includes a single ATM switch ($ATM_{sw}$), and a boundary device $EN_0$ is arranged at the boundary between the IP network 31 on the sending terminal side and the ATM network 33. Boundary devices $EN_1$ through $EN_n$ are arranged at the boundaries between the IP networks 32-1 through 32-n on the receiving terminal side and the ATM network 33. The ATM network 33 is normally considered to include a plurality of ATM switches. Also in this case, the configurations and the operations of the following preferred embodiments are similar.

Considering the case where an ATM network exists on the way of the route like the network configuration shown in FIG. 2B, a high-quality communication using an ATM quality control mechanism can be implemented by directly establishing an ATM connection between the boundary devices, by converting data into ATM cells, and by transferring the ATM cells.

If the physical network configuration shown in FIG. 2B is divided into an IP and an ATM layer, the configuration becomes the one shown in FIG. 3. In the IP layer, the sending terminal S makes IP communications with the receiving terminals $R_1$ through $R_n$ via the boundary devices $EN_0$ and $EN_1$ through $EN_n$. In the ATM layer, the boundary device $EN_0$ on the sending side establishes an ATM connection between the boundary devices $EN_1$ through $EN_n$ on the receiving side and the device $EN_0$ itself, and makes ATM communications.

Here, the capabilities possessed by the respective devices are further explained. The sending terminal S and the receiving terminals $R_1$ through $R_n$ have a packet transfer capability according to an IP protocol, and respectively have IP addresses as unique addresses.

Assume that the sending terminal S transfers application data to the receiving terminals $R_1$ through $R_n$. In this case, an IP processing unit within the sending terminal S disassembles the data into variable-length packets (datagrams), assigns an IP address of a destination, and sends the packets to a transmission line. The receiving terminals $R_1$ through $R_n$ assemble the original data from the received packets, and pass the original data to an application executing unit.

An ATM switch is arranged within the ATM network 33, and performs a switching process in units of cells. All of data transferred within the ATM network 3 are divided into 53-byte cells.

The boundary devices $EN_0$ and $EN_1$ through $EN_n$, which are located between the different networks (between the IP and the ATM network), have both a capability for disassembling the IP packets reaching from the IP networks 31 and 32-1 through 32-n into ATM cells and for sending the ATM cells, and its reversed capability. Furthermore, these boundary devices have a routing capability for determining the route of an IP packet as an IP communication capability, and capabilities for switching an ATM cell and for establishing an ATM connection as ATM communication capabilities.

The boundary devices $EN_0$ and $EN_1$ through $EN_n$ additionally have the following three capabilities.

(1) Bandwidth Control Capability

This capability includes a policing capability for determining what type of an ATM connection to establish in what bandwidth size based on the bandwidths requested by the receiving terminals $R_1$ through $R_n$.

(2) Connection Management Capability

This capability manages VPI/VCI resources yet to be used, determines whether or not a resource can be provided in response to a new bandwidth request, and performs signaling.

(3) Address Solution Capability

When an IP packet is transferred to a target receiver via the ATM network 33, the ATM address of the boundary device at the destination must be obtained from the flow identifier (session identifier) assigned to the IP packet. For example, a destination IP address is used as the flow identifier. Therefore, each boundary device must store the correspondences between the ATM addresses of all of the other boundary devices and the IP addresses of the terminals connected to the boundary devices.

Figure 4:
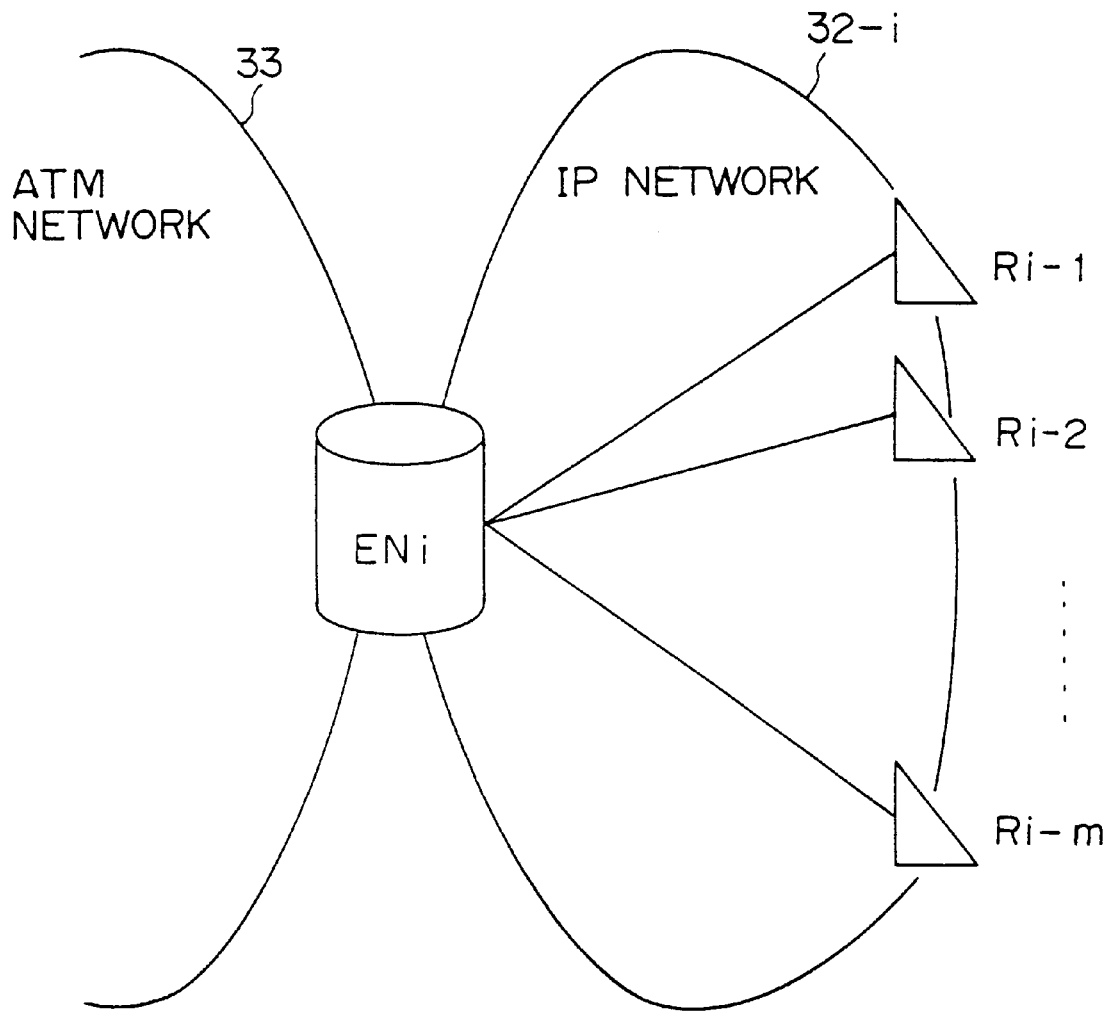
FIG. 4 shows a plurality of receiving terminals in an IP network.

In FIGS. 2B and 3, only one receiving terminal $R_i$ (i=1, 2, ..., n) is arranged within an IP network 32-i including each boundary device $EN_i$ for the sake of convenience. Actually, however, a plurality of receiving terminals $R_i$-1, $R_i$-2, ..., $R_i$-m ("m" is an arbitrary positive integer) can be arranged within the IP network 32-i as shown in FIG. 4. In this case, the receiving terminals $R_i$-1, $R_i$-2, ..., $R_i$-m are connected to the boundary device $EN_i$ via a router, etc.

The sending terminal S can transfer data to the receiving terminals $R_i$-1, $R_i$-2, ... $R_i$-m via the boundary device $EN_i$ by specifying their IP addresses. The receiving terminal $R_i$ is denoted as a representative of the plurality of receiving terminals $EN_i$-1, $EN_i$-2, ..., $EN_i$-m in the explanation provided below.

As described above, RSVP control messages are transferred from both of the sending terminal S and the receiving terminal $EN_i$. When these control messages are transferred in the ATM network 33, known transfer methods such as a classical IP over ATM transfer in hop units, and a connectionless transfer are considered to be used. However, these transfer methods do not guarantee the quality on an IP level.

Therefore, the present invention enables a processing delay time caused by IP routing to be reduced, and a high-quality control message connection to be provided by directly establishing ATM connections between the sending side boundary device $EN_0$ and the receiving side boundary devices $EN_1$ through $EN_n$ at the boundary of the ATM network 33. The control message connection is established separately from a data transfer connection to be described later, and is used exclusively for a control message transfer.

Figure 5:
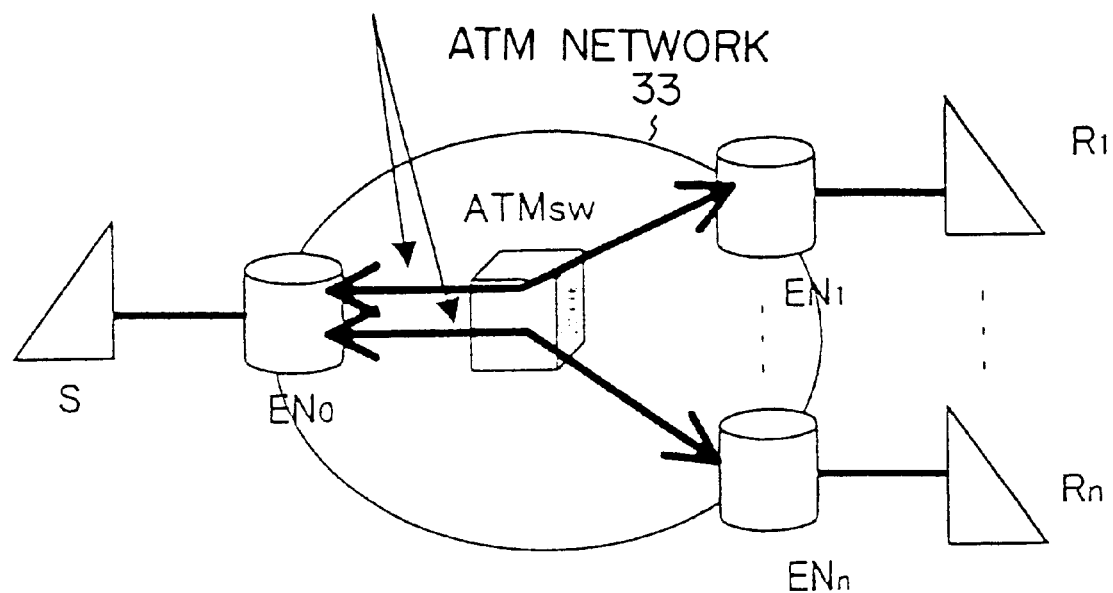
FIG. 5 shows a point-to-point connection.
Figure 6:
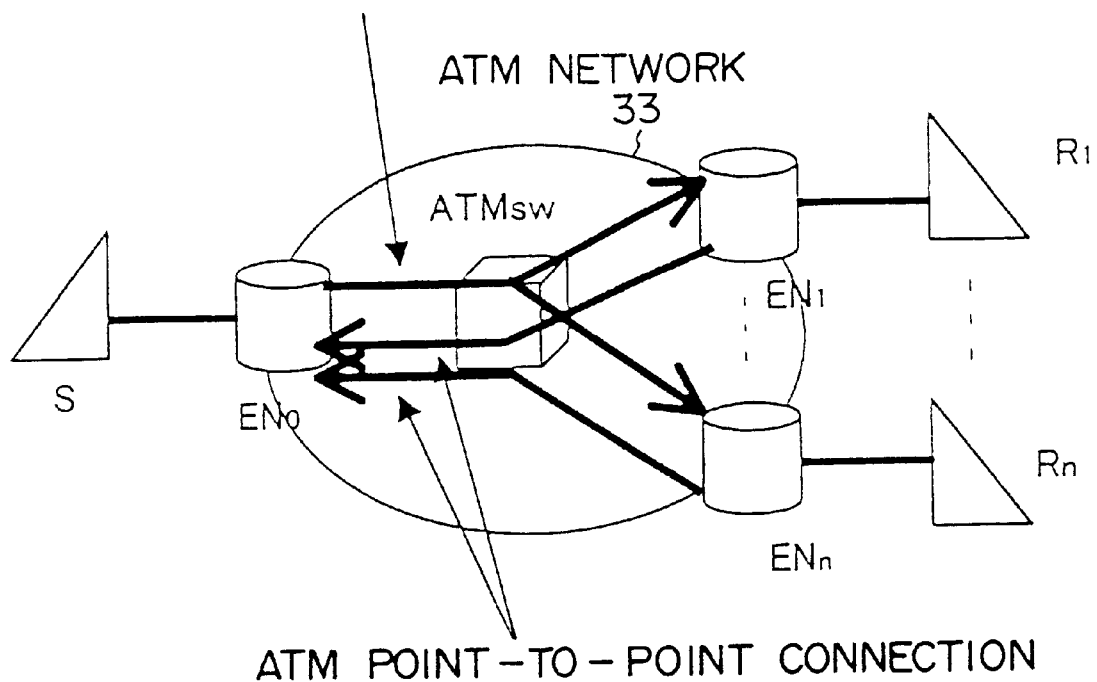
FIG. 6 shows the use of both point-to-multipoint and point-to-point connections.

As a method for establishing an ATM connection dedicated to control messages, two types are considered as shown in FIGS. 5 and 6. FIG. 5 shows the method for establishing a bidirectional ATM point-to-point connection between the sending side boundary device $EN_0$ and each of the receiving side boundary devices $EN_1$ through $EN_n$. With this method, a high-quality bidirectional path for transferring control messages can be provided for each of the receiving side boundary devices $EN_1$ through $EN_n$.

In the meantime, FIG. 6 shows the method using both of ATM point-to-multipoint and point-to-point connections. Here, an ATM point-to-multipoint connection from the boundary device $EN_0$ to the boundary devices $EN_1$ through $EN_n$ is established for communications made in a downstream direction from the sending to the receiving side, while an individual ATM point-to-point connection is established for communications made in an upstream direction for each of the receiving side boundary devices $EN_1$ through $EN_n$. By adopting the ATM point-to-multipoint connection in the downstream direction, the bandwidth resources of the ATM network 33 can be effectively utilized.

The reason why the ATM point-to-point connection is adopted in the upstream direction is that there is a technical difficulty in cell merging which must be performed in an ATM switch when an ATM point-to-multipoint connection is established. Accordingly, the amount of processing can be reduced by establishing a simpler ATM point-to-point connection.

As described above, a point-to-point or a point-to-multipoint connection can be used as a connection for transferring IP signaling protocol control messages within the ATM network 33.

Furthermore, as a transfer form using an established connection, a best-effort transfer or a transfer with guaranteed QOS may be considered. For the signaling protocol such as the RSVP, etc., which holds a state by using a software state, a control message packet loss directly leads to a deterioration of the protocol performance. Therefore, it is desirable to prepare a transfer route with guaranteed QOS as a control message transfer connection.

One problem of mapping the RSVP to the ATM network 33 is what connection to be allocated in which bandwidth in response to the resource requests (bandwidth requests) issued from the plurality of receiving terminals $R_1$ through $R_n$ (receivers).

Since the RSVP is a protocol assuming multicast to the plurality of receiving terminals $R_1$ through $R_n$, different resource requests are issued from the plurality of receivers. The ATM technique implements a point-to-multipoint connection for a one-to-multiple communication, which supports multicast. However, one point-to-multipoint connection can be established in only one bandwidth, which causes a problem.

Namely, if different bandwidths are requested from a plurality of receivers as in the RSVP, a connection must be established based on the maximum value of the bandwidths requested by all of the receivers in order to satisfy the requests with only one point-to-multipoint connection.

Figure 7:
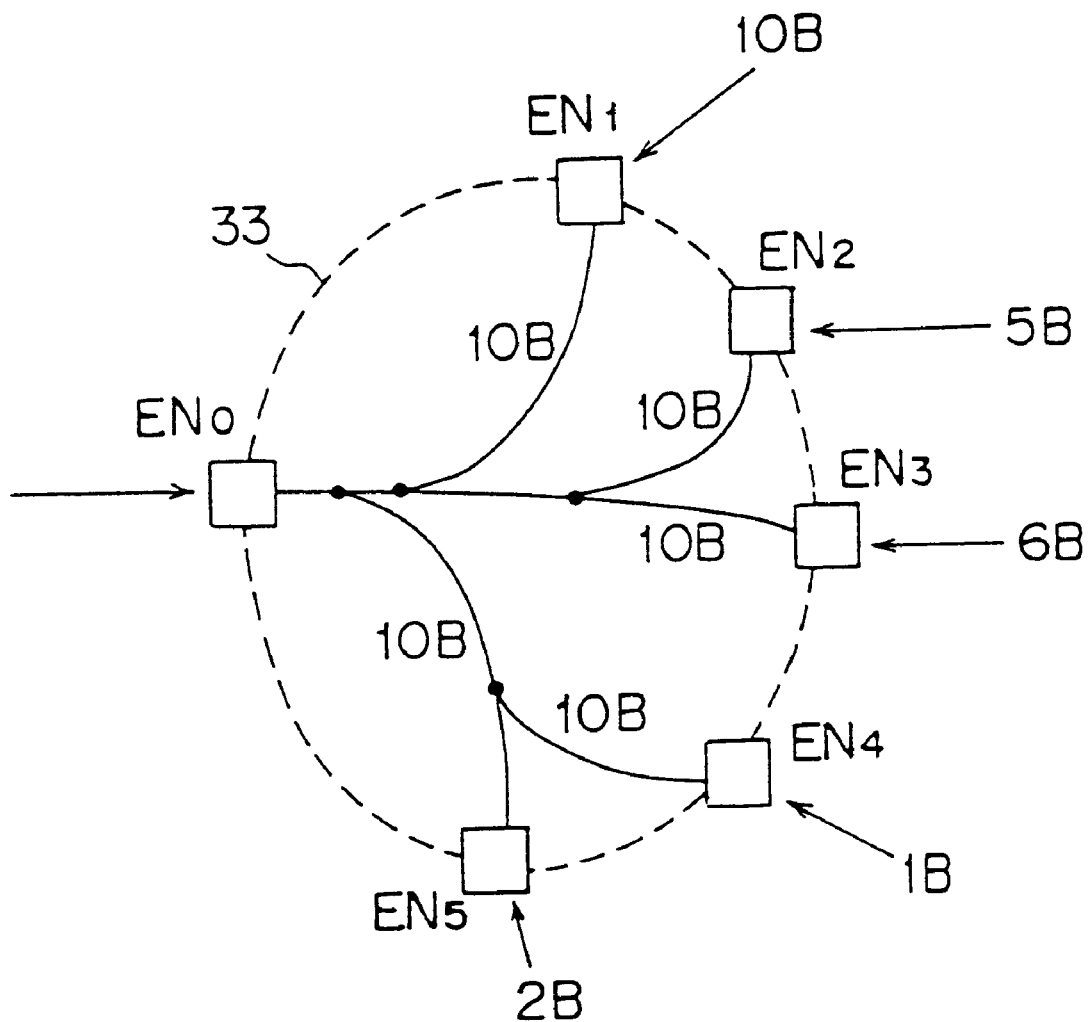
FIG. 7 shows a problem of a point-to-multipoint connection.

FIG. 7 shows the case where a point-to-multipoint connection is established between the sending side boundary device $EN_0$ and five receiving side boundary devices $EN_1$ and $EN_5$. In this figure, bandwidth requests are issued from the 5 receivers respectively belonging to the boundary devices $EN_1$ through $EN_5$ for one multicast session provided by the sender, and the bandwidths of different sizes are requested by the respective receivers.

The boundary devices $EN_1$ through $EN_5$ respectively receive the bandwidth requests of 10B, 5B, 6B, 1B, and 2B from the receivers based on the assumption that the 15 unit of an arbitrary bandwidth is B. Here, if the IP network has the configuration shown in FIG. 4, the bandwidth requests that the respective boundary devices $EN_1$ through $EN_5$ receive are assumed to indicate the result obtained by merging the bandwidth requests from the receiving terminals $R_i$-1, $R_i$-2, . . . , $R_i$-m.

Because the requested maximum bandwidth among the five requested bandwidths is 10B, a connection must be established in a bandwidth of 10B when the ATM network 33 provides with one point-to-multipoint connection. With this method, the bandwidth of 10B is provided to the receiver which requests the bandwidth of only 1B, which leads to a waste in network resources.

Figure 8:
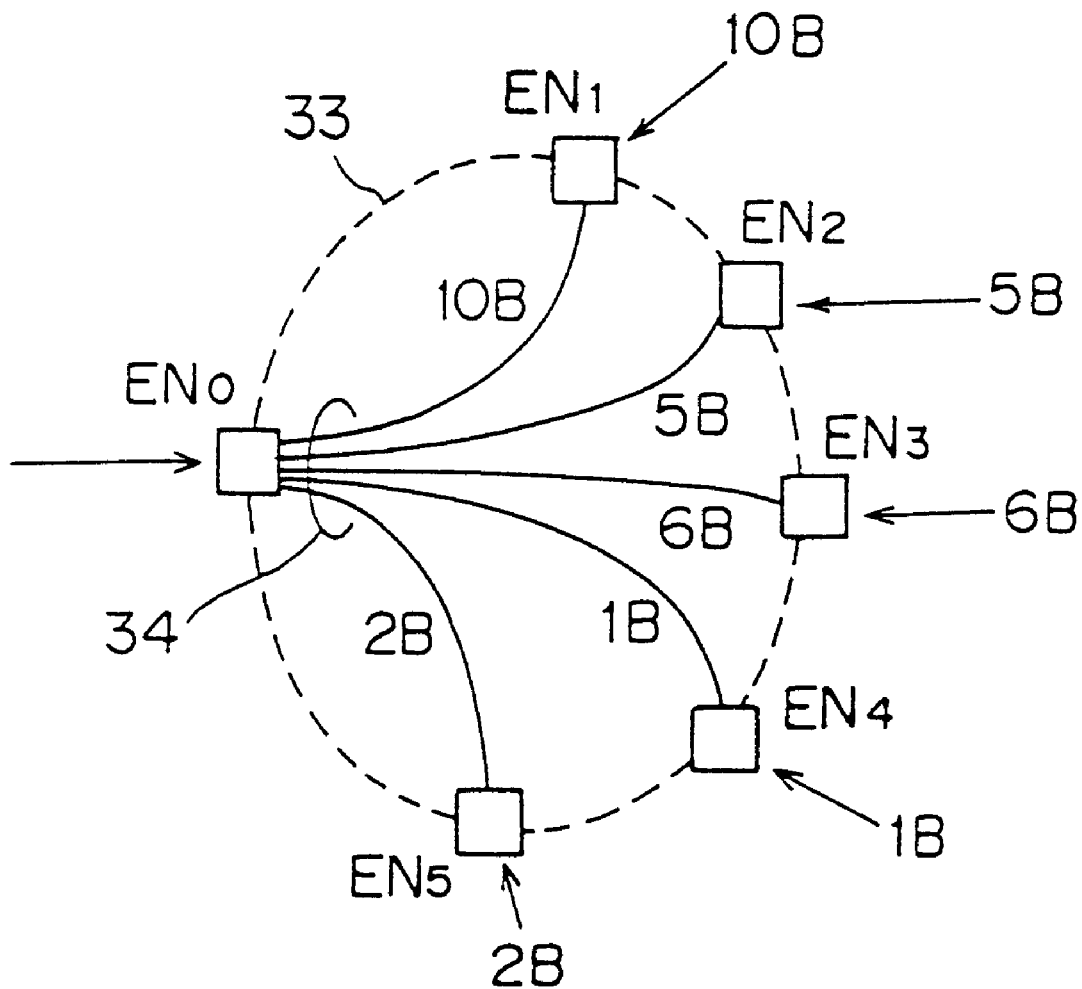
FIG. 8 shows a problem of a point-to-point connection.

Considering the establishment of a connection faithfully to the bandwidth requested by a receiver, it is natural that the ATM network 33 utilizes a point-to-point connection for a one-to-one communication. When a service is provided to all of the receivers shown in FIG. 7 with point-to-point connections, each connection is established in a bandwidth requested by each of the receivers as shown in FIG. 8.

Since point-to-point connections are established in the bandwidths requested by the respective receivers with this method, the respective bandwidths for the connections are never wasted. However, the sending side boundary device $EN_0$ must provide connections the number of which is equal to the number of resource requests. Additionally, a plurality of connections can possibly coexist for one data proceeding to the same route as indicated by a bundle 34 of connections, which also leads to a waste in network resources. This tendency increases as going to an upstream (sending side) of a communication.

As described above, it is difficult to establish a connection suitable for a multicast session in the ATM network 33. A solution to this problem is considered to be a method for adopting an intermediate method between the above described two extreme examples. That is, a method for supporting one multicast session with a combination of point-to-point and point-to-multipoint connections.

Conventionally, there was no method for providing an optimum combination of point-to-point and point-to-multipoint connections. Therefore, a policy determining an optimum connection by using these connections and a method for establishing an optimum connection by using these connections will be provided in the following preferred embodiments.

Considering a delivery-type data communication the representative of which is multicast, etc., a sending terminal sending data and one or a plurality of receiving terminals receiving the data exist. A resource reservation for guaranteeing the characteristic and the quality of data to be sent is currently required on the Internet depending on the characteristic of the data. The ATM is a network technique suitable for guaranteeing a quality, and a study has been made to accommodate an IP network in an ATM network.

Accommodating the IP network guaranteeing a data quality in the ATM network means that the resource reservation protocol running in the IP network is accommodated in the ATM network. That is, the boundary device located at the boundary between the ATM and the IP network must establish an ATM connection according to a message of the resource reservation protocol.

Taking as an example the RSVP being a currently useful resource reservation protocol, a sending terminal sends the path message indicating the data traffic characteristic to a downstream (receiving side), while a receiving terminal sends a resource reservation message to an upstream (sending side). When a boundary device establishes an ATM connection based on the resource reservation message from the receiving terminal, two connection establishment types are considered: root-initiated connection establishment with which a sending side boundary device establishes an ATM connection; and leaf-initiated connection establishment with which a receiving side boundary device establishes an ATM connection.

First, the root-initiated connection establishment is explained below. With the root-initiated connection establishment, the sending side boundary device establishes an ATM connection at the timing of receiving the resource reservation message from the receiving terminal. At this time, the sending side boundary device must find out a suitable connection to be established according to the bandwidths requested by a group of receiving terminals. The following preferred embodiment also refers to a policing method to be followed by the bandwidth control capability of the sending side boundary device at each phase of the operations of the device.

In FIG. 2B, each of the receiving terminals $R_1$ through $R_n$ sends to the sending terminal S an IP packet of a resource reservation message. Upon receipt of the IP packet of the resource reservation message, each of the receiving side boundary devices $EN_1$ through $EN_n$ learns from the information within the packet the IP address of the sending side boundary device $EN_0$ to which the sending terminal S belongs.

Additionally, each of the receiving side boundary devices $EN_1$ through $EN_n$ comprises an IP-to-ATM address conversion table memory for making a correspondence between the IP address of the sending side boundary device $EN_0$ and an ATM address. If the IP address of the sending side boundary device $EN_0$ is obtained, the corresponding ATM address can be obtained. The received IP packet is then transferred to the sending side boundary device $EN_0$ by using an existing control message connection.

Here, RSVP flow states (path states) that the receiving side boundary devices $EN_1$ through $EN_n$ manage are used to learn the IP address of the sending side boundary device $EN_0$. As described above, intra-network devices (such as a sending terminal, a receiving terminal, a boundary device, etc.) having the RSVP capability normally hold a flow identifier (such as a destination IP address) for identifying an RSVP flow currently being communicated. The information of an IP address of an intra-network device and an IP address of a previous hop, etc. are held as a path state for each flow identifier.

Since an RSVP control message itself has a flow identifier, the boundary devices $EN_1$ through $EN_n$ can learn the flow identifier upon receipt of the resource reservation message. If the flow state corresponding to the flow identifier of a received resource reservation message among the flow states that the boundary devices $EN_1$ through $EN_n$ manage is referenced, the IP address of the previous hop (immediately preceding hop), that is, the IP address of the sending side boundary device $EN_0$ can be learned.

The sending side boundary device $EN_0$ that has received the IP packet of the resource reservation message then establishes a data transfer connection which satisfies a requested bandwidth according to a particular determination policy, and transfers the IP packet to the sending terminal S. In this way, the bandwidth is reserved within the network.

Figure 9:
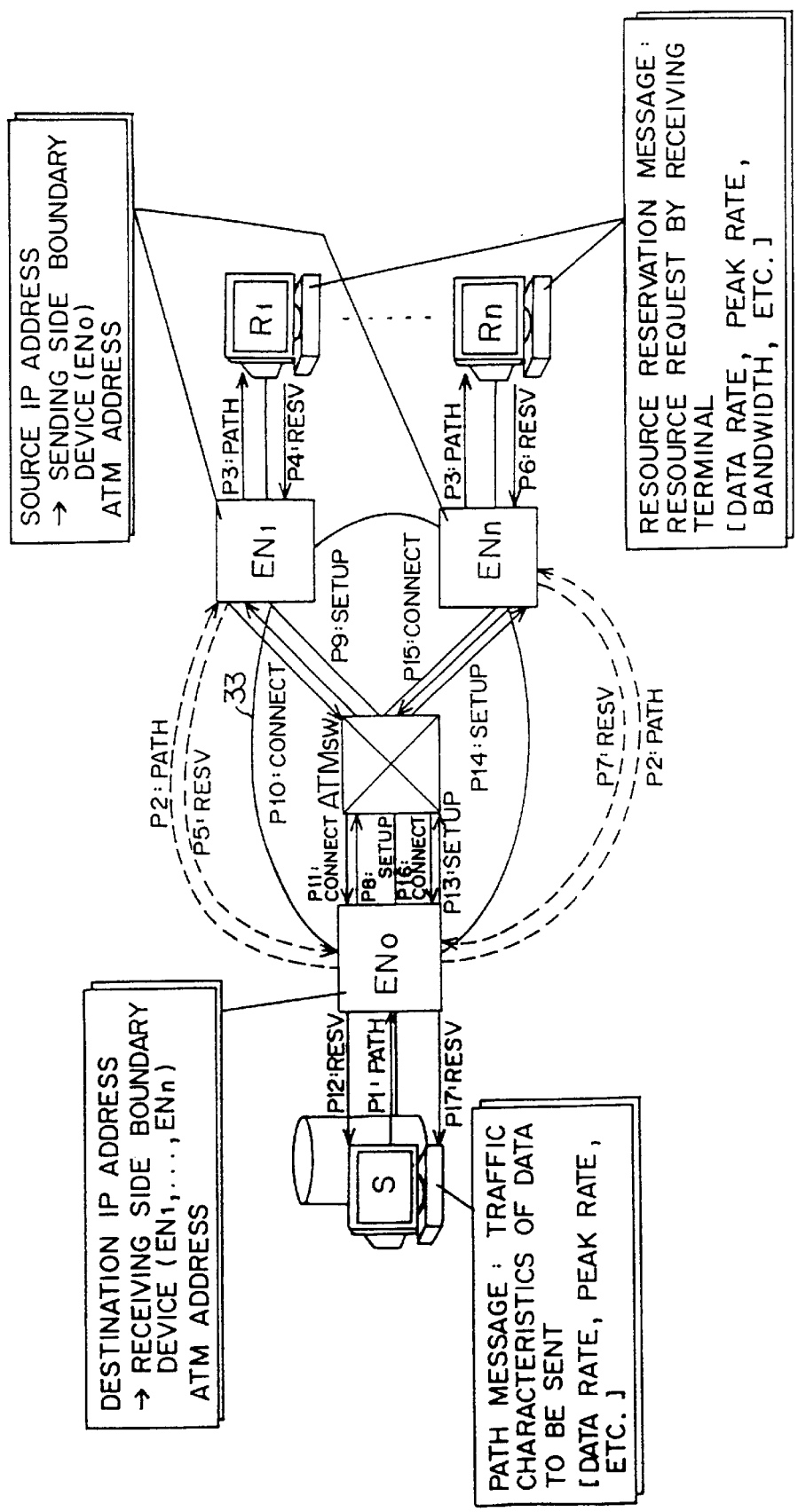
FIG. 9 shows the operations for establishing a root-initiated connection.

FIG. 9 shows the operations for establishing such a root-initiated connection in the network shown in FIG. 2B. Here, each of the boundary devices $EN_0$ and $EN_1$ through $EN_n$ learns the IP address or the network address (higher portion of the IP address) of an arbitrary terminal and the ATM address of the boundary device to which the terminal belongs. Additionally, each of the boundary devices $EN_0$ and $EN_1$ through $EN_n$ comprises an IP-to-ATM address conversion table memory relating to all of the boundary devices. These establishment operations are performed with the following procedure.

P1: The traffic characteristic information (such as a data rate, a peak rate, etc.) of data from the sending terminal S are multicast to all of the receivers as an RSVP path message PATH.

P2: When the path message arrives at the sending side boundary device $EN_0$, the sending side boundary device $EN_0$ obtains the ATM addresses of the receiving side boundary devices $EN_1$ through $EN_n$ from the destination IP address of the path message. The path message is transferred to the respective receiving side boundary devices $EN_1$ through $EN_n$ over the ATM control message connection prepared beforehand between the boundary devices.

P3: The path message arrives at the respective receiving terminals $R_1$ through $R_n$ from the receiving side boundary devices $EN_1$ through $EN_n$. With this message, each of the receivers learns the characteristic of the data from the sending terminal S.

P4: The respective receiving terminals $R_1$ through $R_n$ generate a resource reservation message RESV based on the received path message. The RESV includes the information such as a requested data rate, a requested peak rate, a requested bandwidth, etc. Here, the receiving terminal $R_1$ first sends the resource reservation message to the boundary device $EN_1$.

P5: The boundary device $EN_1$ that has received the resource reservation message from the receiving terminal $R_1$ learns from the flow identifier included in the message the IP address of the boundary device $EN_0$ at the destination to which the resource reservation message is transferred, and further learns the corresponding ATM address by referencing the IP-to-ATM address conversion table memory. The boundary device $EN_1$ then transfers the resource reservation message to the boundary device $EN_0$.

P6: Also the receiving terminals $R_2$ through $R_n$ send resource reservation messages RESVs to the boundary devices $EN_2$ through $EN_n$ in the same way as the receiving terminal $R_1$.

P7: Also the boundary devices $EN_2$ through $EN_n$ transfer the resource reservation messages RESVs to the boundary device $EN_0$ in the same way as the boundary device $EN_1$.

P8: The sending side boundary device $EN_0$ which has received the resource reservation message from the receiving terminal $R_1$ determines the ATM connection which satisfies the request of the receiving terminal $R_1$ based on the requested bandwidth included in the message. The sending side boundary device $EN_0$ then sends a setup message SETUP to the ATM switch in order to establish an ATM connection to the receiving side boundary device $EN_1$ to which the receiving terminal $R_1$ belongs.

P9: The ATM switch which has received the setup message transfers this message to the boundary device $EN_1$.

P10: The boundary device $EN_1$ which has received the setup message returns a connection acknowledgment message CONNECT to the ATM switch.

P11: The ATM switch which has received the connection acknowledgment message transfers this message to the boundary device $EN_0$.

P12: The boundary device $EN_0$ which has received the connection acknowledgment message transfers the resource reservation message from the receiving terminal $R_1$ to the sending terminal S.

P13: The sending side boundary device $EN_0$ which has received the resource reservation messages from the respective receiving terminals $R_2$ through $R_n$ determines the ATM connections which satisfy the requests of the receiving terminals $R_2$ through $R_n$ in the same way as the case of the receiving terminal $R_1$. The sending side boundary device $EN_0$ sends the setup message SETUP to the ATM switch in order to establish ATM connections to the respective receiving side boundary devices $EN_2$ through $EN_n$ to which the receiving terminals $R_2$ through $R_n$ belong.

P14: The ATM switch which has received the setup message transfers this message to the boundary devices $EN_2$ through $EN_n$.

P15: The boundary devices $EN_2$ through $EN_n$ which have received the setup message return a connection acknowledgment message CONNECT to the ATM switch.

P16: The ATM switch which has received the connection acknowledgment message transfers this message to the boundary device $EN_0$.

P17: The boundary device $EN_0$ which has received the connection acknowledgment message transfers the resource reservation messages from the receiving terminals $R_2$ through $R_n$ to the sending terminal S.

FIG. 9 principally shows the operations for establishing point-to-point connections between the sending side boundary device $EN_0$ and the respective receiving side boundary devices $EN_1$ through $EN_n$. Also the operations for establishing a point-to-multipoint connection are similar. For the operations for establishing a point-to-multipoint connection, a leaf addition message ADD PARTY and a leaf addition acknowledgment message ADD PARTY ACK are used as will be described later.

As described above, with the root-initiated connection establishment, a sending side boundary device receives resource reservation messages from all of receiving terminals, determines an optimum ATM connection to be provided based on the requests, and establishes the ATM connection. Since the sending side boundary device performs the entire control from the operation for holding the information of a connection state till the operation for establishing a connection, management is easy to be made with this method. Especially, an ATM point-to-multipoint connection can be fundamentally established only from a sending side. Therefore, the route-initiated method is superior also in this point.

Provided next is the explanation about entry-type connection establishment with which a predetermined amount of entry time is preset when a root-initiated connection is established. With this method, a sending side boundary device does not immediately start to establish a connection when the initial resource reservation message among those from a plurality of receiving terminals arrives at the sending side boundary device, but starts to establish a connection after waiting for a particular amount of reservation acceptance entry time with a timer. In this case, one entry timer is prepared for each data flow (namely, for each path message) within the sending side boundary device.

By way of example, when a sender multicasts data such as a commercial program to a plurality of receivers (users), a path message may be periodically sent to the plurality of receivers as advertising information of the program in some cases. In this case, the same path message is repeatedly transferred for one program. When a receiver desires to receive the program, he or she instructs the receiving terminal to send a resource reservation message.

Accordingly, all of receiving terminals which have received the path message do not immediately return a resource reservation message, and there is a time lag between the arrivals of a plurality of resource reservation messages at the sending side boundary device. A predetermined amount of time is therefore arranged to accept the plurality of resource reservation messages altogether.

Figure 10:
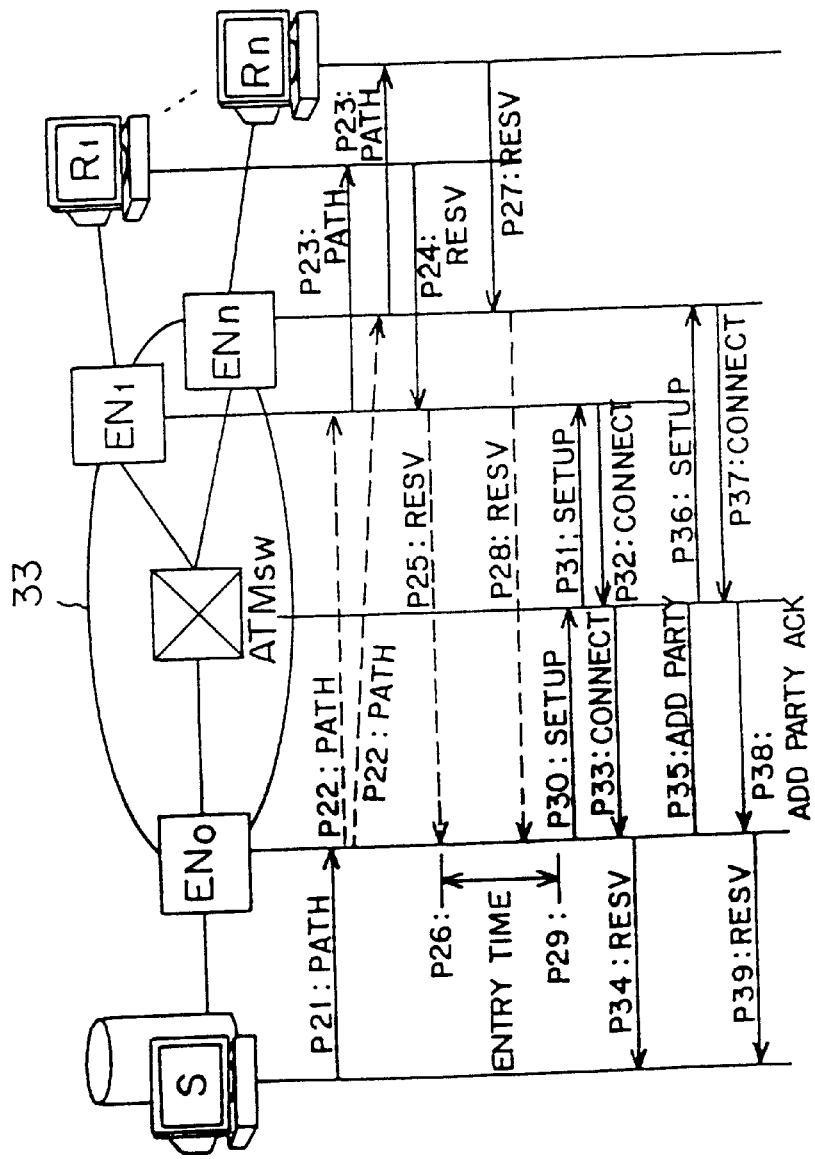
FIG. 10 shows the sequence for establishing an entry-type connection.

FIG. 10 shows the sequence for establishing an entry-type connection. In this example, a point-to-multipoint connection is established within the ATM network 33 according to the following sequence.

P21: A path message PATH describing a transmission traffic characteristic is sent from the sending terminal S to all of the receiving terminals $R_1$ through $R_n$ in a session by using multicast addresses.

P22: The path message is transferred to the receiving side boundary devices $EN_1$ through $EN_n$ over the control message connection within the ATM network 33.

P23: The path message arrives at all of the receiving terminals $R_1$ through $R_n$.

P24: A resource reservation message RESV from the receiving terminal $R_1$ arrives at the boundary device $EN_1$.

P25: The resource reservation message from the boundary device $EN_1$ arrives at the sending side boundary device $EN_0$ fundamentally over the same route as that of the path message.

P26: When the resource reservation message from the receiving terminal $R_1$ arrives at the boundary device $EN_0$ as the first request, an entry timer is started and entry acceptance is started.

P27: Resource reservation messages RESVs from the respective receiving terminals $R_2$ through $R_n$ arrive at the boundary devices $EN_2$ through $EN_n$.

P28: The resource reservation messages from the boundary devices $EN_2$ through $EN_n$ arrive at the sending side boundary device $EN_0$ fundamentally over the same route as that of the path message.

P29: The entry timer expires, and the entry acceptance in this time is terminated. The operations for establishing a connection within the ATM network 33 are started in response to the accepted requests.

P30: The sending side boundary device $EN_0$ first sends a setup message SETUP to the ATM switch in order to establish an ATM connection to the receiving side boundary device $EN_1$ to which the receiving terminal $R_1$ belongs.

P31: The ATM switch which has received the setup message transfers this message to the boundary device $EN_1$.

P32: The boundary device $EN_1$ which has received the setup message returns a connection acknowledgment message CONNECT to the ATM switch.

P33: The ATM switch which has received the connection acknowledgment message transfers this message to the boundary device $EN_0$.

P34: The boundary device which has received the connection acknowledgment message transfers the resource reservation message from the receiving terminal $R_1$ to the sending terminal S.

P35: The sending side boundary device $EN_0$ sends a leaf addition message ADD PARTY to the ATM switch in order to add each of the receiving side boundary devices $EN_2$ through $EN_n$, to which the receiving terminals $R_2$ through $R_n$ belong, to the established connection as a leaf.

P36: The ATM switch which has received the leaf addition message sends a setup message SETUP to the boundary devices $EN_2$ through $EN_n$.

P37: The boundary devices $EN_2$ through $EN_n$ which have received the setup message return a connection acknowledgment message CONNECT to the ATM switch.

P38: The ATM switch which has received the connection acknowledgment message sends a leaf addition acknowledgment message ADD PARTY ACK to the boundary device $EN_0$.

P39: The boundary device $EN_0$ which has received the leaf addition acknowledgment message transfers the resource reservation messages from the receiving terminals $R_2$ through $R_n$ to the sending terminal S.

In FIG. 10, the entry timer is started when the resource reservation message from the receiving terminal $R_1$ arrives. Normally, however, the entry timer is started when the first reservation message arrives from any of the receiving terminals $R_1$ through $R_n$. Then, the sending side boundary device $EN_0$ determines the connection to be established based on all of the resource reservation messages that the sending side boundary device $EN_0$ accepts within the particular amount of entry time, and establishes the determined connection.

Resource requests from a plurality of receiving terminals can be altogether processed by arranging an entry timer as described above, thereby reducing meaningless connection reestablishment. Accordingly, respective types of connection control messages flowing within a network can be reduced, so that also the processing loads on intra-network devices can be reduced.

Especially, when the number of resource reservation messages is very large, this method is considered to be effective. This is because the load on the sending side boundary device and the number of control messages flowing through the lines of the ATM network 33 can be reduced with this method. Furthermore, use of the entry time can absorb the bursting nature caused by the concentration of request messages from receiving terminals at a start/end time of a multicast session, etc. However, there is a possibility that a receiver must wait by the entry time at its maximum until a connection is started to be established.

FIG. 11 exemplifies the configuration of the sending side boundary device $EN_0$ performing such entry-type connection establishment. The boundary device shown in FIG. 11 comprises a cell receiving unit 41, an RSVP message processing unit 42, an IP-to-ATM address conversion table memory 43, an entry controlling unit 44, an entry timer 45, an ATM resource determining unit 46, an ATM connection controlling unit 47, a cell sending unit 48, a cell-to-packet converting unit 49, and a packet sending unit 50.

The cell receiving unit 41 receives the IP packet from a receiving side boundary device as an ATM cell, and transfers the message included in the cell to the RSVP message processing unit 42. If the received message is a resource reservation message, the RSVP message processing unit 42 notifies the entry controlling unit 44 of the destination IP address (flow identifier) and the resource reservation information, which are included in the message.

Additionally, the RSVP message processing unit 42 stores the destination IP address and the IP address of the next hop (downstream side) as a path state. The RSVP message processing unit 42 obtains from the path state the IP address of the next hop (that is, the IP address of the receiving side boundary device) based on the destination IP address included in the message, and notifies the IP-to-ATM address conversion table memory 43 of the obtained address. The text of the message is transferred to the cell-to-packet converting unit 49.

The IP-to-ATM address conversion table memory 43 outputs to the ATM connection controlling unit 47 the ATM address (that is, the ATM address of the receiving side boundary device), which corresponds to the IP address notified from the RSVP message processing unit 42.

The entry controlling unit 44 uses the IP address received from the RSVP message processing unit 42 as a flow identifier, and starts the entry timer 45 for each flow identifier. The entry controlling unit 44 then collects the resource reservation information having the corresponding flow identifier during the entry time. The entry timer 45 includes a plurality of counters, and measures the entry time by using a counter which differs depending on each flow identifier to be processed.

The entry controlling unit 44 processes the collected resource reservation information according to a predetermined algorithm during the entry time or after the entry time elapses, and notifies the ATM resource determining unit 46 of the result of the processing as resource reservation information.

The ATM resource determining unit 46 determines whether or not to accept an ATM connection for the resource reservation information from the entry controlling unit 44, and sends an acceptance notification to the ATM connection controlling unit 47 if the ATM connection can be accepted.

The ATM connection controlling unit 47 controls the establishment of an ATM connection, generates an ATM signaling message at the timing of receiving the acceptance notification from the ATM resource determining unit 46, and transfers the generated message to the cell sending unit 48. The cell sending unit 48 sends an ATM cell to the receiving side.

The cell-to-packet converting unit 49 converts the message in the form of the cell, which is received from the RSVP message processing unit 42, into an IP packet and transfers the IP packet to the packet sending unit 50. The packet sending unit 50 sends the IP packet received from the cell-to-packet converting unit 49 to the sending terminal.

The entry controlling unit 44 and the ATM resource determining unit 46 closely relate to the policing capability for determining an optimum connection, and normally comprise a processing unit such as a microprocessor, etc. The processing unit provides a variety of policing capabilities to be described later by executing the program stored in a memory. Note that the entry controlling unit 44 and the ATM resource determining unit 46 may be configured as hardware circuits implementing similar capabilities.

By the way, as an entry-type connection establishment systems, 4 systems are considered: a system for establishing a single point-to-multipoint connection; a system for establishing a plurality of point-to-multipoint connections; a system for establishing a plurality of point-to-point connections; and a system for establishing point-to-multipoint and point-to-point connections. These systems are explained below.

In the system for establishing a single point-to-multipoint connection, a sending side boundary device accepts resource requests from receiving terminals during entry time for one session, and establishes a single point-to-multipoint connection.

The sending side boundary device starts an entry timer at the timing of accepting the initial resource reservation message from a receiving terminal, and accepts other resource reservation messages for a predetermined amount of time. When the entry timer expires, the sending side boundary device establishes one point-to-multipoint connection which satisfies all of the resource requests accepted during the entry time.

Figure 12:
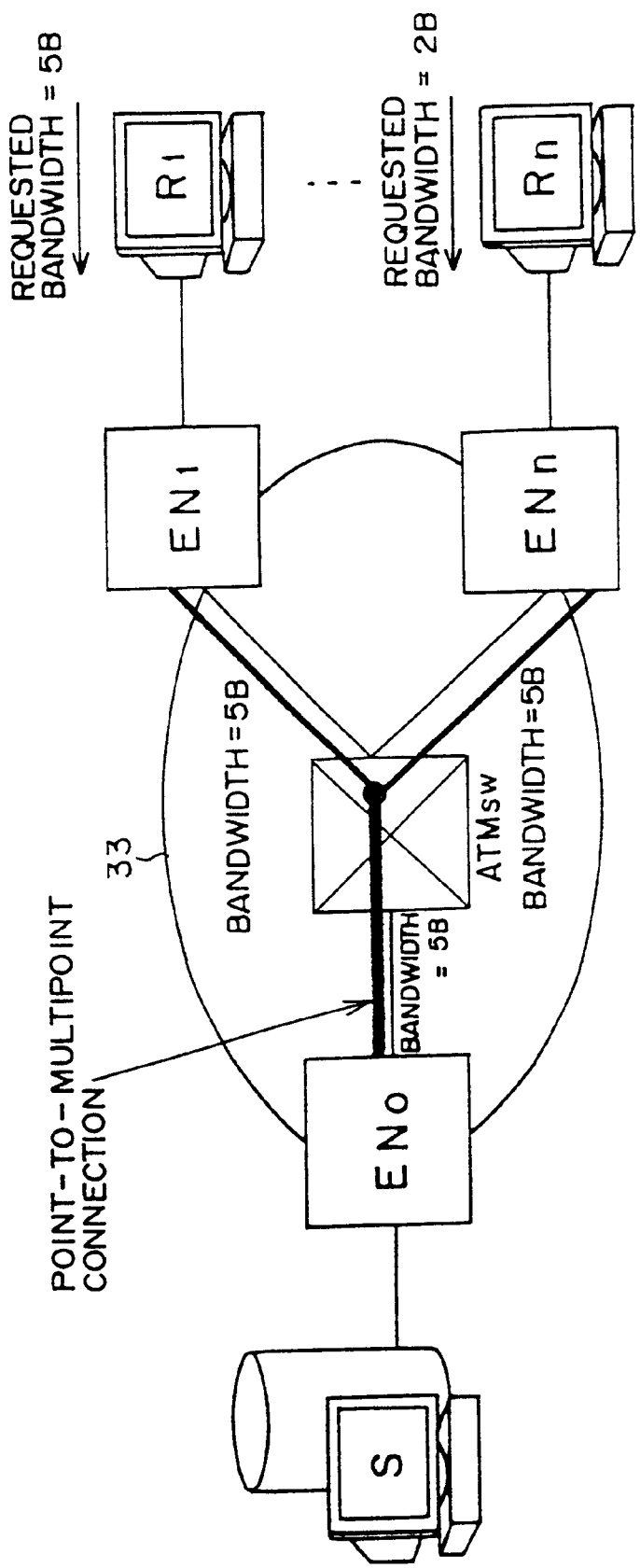
FIG. 12 shows a single point-to-multipoint connection.

FIG. 12 exemplifies the operations of such a system. This figure assumes that resource requests are issued from a plurality of receiving terminals $R_1$ through $R_n$. For example, the bandwidth request of 5B is issued from the receiving terminal $R_1$, and the bandwidth request of 2B is issued from the receiving terminal $R_n$. The sending side boundary device $EN_0$ provides a service with a single point-to-multipoint connection in response to these bandwidth requests. Here, the point-to-multipoint connection having the bandwidth of 5B is established between the boundary device $EN_0$ and the boundary devices $EN_1$ through $EN_n$.

Because this system is an entry type, it can determine a bandwidth suitable for all of a plurality of requests. Therefore, a wasteful operation for reestablishing a connection once established can be omitted.

Additionally, since this system utilizes a single point-to-multipoint connection for one session, the number of VPI/VCIs used within the ATM network 33 can be reduced.

Furthermore, bandwidth resources can be saved on a link closer to a sending side boundary device. Actually, the bandwidth of 5B is used on the link between the boundary device $EN_0$ and the ATM switch in FIG. 12.

Supposing that point-to-point connections are established for the respective boundary devices $EN_1$ and $EN_n$, the connections respectively having the bandwidths of 5B and 2B are required. Only these two connections use the bandwidth of 7B (=5B+2B) between the boundary device $EN_0$ and the ATM switch. Accordingly, the bandwidth of 2B can be reduced by using the single point-to-multipoint connection.

However, since a value equal to or larger than the maximum value of all of requested bandwidths is set as the bandwidth of a connection in the ATM network 33, the bandwidth resources on the link closer to the receiving side boundary device can possibly be wasted. In FIG. 12, the connection having the bandwidth of 5B is provided for the requested bandwidth of 2B on the link between the ATM switch and the boundary device $EN_n$. Therefore, 3B is wasted.

The method for determining the bandwidth of a point-to-multipoint connection established by this system, and the details of the method for changing a connection will be described later.

Next, the system for establishing a plurality of point-to-multipoint connections is a system in which a sending side boundary device accepts resource requests from receiving terminals during entry time, and establishes a plurality of point-to-multipoint connections.

The sending side boundary device starts an entry timer at the timing of accepting the initial resource reservation message from a receiving terminal, and accepts other resource reservation messages for a predetermined amount of time. When the entry timer expires, the sending side boundary device establishes a plurality of point-to-multipoint connections which satisfy all of the resource requests accepted during the entry time.

At this time, the sending side boundary device establishes a new connection with a message SETUP according to a determination policy, or adds a leaf to an existing point-to-multipoint connection with a message ADD PARTY. Details of the determination policy will be described later.

Figure 13:
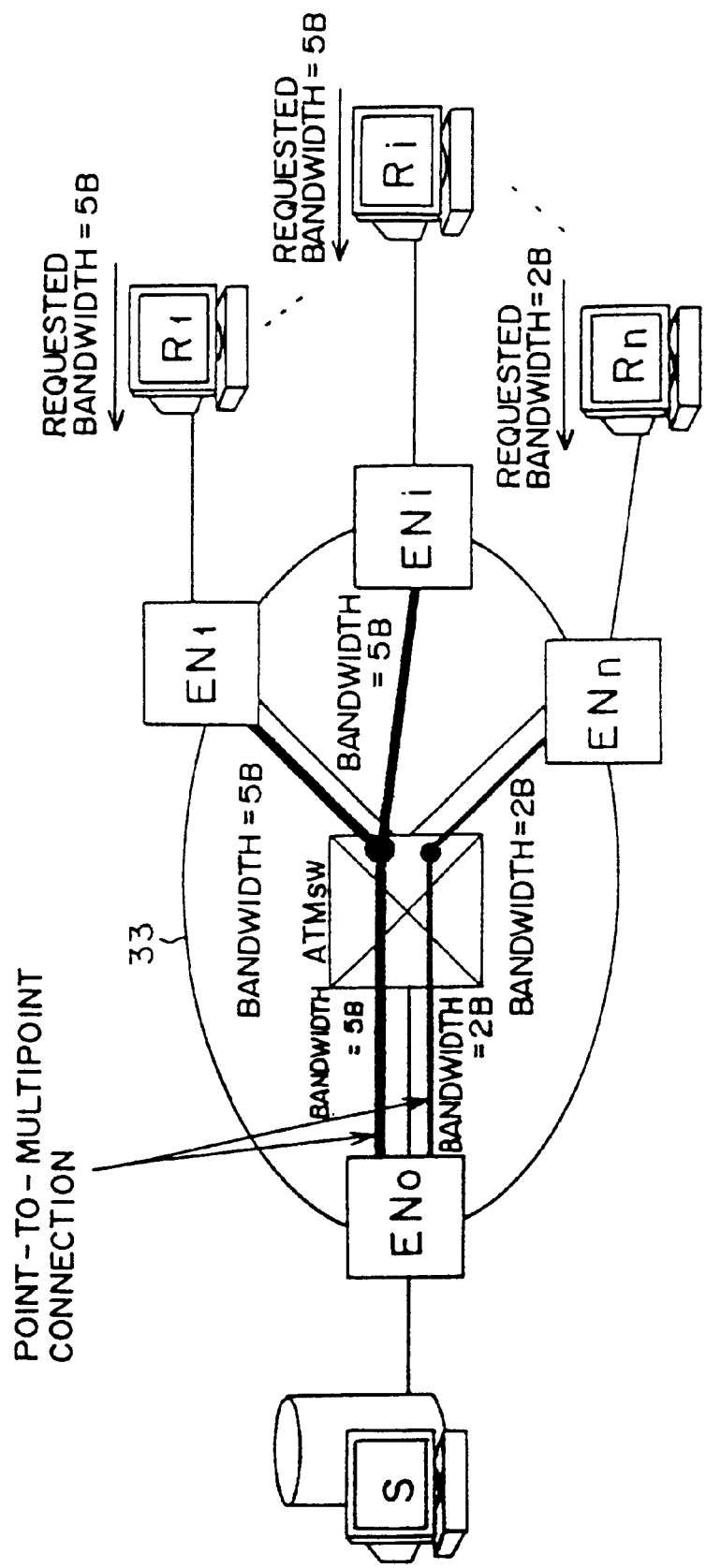
FIG. 13 shows a plurality of point-to-multipoint connections.

FIG. 13 exemplifies the operations performed by such a system. In this figure, the sending side boundary device $EN_0$ accepts resource requests from the receiving side boundary devices $EN_1$, $EN_i$ (i=2, . . . , n−1), $EN_n$. Here, the sending side boundary device $EN_0$ accepts the bandwidth requests of 5B from the receiving side boundary devices $EN_1$ and $EN_i$, and the bandwidth request of 2B from the receiving side boundary device $EN_n$.

The sending side boundary device $EN_0$ allocates a point-to-multipoint connection having the bandwidth of 5B to the boundary devices $EN_1$ and $EN_i$ which request the same bandwidth, and a point-to-multipoint connection having the bandwidth of 2B to the boundary device $EN_n$ which requests the bandwidth of 2B.

This system consumes more VPI/VCIs than those used by the system providing a service with a single point-to-multipoint connection. However, since this system allocates connections suitable for the bandwidths requested from receiving terminals, resources can be effectively used. For instance, with this system, the bandwidth resource can be saved on the link closer to the receiving side boundary device compared with the system shown in FIG. 12. As a result, the probability that a resource request is accepted becomes higher, which leads to a decrease in a call rejection possibility.

In FIG. 13, the links respectively having the same bandwidths as requested bandwidths are provided from the ATM switch to the receiving side boundary devices $EN_1$, $EN_i$, and $EN_n$. Accordingly, the bandwidth of 3B (=5B−2B) is saved between the ATM switch and the boundary device $EN_n$ compared with the system shown in FIG. 12. However, the bandwidth of 2B is wasted between the boundary device $EN_0$ and the ATM switch compared with the system shown in FIG. 12.

Next, the system for establishing a plurality of point-to-point connections is a system in which a sending side boundary device accepts resource requests from receiving terminals during entry time for one session, and establishes a plurality of point-to-point connections.

This system allocates point-to-point connections in an acceptance order of resource requests after the start of the acceptance. Although VPI/VCIs can possibly be wasted with this method, no determination policy is needed. This system is simple, and is the most fundamental service method in the ATM network 33. Accordingly, this system can be considered as a possible option also in an RSVP multicast service if the number of resource requests is small.

Figure 14:
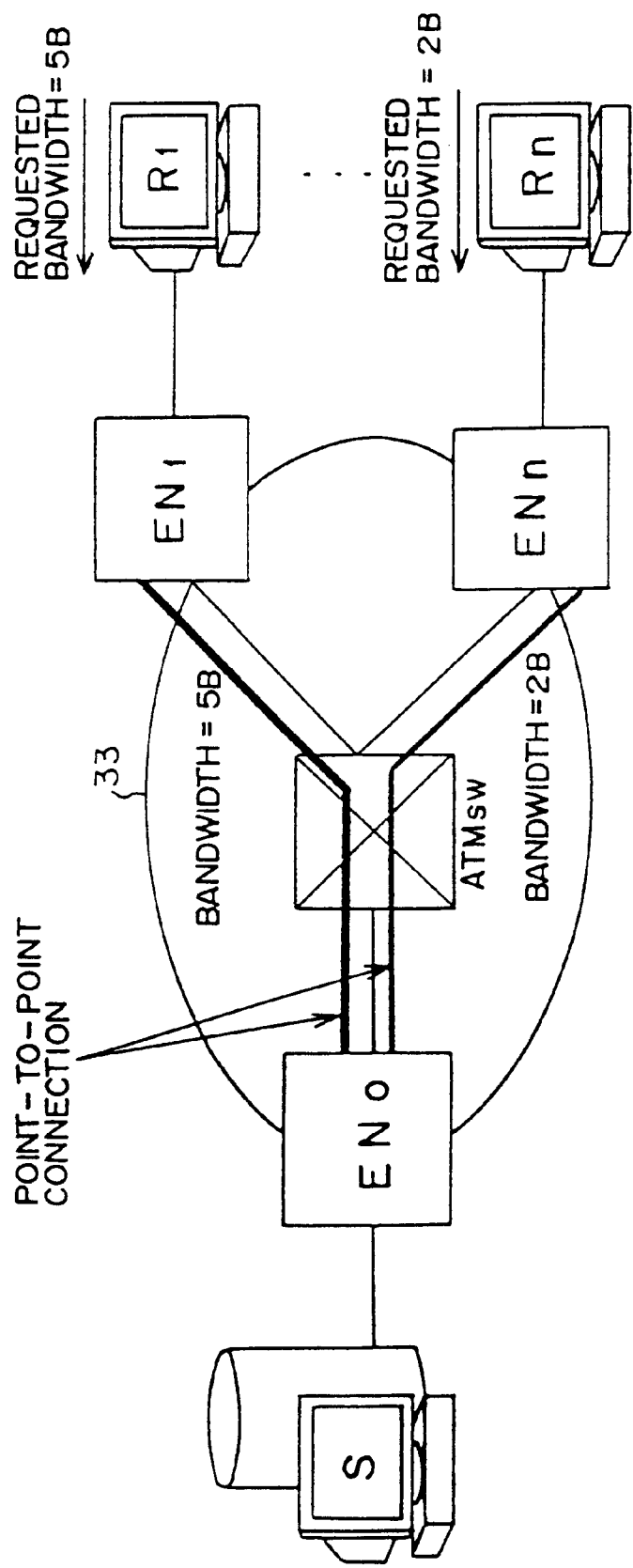
FIG. 14 shows a plurality of point-to-point connections.

FIG. 14 exemplifies the operations performed by such a system. In this figure, resource requests are issued from a plurality of receiving terminals $R_1$ through $R_n$, and point-to-point connections are established according to the respectively requested bandwidths. Assume that the bandwidth requests of 5B and 2B are respectively issued from the receiving terminals $R_1$ and $R_n$. The sending side boundary device $EN_0$ establishes a connection having a bandwidth of 5B between the boundary devices $EN_0$ and $EN_1$, and a connection having a bandwidth of 2B between the boundary devices $EN_0$ and $EN_n$.

Figure 15:
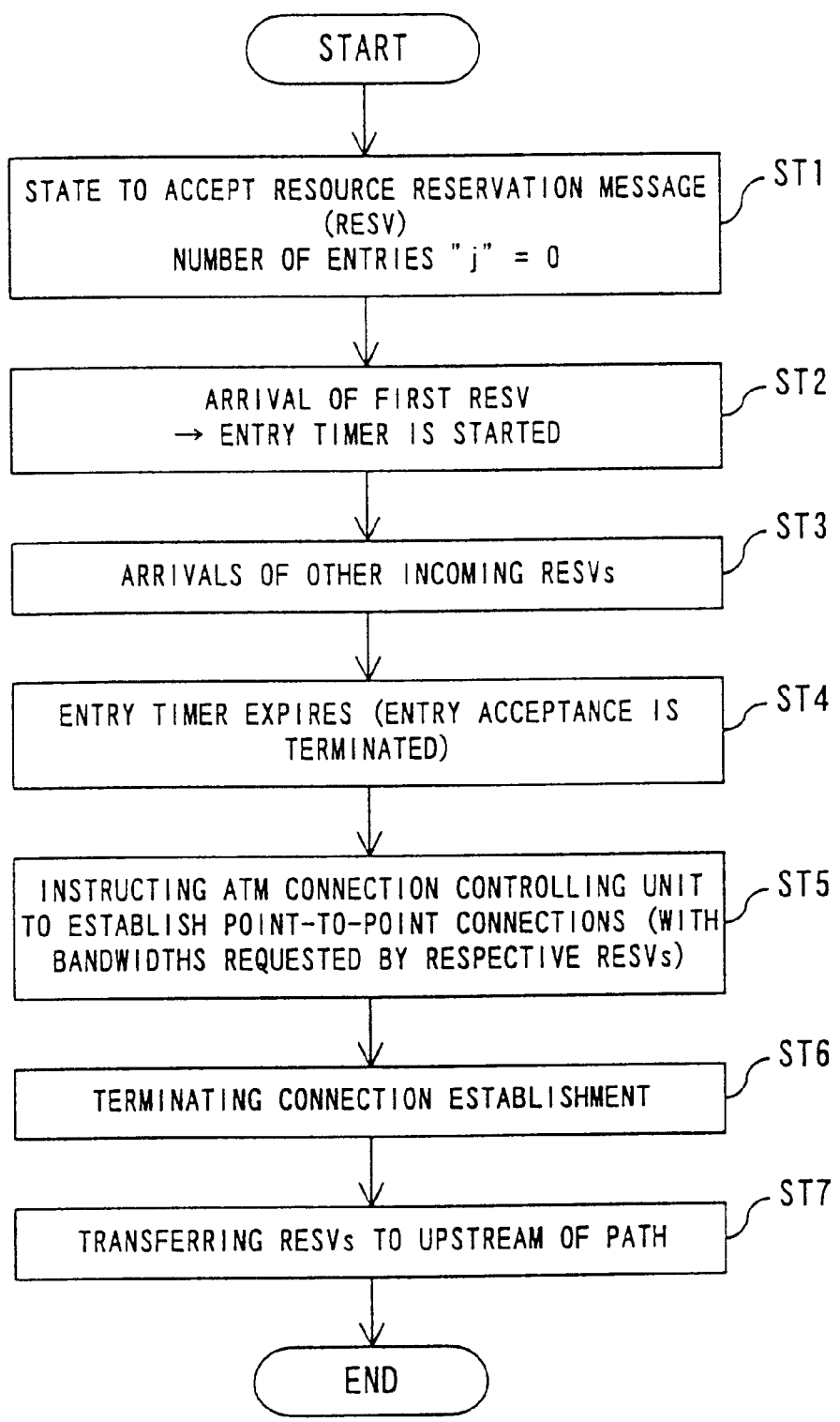
FIG. 15 is a flowchart showing the first process performed by a sending side boundary device.

FIG. 15 is a flowchart showing the operations performed by the boundary device $EN_0$ in this system. After sending a path message to the receiving terminals $R_1$ through $R_n$, the boundary device $EN_0$ enters the state to accept a resource reservation message RESV (step ST1). Upon arrival of the first resource reservation message, a count operation is started by the entry timer 45 (step ST2). Then, other resource reservation messages arrive (step ST3). When the count operation is terminated by the entry timer 45, the acceptance of resource reservation messages is terminated (step ST4).

Next, the entry controlling unit 44 instructs the ATM connection controlling unit 47 to establish a point-to-point connection via the ATM resource determining unit 46. The ATM connection controlling unit 47 then establishes a connection with a bandwidth requested by each resource reservation message (step ST5). When the establishment of the connections corresponding to all of the resource reservation messages is terminated (step ST6), the resource reservation messages are transferred by the packet sending unit 50 to the upstream of the path (step ST7). Here, the operations are completed.

This system is a system for establishing a new point-to-point connection each time a resource reservation message is accepted from a new receiving terminal for one session. This is the most natural system to establish an ATM connection. Since there is no need to determine whatever connection to be established with this system, the connection establishment operations are simple. However, a waste in VPI/VCIs does not seem to be avoided.

Next, the system which mixes and uses point-to-multipoint and point-to-point connections is a system in which a sending side boundary device accepts resource requests from receiving terminals during entry time for one session, and establishes pluralities of point-to-multipoint and point-to-point connections.

This system accommodates identical or similar resource requests in a point-to-multipoint connection, and establishes a point-to-point connection in response to an exceptional/unique request. As a result, network resources can be effectively used. This is a system positioned at the middle of the system of FIG. 13 for establishing only point-to-multipoint connections and the system of FIG. 14 for establishing only point-to-point connections if these systems are assumed to be two extreme systems.

Figure 16:
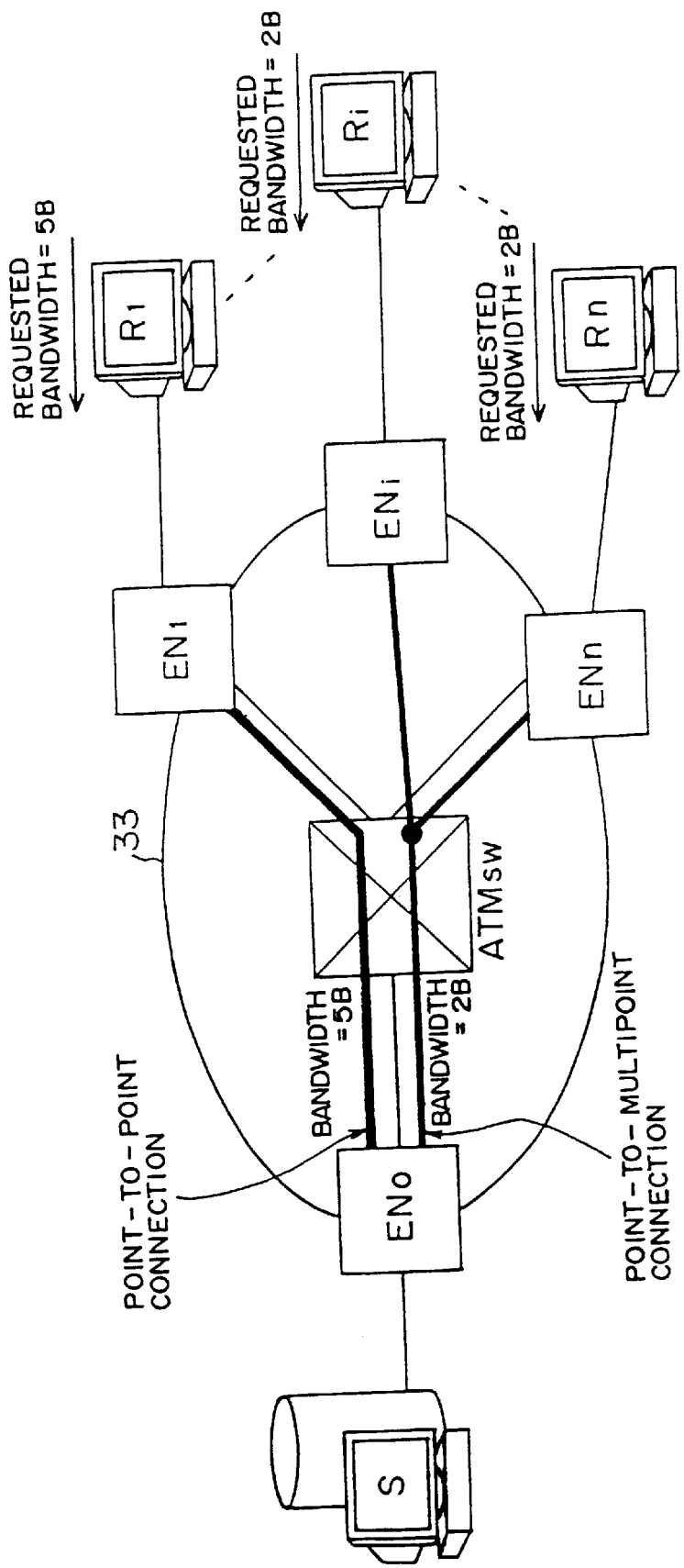
FIG. 16 shows the mixed use of point-to-multipoint and point-to-point connections.

FIG. 16 exemplifies the operations performed by such a system. In this figure, the sending side boundary device $EN_0$ accepts the bandwidth request of 5B from the boundary device $EN_1$, the bandwidth request of 2B from the boundary device $EN_i$ (i=2, . . . , n−1), and the bandwidth request of 2B from the boundary device $EN_n$. The sending side boundary device $EN_0$ allocates a point-to-multipoint connection having the bandwidth of 2B to the boundary devices $EN_i$ and $EN_n$ which request the same bandwidth, and a point-to-point connection having the bandwidth of 5B to the boundary device $EN_1$ which solely requests the different bandwidth of 5B.

Since identical or similar resource requests are accommodated in a point-to-multipoint connection and a point-to-point connection is allocated to an exceptional/unique request with this system, many receiver groups can be efficiently accommodated. Additionally, the sending side boundary device can establish an optimum connection in response to a plurality of resource requests by following a suitable determination policy. Details of the determination policy will be described later.

Provided next is the explanation about the details of the method for determining the bandwidth of a point-to-multipoint connection established by the system shown in FIG. 12, and the method for changing a connection.

The types and the sizes of parameters of resource requests from receiving terminals belonging to an IP network depend on requested data traffic characteristics (QOS guarantee service). The data traffic as a service falls into two major types: data traffic that a sender desires to provide, and data traffic that a receiver actually requests to the above described traffic.

Viewing from an ATM network side, the method for determining a bandwidth falls into two types: a method for establishing a connection beforhand in a maximum bandwidth where cells can possibly flow based on the data traffic characteristics requested by a sender (a path message in the RSVP); and a method for establishing a bandwidth faithfully to a traffic characteristic requested by a receiver.

Here, proposed first is a system in which a sending side boundary device sets the bandwidth of a connection based on a service requested by a receiver, that is, a resource reservation message. In this system, the sending side boundary device establishes a single point-to-multipoint connection by using the maximum value of the bandwidths requested by all of resource reservation messages received from receiving terminals, when starting to establish a connection based on the resource requests from all of the receiving terminals, which are accepted during entry time.

Figure 17:
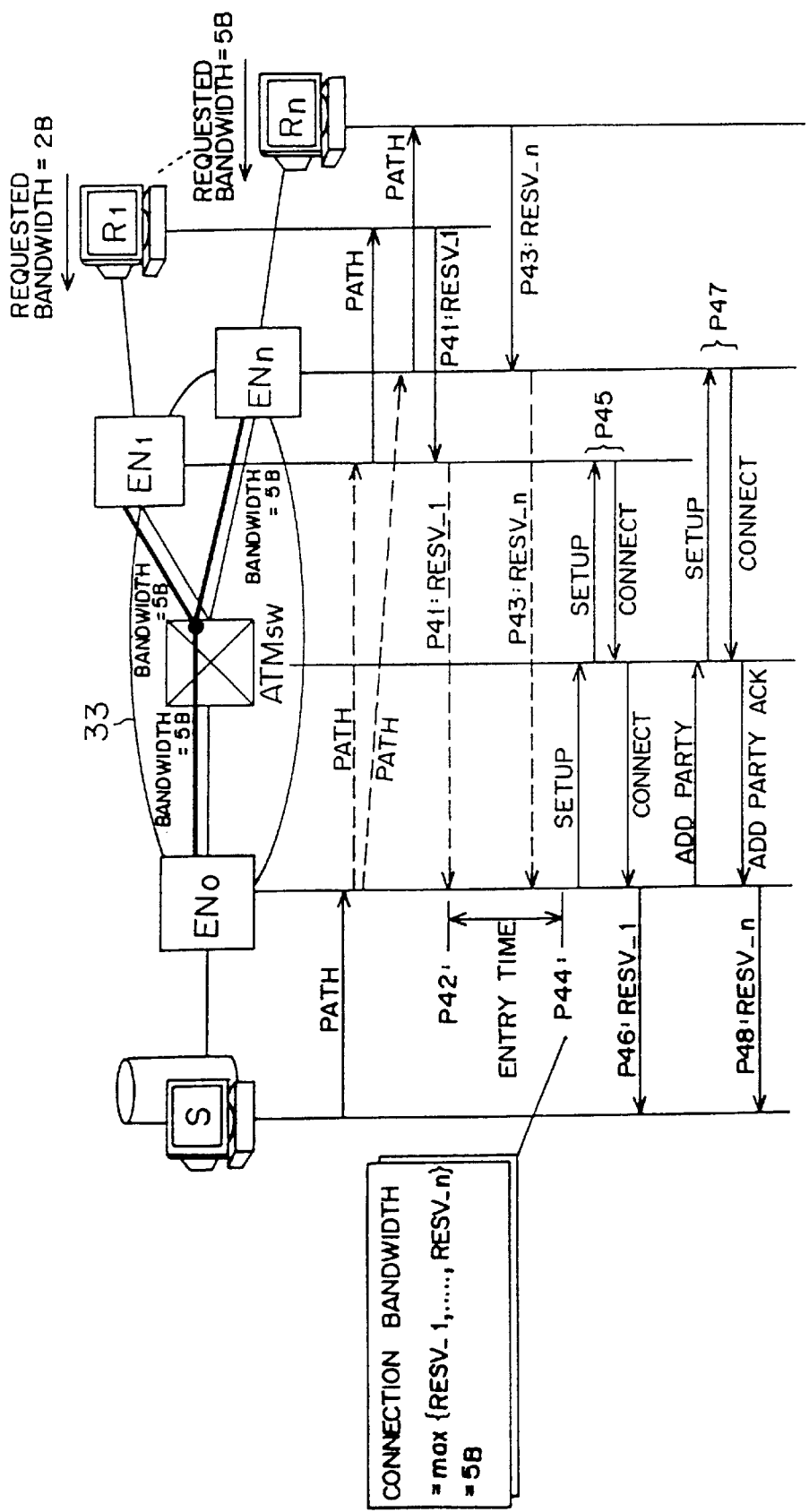
FIG. 17 shows the first sequence for determining a bandwidth.

FIG. 17 shows such a connection establishment sequence. This figure assumes the state where the respective receiving terminals $R_1$ through $R_n$ receive an RSVP path message PATH from the sending terminal S. In this state, a connection is established according to the following sequence.

P41: A resource reservation message RESV_1 is sent from the receiving terminal $R_1$, and the bandwidth request of 2B from the receiving terminal $R_1$ arrives at the sending side boundary device $EN_0$ via the boundary device $EN_1$.

The resource reservation message generated based on a path message describes the traffic characteristic requested by a receiver. Here, a peak rate "p" stipulated as Receiver TSPEC (Traffic SPECification) is recognized to be a requested bandwidth. In FIG. 17, the value of the peak rate "p" described in the message RESV_1 is set to 2B.

The message RESV_1 is transferred to the boundary device $EN_0$ via a control message connection (indicated by a dotted line arrow), which is prepared beforehand and is used to send the path message in the ATM network 33. The boundary device $EN_1$ can learn the IP address of the boundary device $EN_0$ by referencing the flow state based on the flow identifier of the message RESV_1 as described above. The boundary device $EN_1$ learns the ATM address of the boundary device $EN_0$ from the IP-to-ATM address conversion table, and transfers the message RESV_1.

P42: The sending side boundary device $EN_0$ starts an entry timer at the timing of receiving the message RESV_1 from the receiving terminal $R_1$.

P43: The bandwidth request (RESV_n) of 5B from the receiving terminal $R_n$ is accepted during entry time.

P44: When the entry timer expires, the maximum bandwidth among the bandwidth requests accepted during the entry time is set as the bandwidth of the point-to-multipoint connection to be established. When the resource reservation messages RESV_1 through RESV_n from the receiving terminals $R_1$ through $R_n$ are accepted during the entry time, the bandwidth of the connection is determined by max{RESV_1, . . . , RESV_n}. In this example, the bandwidth is set to 5B.

P45: The sending side boundary device $EN_0$ establishes a point-to-multipoint connection. Here, a connection having the bandwidth of 5B is established between the receiving side boundary device $EN_1$ and the device $EN_0$ itself with the above described signaling procedure.

P46: The boundary device $EN_0$ transfers the message RESV_1 to the sending terminal S the same time the connection between the boundary devices $EN_0$ and $EN_1$ is established.

P.47: The link having the bandwidth of 5B to the boundary device $EN_n$ is added to the established point-to-multipoint connection with the above described signaling procedure using a message ADD PARTY.

P48: The boundary device $EN_0$ transfers the message RESV_n to the sending terminal S the same time the connection between the boundary devices $EN_0$ and $EN_n$ is established.

With such a system, the connection resources (such as a VCI, a bandwidth, etc.) between the sending side boundary device $EN_0$ and the ATM switch can be saved. However, part of the bandwidth of the link between the ATM switch and the receiving side boundary device can possibly become too large. In FIG. 17, the bandwidth between the ATM switch and the receiving side boundary device $EN_1$ becomes larger than the requested bandwidth by 3B (=5B−2B).

Next, in the system for setting a bandwidth based on the data traffic characteristic declared by a sender, the bandwidth of a connection is set based on the path message sent by the sender.

Figure 18:
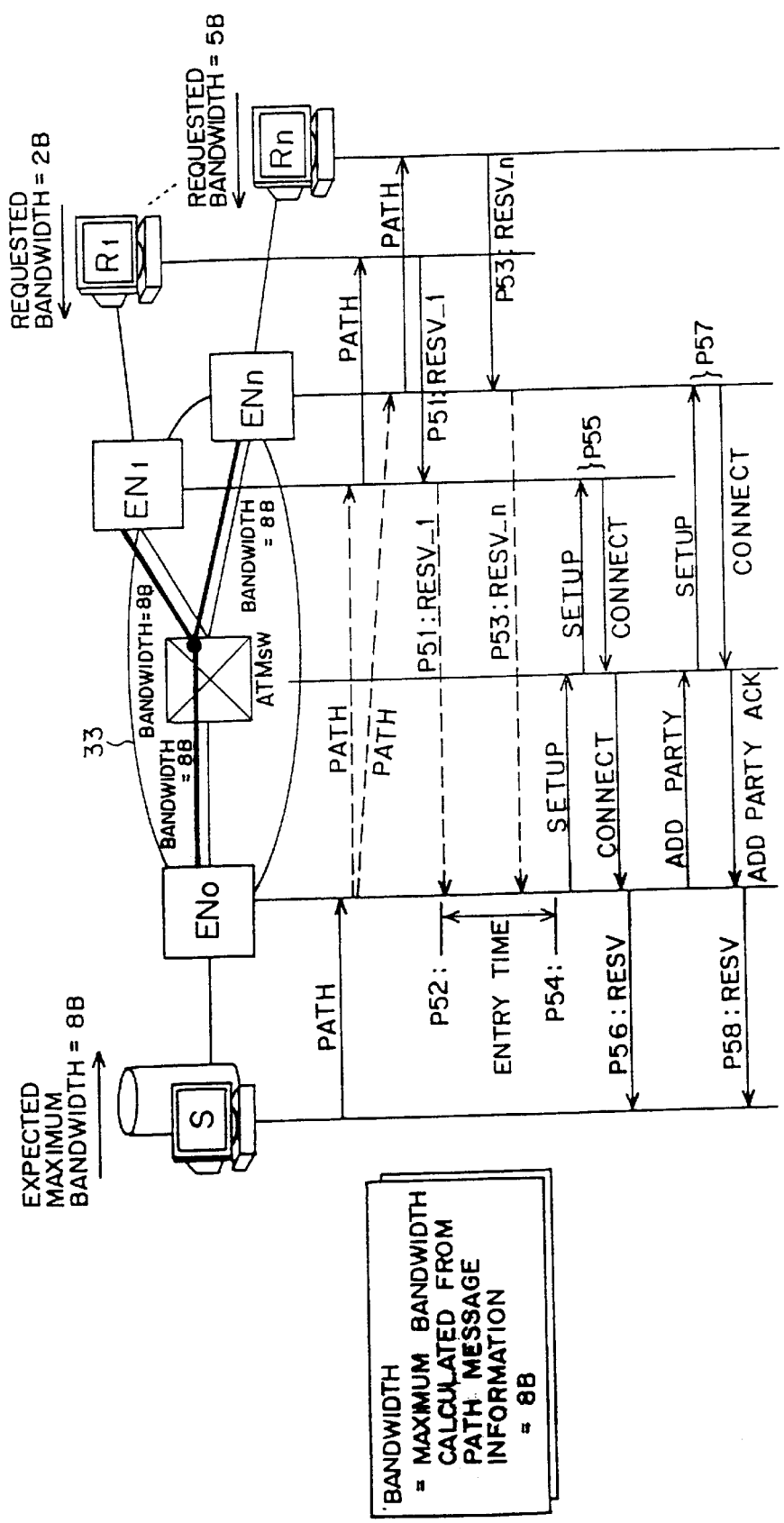
FIG. 18 shows the second sequence for determining a bandwidth.

FIG. 18 shows a connection establishment sequence by such a system. In this figure, the data traffic characteristic from the sending terminal S is sent as a path message PATH to the receiving terminals $R_1$ through $R_n$. The path message describes the traffic characteristic of data to be sent as TSPEC. In this case, a connection is established according to the following sequence.

P51: A resource reservation message RESV_1 is sent from the receiving terminal $R_1$, and the bandwidth request of 2B from the receiving terminal $R_1$ arrives at the sending side boundary device $EN_0$ via the boundary device $EN_1$.

P52: The sending side boundary device $EN_0$ starts an entry timer at the timing of receiving the message RESV_1 from the receiving terminal $R_1$.

P53: The bandwidth requests of 5B from the receiving terminal $R_n$ (RESV_n) is accepted during entry time.

P54: When the entry timer expires, the boundary device $EN_0$ recognizes as the bandwidth of a connection to be established the maximum bandwidth expected to be required based on the information of the stored path message for the receiving terminal group whose bandwidth requests are accepted. Here, the peak rate "p" described in the path message from the sending terminal S is assumed to be used as the expected maximum bandwidth. In this example, the maximum bandwidth is set to 8B.

P55: The sending side boundary device $EN_0$ establishes a point-to-multipoint connection. Here, the connection having the bandwidth of 8B is established between the receiving side boundary device $EN_1$ which sends the initially accepted resource request and the sending side boundary device $EN_0$ with the above described signaling procedure.

P56: The boundary device $EN_0$ transfers the message RESV_1 to the sending terminal S the same time the connection between the boundary devices $EN_0$ and $EN_1$ is established.

P57: The link having the bandwidth of 8B to the boundary device $EN_n$ is added to the established point-to-multipoint connection with the above described signaling procedure using a message ADD PARTY.

P58: The boundary device $EN_0$ transfers the message RESV_n to the sending terminal S the same time the connection between the boundary devices $EN_0$ and $EN_n$ is established.

Since the maximum bandwidth is secured based on the traffic characteristic declared by a sender with this system, a newly requested bandwidth never becomes larger than an existing bandwidth when a new receiver is added. Therefore, this system has an advantage that reestablishment of an existing connection is not needed.

However, this system has a disadvantage from the viewpoint of an effective bandwidth use. Additionally, since it is difficult to determine the maximum bandwidth for a maximum delay guarantee service which must reference the parameters of receiver resource requests, attention must be paid when this system is utilized.

Provided next is the explanation about the details of the system for changing an established connection. Suppose that a connection is currently established in the system accommodating a session with a single point-to-multipoint connection. In this case, if a requested bandwidth is larger than the existing bandwidth when a sending side boundary device receives the resource request from a new receiver, the existing connection is reestablished.

In this system, the sending side boundary device periodically accepts resource requests. In other words, the sending side boundary device gets into the next entry upon termination of one entry so as to process resource requests which are periodically put into entries. The sending side boundary device reestablishes an existing point-to-multipoint connection upon acceptance of a new resource request of a bandwidth larger than the bandwidth of the existing connection in an arbitrary entry subsequent to the first entry.

Figure 19:
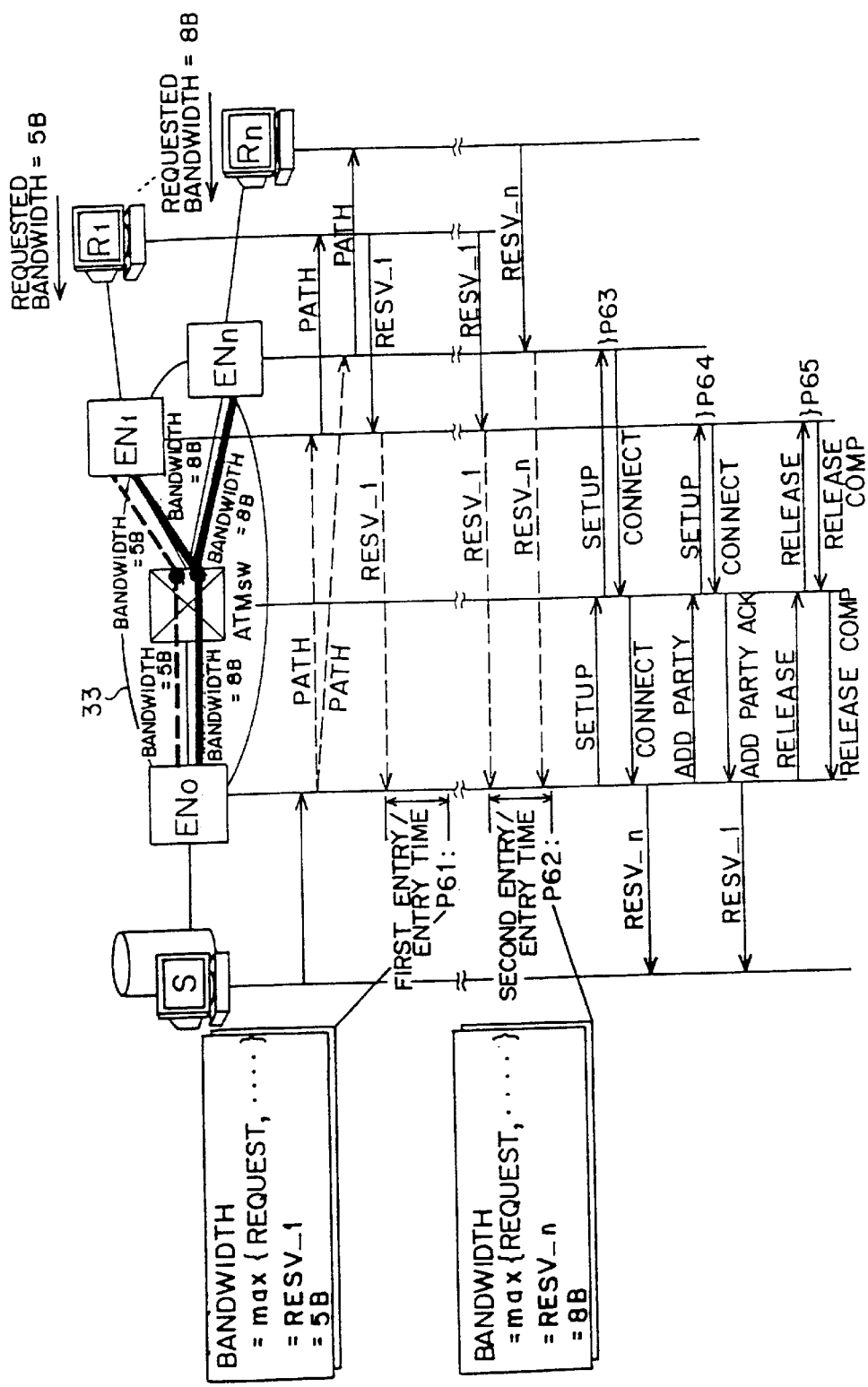
FIG. 19 shows the sequence for reestablishing a connection.

FIG. 19 shows such a connection reestablishment sequence. In this figure, a path message PATH periodically arrives at the respective receiving terminals $R_1$ through $R_n$ from the sending terminal S. In this case, a connection is reestablished according to the following sequence.

P61: The sending side boundary device $EN_0$ accepts the resource reservation message RESV_1 requesting the bandwidth of 5B from the receiving terminal $R_1$ in the first entry. When an entry time expires, the first entry is terminated. Then, a connection having the bandwidth of 5B is established between the boundary devices $EN_0$ and $EN_1$ (not shown in this figure).

P62: The sending side boundary device $EN_0$ continues to accept the resource reservation message RESV_1 requesting the bandwidth of 5B from the receiving terminal $R_1$ in the second entry. Then, the resource reservation message RESV_n requesting the bandwidth of 8B arrives at the sending side boundary device $EN_0$ from the receiving terminal $R_n$ via the boundary device $EN_n$.

When the entry timer expires, the boundary device $EN_0$ makes a comparison between the bandwidth requested by the arrived message and that of the existing connection in the same session. Here, since the newly requested bandwidth (8B) is larger than the bandwidth (5B) of the existing connection, the boundary device $EN_0$ starts to reestablish the connection.

P63: First of all, the sending side boundary device $EN_0$ establishes a new point-to-multipoint connection having the bandwidth of 8B between the boundary device $EN_n$ issuing the new request and the device $EN_0$ itself with the above described signaling procedure. Then, the sending side boundary device $EN_0$ transfers the message RESV_n to the sending terminal S.

P64: The sending side boundary device $EN_0$ then adds the boundary device $EN_1$ to the new connection having the bandwidth of 8B with the above described signaling procedure using a message ADD PARTY. The sending side boundary device $EN_0$, then transfers the message RESV_1 to the sending terminal S.

P65: The sending side boundary device $EN_0$ immediately releases the former connection having the bandwidth of 5B between the boundary devices $EN_0$ and $EN_1$ with a predetermined signaling procedure. Here, the boundary device $EN_0$ sends a release message RELEASE to the boundary device $EN_1$ via the ATM switch, while the boundary device $EN_1$ returns a release acknowledgment message RELEASE COMP to the boundary device $EN_0$ via the ATM switch.

In this system, consumption of the resources within the ATM network 33 can be suppressed to a certain level or lower not by adding a new connection but by reestablishing an existing connection. However, if the operations for reestablishing a connection frequently occur, the processing loads on the devices within the ATM network 33 increase. Accordingly, the amount of entry time must be adjusted.

Additionally, if the sending side boundary device receives a resource request from a new receiver, and if the requested bandwidth is smaller than an existing bandwidth, the link (leaf) corresponding to this request can be also added to the existing connection. In this system, a new link is added to an existing connection when a resource request of a bandwidth smaller than the bandwidth of the existing connection is accepted in an arbitrary entry subsequent to the first entry.

Figure 20:
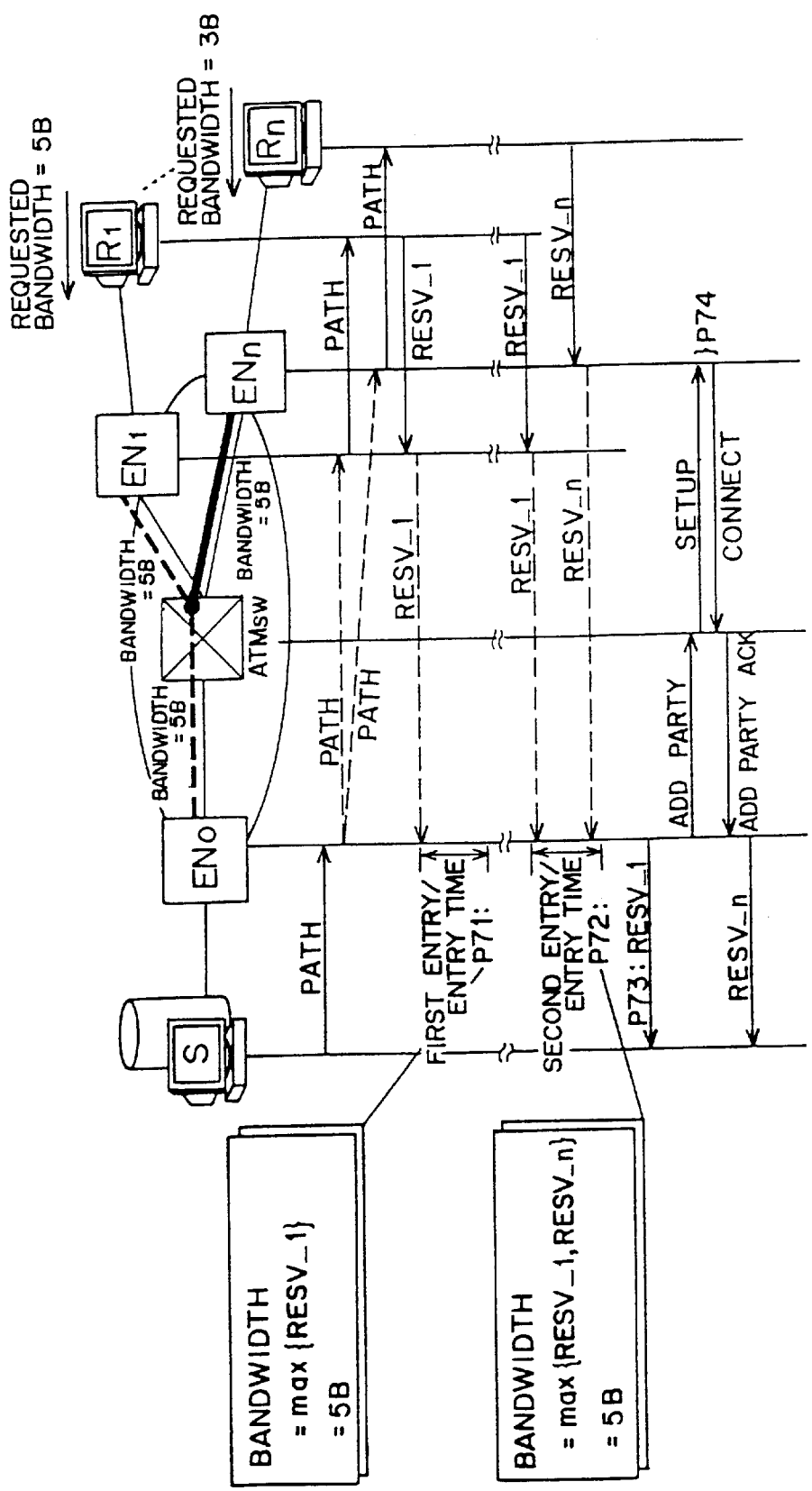
FIG. 20 shows the sequence for adding a leaf to a connection.

FIG. 20 shows such a connection reestablishment sequence. In this figure, a path message PATH periodically arrives at the respective receiving terminals $R_1$ through $R_n$ from the sending terminal S. In this case, a connection is changed according to the following sequence.

P71: The sending side boundary device $EN_0$ accepts the resource reservation message RESV_1 requesting the bandwidth of 5B from the receiving terminal $R_1$ in the first entry. When an entry timer expires, the first entry is terminated. Then, a connection having the bandwidth of 5B is established between the boundary devices $EN_0$ and $EN_1$ (not shown in this figure).

P72: The sending side boundary device $EN_0$ continues to accept the resource reservation message RESV_1 requesting the bandwidth of 5B from the receiving terminal $R_1$ in the second entry. At the same time, the resource reservation message RESV_n requesting the bandwidth of 3B arrives at the sending side boundary device $EN_0$ from the receiving terminal $R_n$ via the boundary device $EN_n$.

When the entry timer expires, the sending side boundary device $EN_0$ makes a comparison between the bandwidth requested by the arrived message and that of the existing connection in the same session. Here, the newly requested bandwidth (3B) is smaller than the bandwidth (5B) of the existing connection. Therefore, the sending side boundary device $EN_0$ starts to add the new receiver to the connection.

P73: Because the connection is not reestablished, the sending side boundary device $EN_0$ immediately transfers the message RESV_1 to the sending terminal S.

P74: The sending side boundary device $EN_0$ then adds the receiving side boundary device $EN_n$ to the existing connection having the bandwidth of 5B with the above described signaling procedure using a message ADD PARTY, and transfers the message RESV_n to the sending terminal S.

With this system, a new request can be satisfied only by adding a link to a connection. As a result, consumption of the resources within the ATM network 33 can be suppressed to a certain level or lower.

Figure 21:
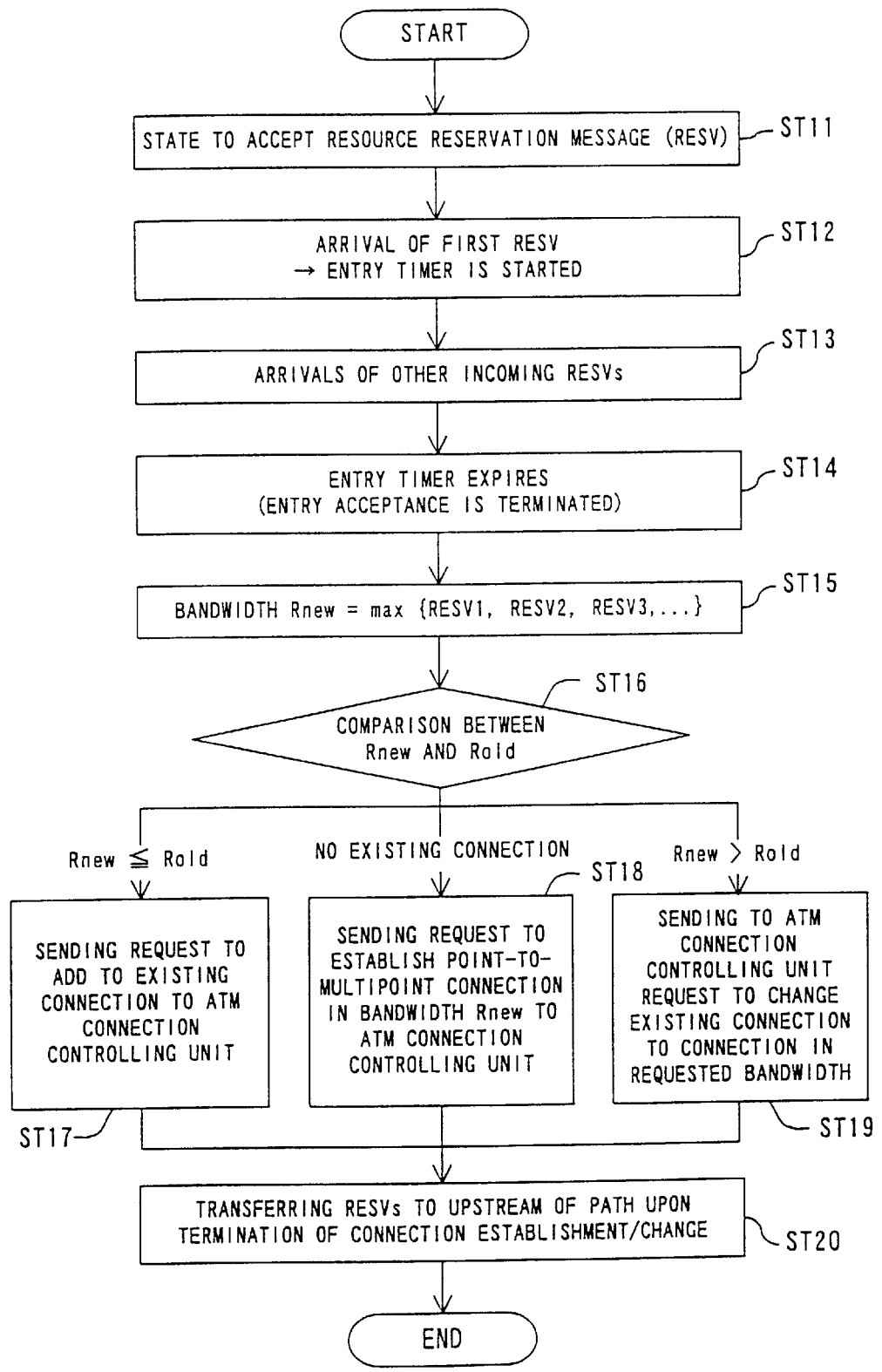
FIG. 21 is a flowchart showing the second process performed by the sending side boundary device.

FIG. 21 is a flowchart showing the operations performed by the boundary device $EN_0$ in the system comprising the sequences shown in FIGS. 17, 19, and 20. After sending the path message to the receiving terminals $R_1$ through $R_n$, the boundary device $EN_0$ enters the state to accept a resource reservation message RESV (step ST11). Upon arrival of the first resource reservation message, a count operation is started by the entry timer 45 (step ST12). Then, other resource reservation messages arrive (step ST13). When the count operation is terminated by the entry timer 45, the acceptance of resource reservation messages is terminated (step ST14).

Next, the entry controlling unit 44 obtains the maximum value of the bandwidths requested by the accepted resource reservation messages RESV1, RESV2, RESV3, . . . , and sets the maximum value as "Rnew" (step ST15). Then, the entry controlling unit 44 makes a comparison between "Rnew" and the bandwidth "Rold" of an existing connection (step ST16).

If there is an existing connection, and if "RNew" is equal to or smaller than "Rold", the entry controlling unit 44 instructs the ATM connection controlling unit 47 to add the receiving side boundary device corresponding to the accepted resource reservation message to the existing connection via the ATM resource determining unit 46. The ATM connection controlling unit 47 then performs the instructed operation (step ST17).

If there is no existing connection in step ST16, the entry controlling unit 44 instructs the ATM connection controlling unit 47 to establish a point-to-multipoint connection having the bandwidth of "Rnew" via the ATM resource determining unit 46. The ATM connection controlling unit 47 then performs the instructed operation (step ST18).

If there is an existing connection in step ST16, and if "Rnew" is larger than "Rold", the entry controlling unit 44 instructs the ATM connection controlling unit 47 to change the existing connection to the connection having the bandwidth of "Rnew" via the ATM resource determining unit 46. The ATM connection controlling unit 47 then performs the instructed operation (step ST19).

When the instructed connection establishment/change operation is terminated, the packet sending unit 50 transfers the resource reservation messages to the upstream of the path (step ST20). Here, the operations are completed.

Figure 22:
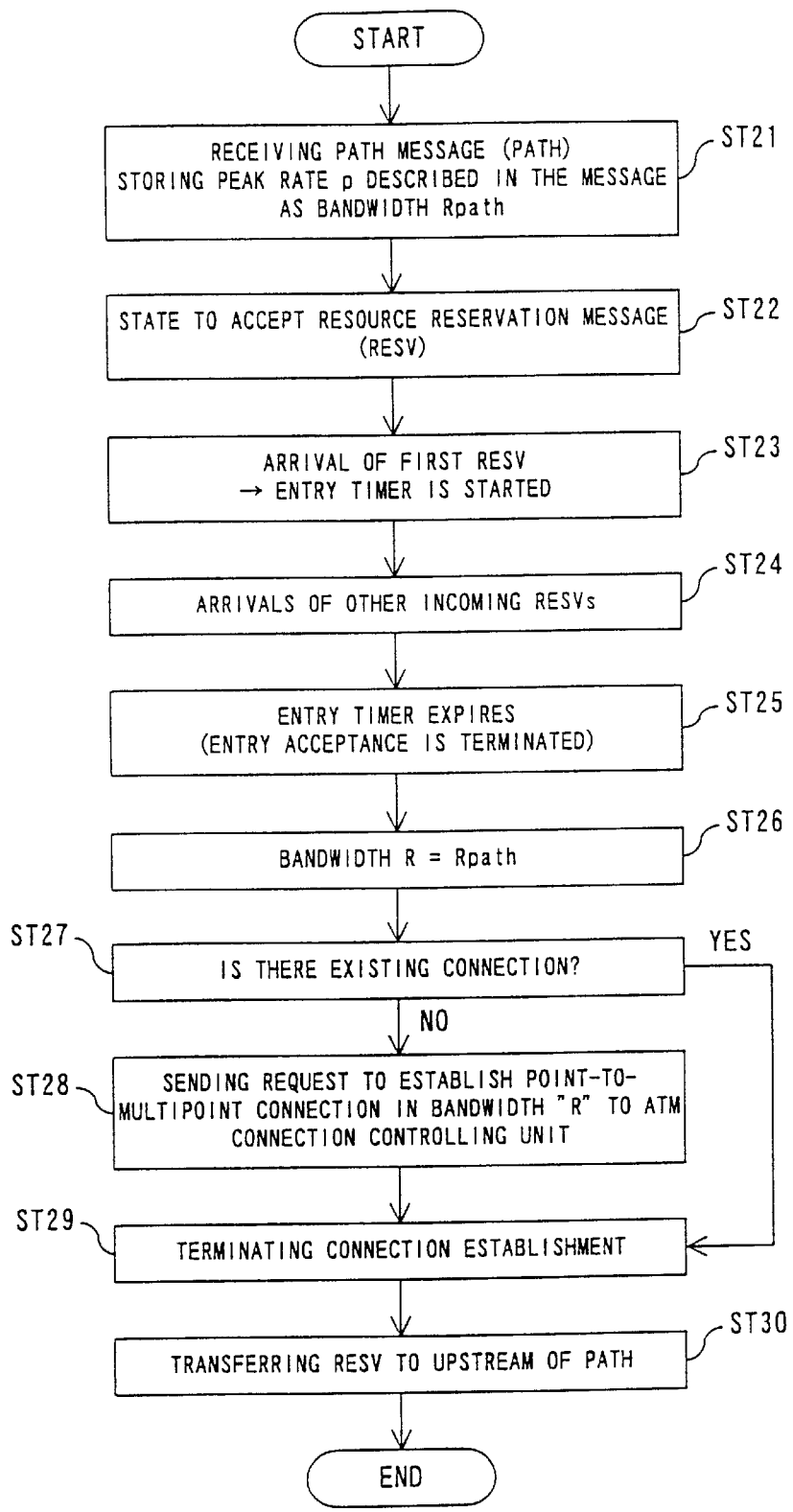
FIG. 22 is a flowchart showing the third process performed by the sending side boundary device.

FIG. 22 is a flowchart showing the operations performed by the boundary device $EN_0$ in the system comprising the sequence shown in FIG. 18. Upon receipt of the path message PATH from the sending terminal S, the boundary device $EN_0$ stores the peak rate "p" described in the message in the entry controlling unit 44 as a bandwidth "Rpath" (step ST21). The operations performed in the subsequent steps ST22 through ST25 are similar to those performed in steps ST11 through ST14 in FIG. 21.

Next, the entry controlling unit 44 sets the bandwidth R=Rpath (step ST26), and determines whether or not there is an existing connection (step ST27). If the entry controlling unit 44 determines that there is no existing connection, it instructs the ATM connection controlling unit 47 to establish a point-to-multipoint connection having the bandwidth of R via the ATM resource determining unit 46. The ATM connection controlling unit 47 then performs the instructed operation (step ST28).

When the instructed connection establishment operation is terminated (step ST29), the packet sending unit 50 transfers the resource reservation messages to the upstream of the path (step ST30). Here, the operations are completed. If there is an existing connection in step ST27, the operation of step ST30 is performed and the operations are completed.

Provided next is the explanation about the details of the policing capability in the system of FIG. 13 for establishing a plurality of point-to-multipoint connections. This system falls into three types depending on the determination policy at the time of connection establishment: a fixed class system, a variable class system, and a connection identifier threshold value system.

With the fixed class system, the levels of a bandwidth are fixedly classified into "x" classes beforehand. Assume that the bandwidth from "0" to "Bmax" is divided into "x" classes by using maximum bandwidth "Bmax" as a standard. In this case, the bandwidth of the "i"th class "i" (i=1, 2, . . . , x) is set to be equal to or larger than Bmax*(i−1)/x and smaller than Bmax*i/x.

A resource request from each of the receiving terminals is classified as the class "i", and the point-to-multipoint connection having the bandwidth Bmax*i/x is allocated in response to the resource request. If the connection of this class already exists, the receiving side boundary device which has sent the new resource request is added to the connection with a message ADD PARTY.

Figure 23:
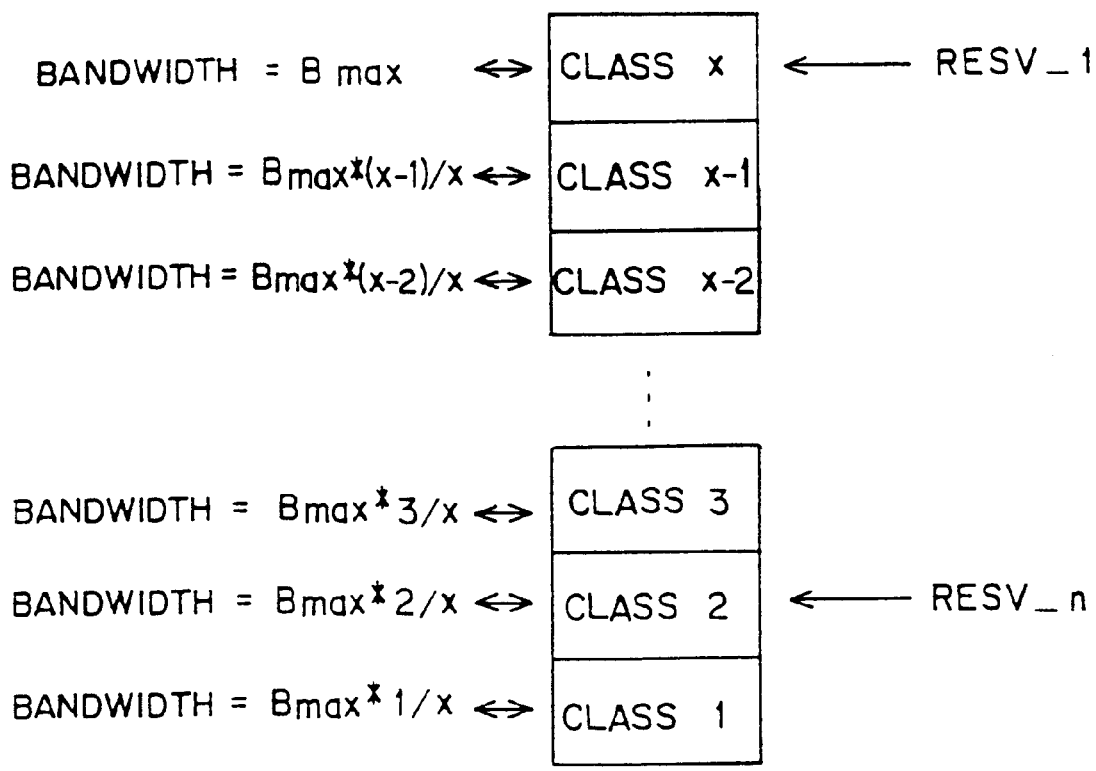
FIG. 23 shows fixed classes.

FIG. 23 shows the correspondence between respective classes and the bandwidths allocated to the respective classes by using as a standard the maximum bandwidth set to Bmax. Here, it is assumed that the number of classes "x" is 10, and the resource reservation message RESV_1 from the receiving terminal $R_1$ requests the bandwidth of 92*Bmax.

At this time, the message RESV_1 which arrives at the sending side boundary device $EN_0$ is classified as a class 10, and the point-to-multipoint connection having the bandwidth "Bmax" is established between the boundary devices $EN_0$ and $EN_1$. If there is an already established connection having the bandwidth "Bmax", the boundary device $EN_1$ is added to that connection with a message ADD PARTY.

If the resource reservation message RESV_n from the receiving terminal $R_n$ is classified as a class 2, the bandwidth Bmax/5(=Bmax*2/10) is allocated to the corresponding connection. There are several options as the method for determining the bandwidth "Bmax". Here, the peak rate described in TSPEC in the path message is used as "Bmax".

Figure 24:
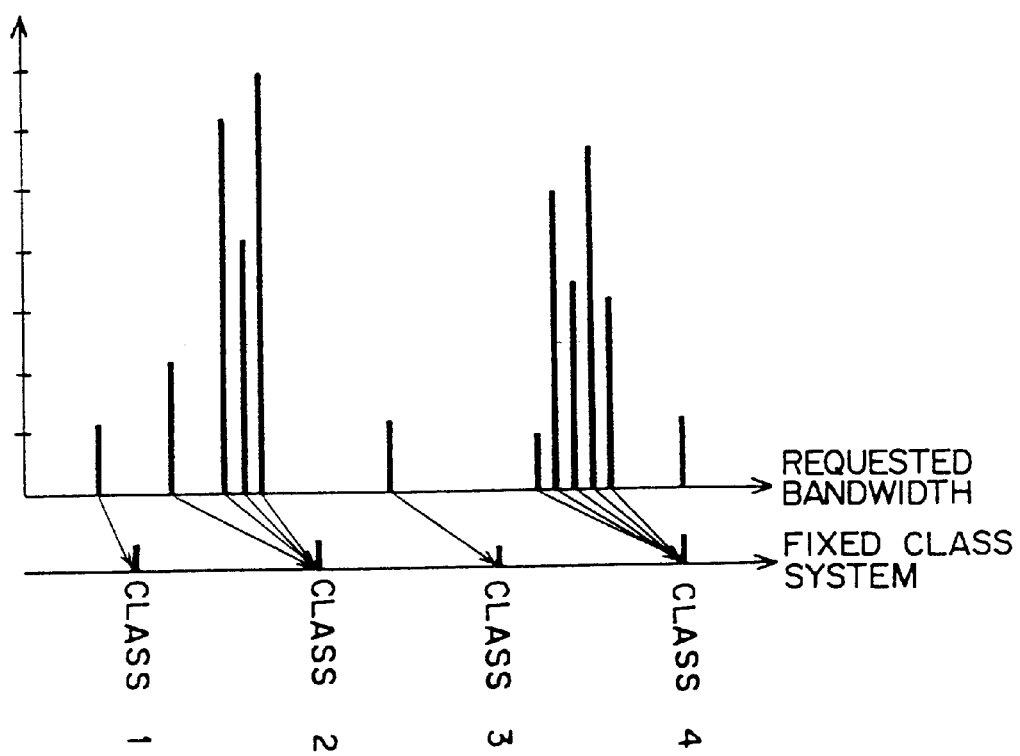
FIG. 24 shows fixed class grouping.

FIG. 24 shows the distribution of the bandwidths requested by the resource reservation messages that the sending side boundary device $EN_0$ accepts in a certain entry. The horizontal axis represents a requested bandwidth, while the vertical axis represents the number of receiving terminals (resource reservation messages) requesting the same bandwidth. Here, the requested bandwidths in the range from the classes 1 through 4 are shown, and the respective resource requests are classified as any of the classes 1 through 4.

Since this system allocates a single point-to-multipoint connection to a certain bandwidth range, the sending side boundary device restricts the maximum number of connections to be established. Additionally, the difference between the connection established between an ATM switch and a receiving side boundary device, and a requested bandwidth is restricted up to Bmax/x.

Accordingly, this system is positioned to be the system which can prevent resources from being wasted.

FIG. 25 is a flowchart showing the operations performed by the sending side boundary device $EN_0$ in the fixed class system. After sending a path message to the receiving terminals $R_1$ through $R_n$, the boundary device $EN_0$ enters the state to accept a resource reservation message RESV (step ST31). Upon arrival of the first resource reservation message, the count operation is started by the entry timer 45 (step ST32).

The entry controlling unit 44 classifies the arrived resource reservation message as the class "i" which satisfies $Bmax*(i-1)/x \leq$ requested bandwidth $< Bmax*i/x$ with reference to the bandwidth requested by the arrived resource reservation message (step ST33). Then, the entry controlling unit 44 determines whether or not the entry timer 45 expires (step ST34).

When a new resource reservation arrives in the case where the entry timer 45 is determined not to expire (step ST35), the classification operation in step ST33 is performed for the newly arrived resource reservation message.

When the count operation by the entry timer 45 is terminated in step ST34 after the repetition of such operations, the entry controlling unit 44 next selects the initial class (such as the class 1) (step ST36) and determines whether or not there is a new resource reservation message in the selected class (step ST37).

If there is a new resource reservation message and if there is no existing connection in the same class, the entry controlling unit 44 instructs the ATM connection controlling unit 47 to establish a new connection corresponding to the new resource reservation message via the ATM resource determining unit 46 (step ST38).

If there is an existing connection in the same class, the entry controlling unit 44 instructs the ATM connection controlling unit 47 to add to the existing connection the receiving side boundary device which has sent the new resource reservation message as a leaf. The ATM connection controlling unit 47 then performs the instructed operation.

Upon termination of the establishment operation of the connection in the selected class (step ST39), the entry controlling unit 44 then determines whether or not there is a class yet to be selected (step ST40). If there is no new resource reservation message in step ST37, the operations in and after step ST39 are performed.

If there is a class yet to be selected in step ST40, the operations in and after step ST36 are repeated. When there is no class yet to be selected, the packet sending unit 50 transfers the resource reservation messages to the upstream of the path (step ST41). Here, the operations are completed.

With the fixed class system, classes are fixedly classified into bandwidths at equal intervals as described above. In the meantime, with the variable class system, a bandwidth which is corresponded to each class is made variable. The method for determining the maximum bandwidth "Bmax" is similar to that of the fixed class system.

With the variable class system, the maximum number of connections "x" that a sending side boundary device establishes for one session is preset, and a new point-to-multipoint connection is provided to a new bandwidth request until "x" point-to-multipoint connections are established.

Once "x" connections are established, a new resource request after that is merged in the connection closest to the requested bandwidth. If the bandwidth of the existing connection closest to the newly requested bandwidth is smaller than the newly requested bandwidth, the connection is reestablished in the newly requested bandwidth. If the bandwidth of the existing connection is larger than the newly requested bandwidth, the link corresponding to the new resource request is added with a message ADD PARTY.

Figure 26:
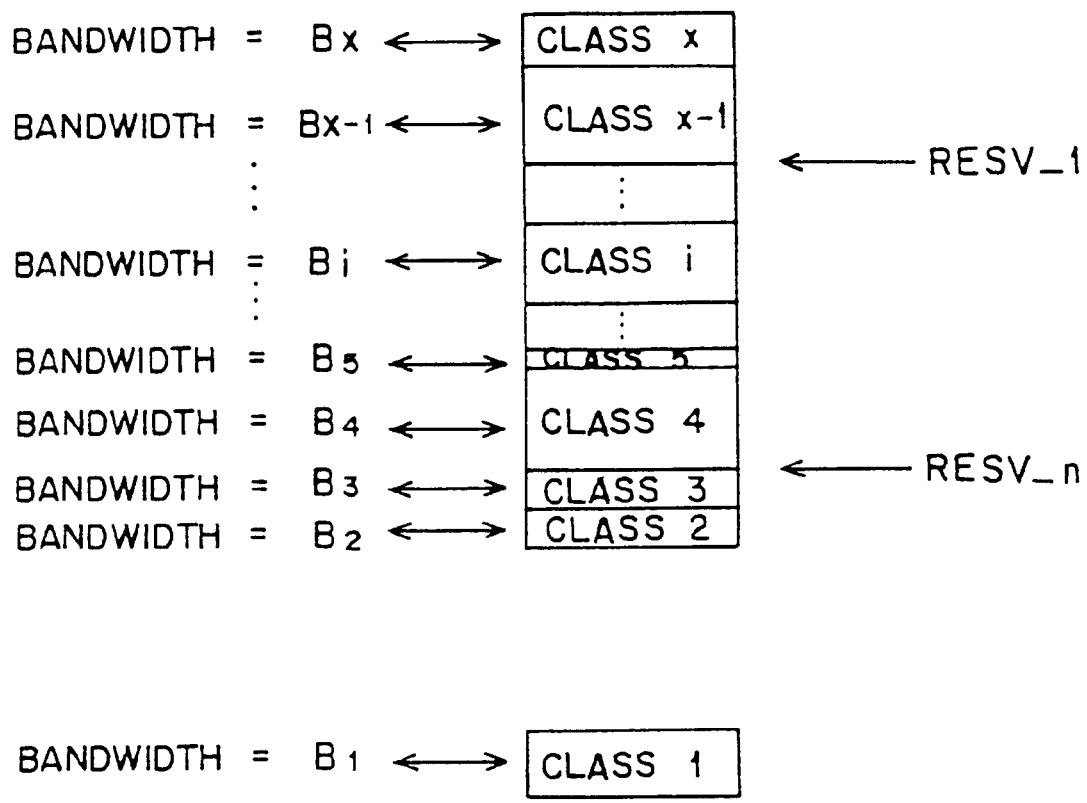
FIG. 26 shows variable classes.

FIG. 26 shows the correspondence between respective classes at a certain time point after an entry is started, and the bandwidths allocated to the respective classes. With the variable class system, all the ranges of the bandwidths of the respective classes are not always equal. Generally, classes tend to close together in a bandwidth to which many resource requests are made, and to scatter in a bandwidth to which a few resource requests are made.

Figure 27:
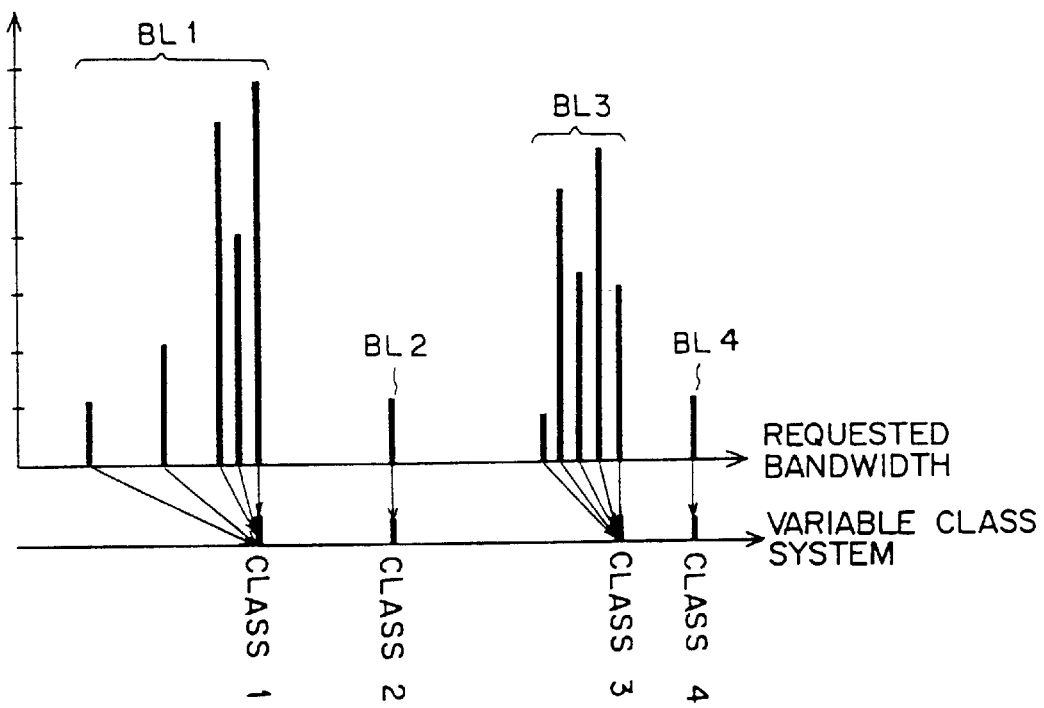
FIG. 27 shows variable class grouping.

FIG. 27 shows the distribution of the bandwidths required by the resource reservation messages that the sending side boundary device $EN_0$ accepts in a certain entry. The horizontal axis represents a requested bandwidth, while the vertical axis represents the number of receiving terminals (resource reservation messages) that request the same bandwidth.

In FIG. 27, the range of a requested bandwidth falls into 4 blocks such as BL1 through BL4, and the bandwidths equivalent to the upper limit values of the respective blocks are set as the bandwidths of the connections in the respective classes. In other words, the classes are organized according to the distribution state of the requested bandwidths. It is known from FIG. 27 that there is a higher possibility of the provision of a connection more faithful to a requested bandwidth by the variable class system, compared with FIG. 24.

Since the class organization variably changes with this system, it is advantageous when the bandwidths requested by receivers concentrate on the periphery of a certain bandwidth. In this case, classes are set finely on the periphery of the bandwidth to which many requests are made, or set coarsely in the bandwidth to which a few requests are made.

Figure 28:
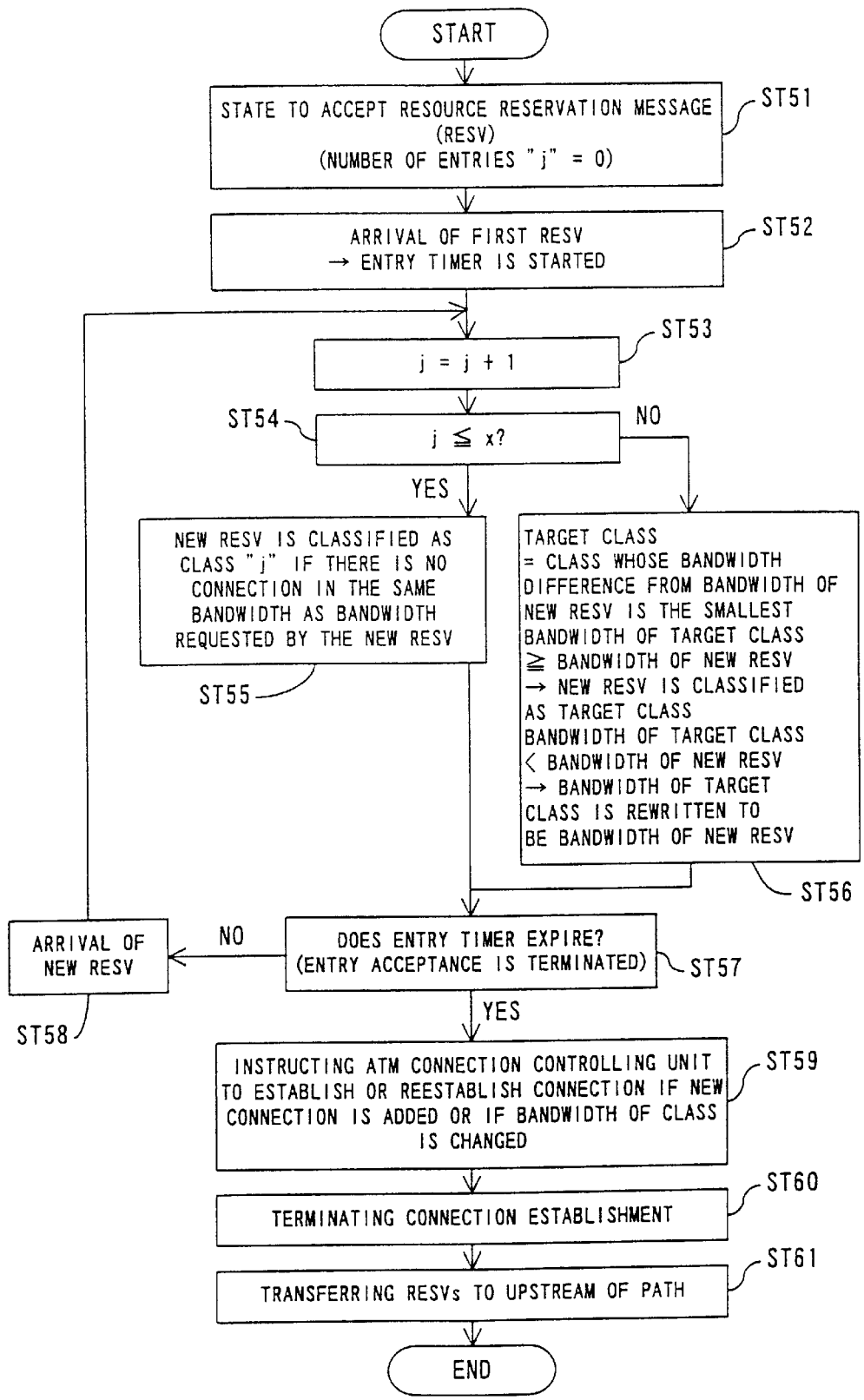
FIG. 28 is a flowchart showing the fifth process performed by the sending side boundary device.

FIG. 28 is a flowchart showing the operations performed by the sending side boundary device $EN_0$ in the variable class system. The boundary device $EN_0$ enters the state to accept a resource reservation message. RESV after sending a path message to the receiving terminals $R_1$ through $R_n$, and the entry controlling unit 44 sets to "0" a control variable "j" which indicates the number of arrived resource reservation messages (the number of entries) (step ST51). Upon arrival of the first resource reservation message, the count operation is started by the entry timer 45 (step ST52).

Then, the entry controlling unit 44 sets j=j+1 (step ST53), and compares the variable "j" with the number of classes "x" (step ST54). If $j \leq x$, and if there is no connection in the same bandwidth as the bandwidth requested by the arrived reservation message, a class "j" is assigned in response to that resource reservation message (step ST55). Then, it is determined whether or not the entry timer 45 expires (step ST57).

When a new resource reservation message (new RESV) arrives in the case where the count operation by the entry timer 45 is not terminated (step ST58), the operations in and after step ST53 are repeated for the arrived resource reservation message.

If j>x in step ST54, the class whose bandwidth difference from the bandwidth of the new RESV is the smallest among the already set "x" classes is specified as a target class (step ST56). If the bandwidth of the target class is equal to or larger than that of the new RESV, the new RESV is classified as the target class. If the bandwidth of the target class is smaller than that of the new RESV, the bandwidth of the target class is rewritten to be that of the new RESV. The operations in and after step ST57 are then performed.

When the count operation by the entry timer 45 is terminated in step ST57, the entry controlling unit 44 examines the bandwidths of the respective classes. If a new connection is added or the bandwidth of a class is changed, the entry controlling unit 44 instructs the ATM connection controlling unit 47 to establish a new connection or reestablish an existing connection via the ATM resource determining unit 46 (step ST59). When the establishment of a connection is terminated (step ST60), the packet sending unit 50 sends the resource reservation messages to the upstream of the path (step ST61). Here, the operations are completed.

Next, the connection identifier threshold value system is explained. When up to "n" connections are allocated to one data delivery session, a threshold value is set for connection identifiers (VPI/VCIs) used by a sending side boundary device in this system, and it is determined whether or not to establish a new point-to-multipoint connection, or whether or not to reestablish an existing point-to-multipoint connection in response to a new resource request depending on an operating mode.

In the VPI/VCI space managed by the sending side boundary device, the state where the occupation ratio of the number of the used VPI/VCIs is equal to or smaller than a threshold value T1 is called a tag rich mode, while the state where the occupation ratio is larger than the threshold value T1 is called a tag save mode.

In this system, when the sending side boundary device accepts a new resource request in the tag rich mode, it performs operations by judging that up to "n" point-to-multipoint connections are permitted to be established. Thus, new point-to-multipoint connections are established. When the sending side boundary device enters the tag save mode, it adds a new link to an existing connection or reestablishes an existing connection without establishing a new connection in response to a new resource request.

In the tag rich mode, point-to-multipoint connections are respectively allocated in response to all of resource requests. In the meantime, the link of a newly requested bandwidth is added to the connection (target connection) having the bandwidth which is larger than and closest to the requested bandwidth among existing point-to-multipoint connections in response to the new resource request. The target connection can be found by the ATM resource determining unit 46 with the procedure shown in FIG. 29.

The ATM resource determining unit 46 first generates a set "U" of existing connections having bandwidths larger than a requested bandwidth of a new resource request (step ST71), and determines whether or not the set "U" is empty (step ST72).

If the set "U" is not empty, the ATM resource determining unit 46 subtracts the requested bandwidth from the bandwidths of the respective connections included in the set "U", obtains the minimum value of the sutractoion results, and recognizes the connection corresponding to the minimum value as a target connection (step ST73). The ATM resource determining unit 46 then adds the receiving side boundary device which has sent the new resource request to the target connection with a message ADD PARTY (step ST74), and terminates its operations.

If the set "U" is empty, the ATM resource determining unit 46 merges the connection having the maximum bandwidth among the existing connections and the new resource request, reestablishes the connection in the requested bandwidth (step ST75), and terminates the operations.

As described above, the sending side boundary device performs its operations so that the consumption of bandwidth resources at the time of establishing a new connection is restricted to a certain level or lower, and is prevented from increasing.

Figure 30:
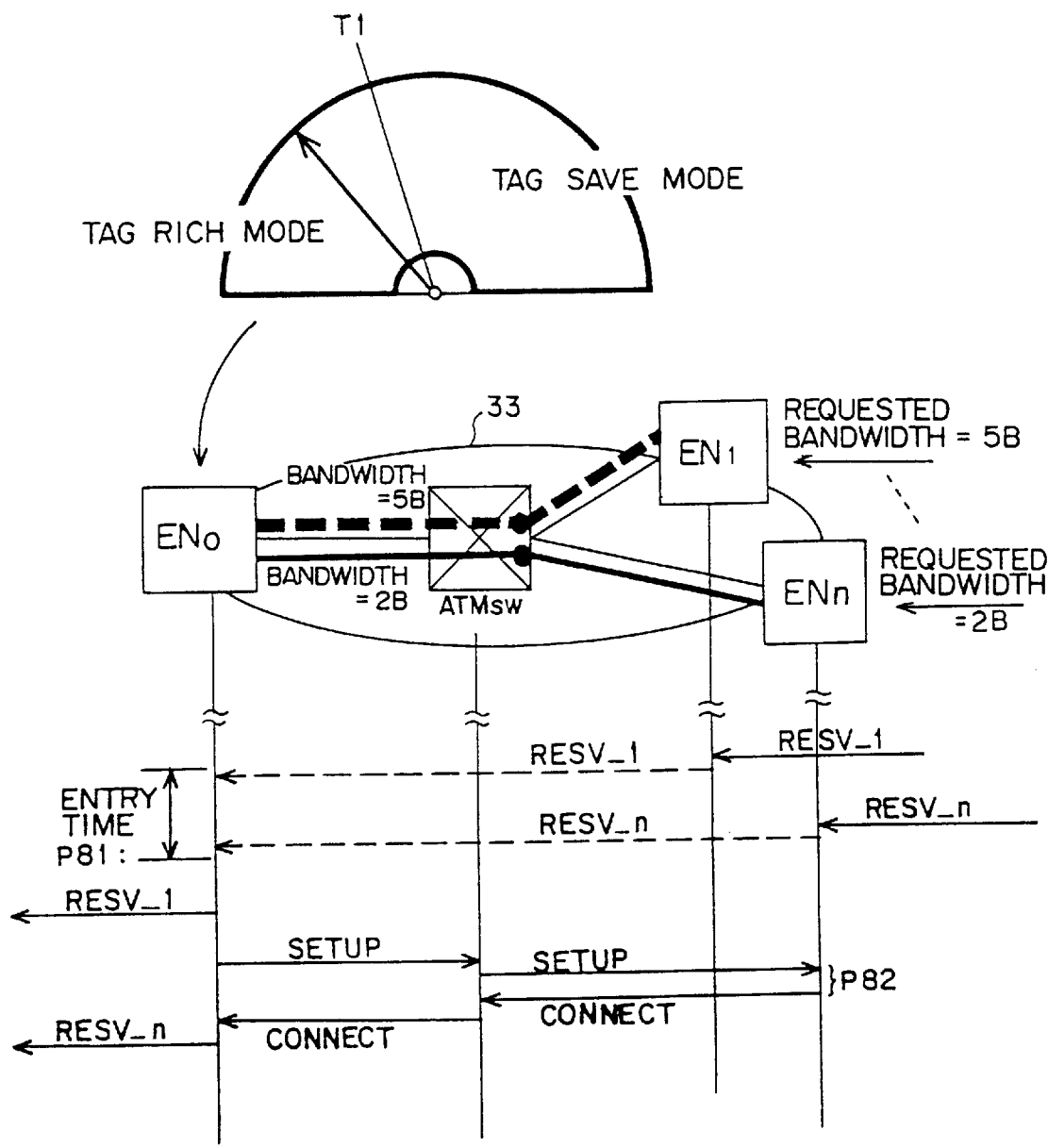
FIG. 30 shows a first tag rich mode.
Figure 31:
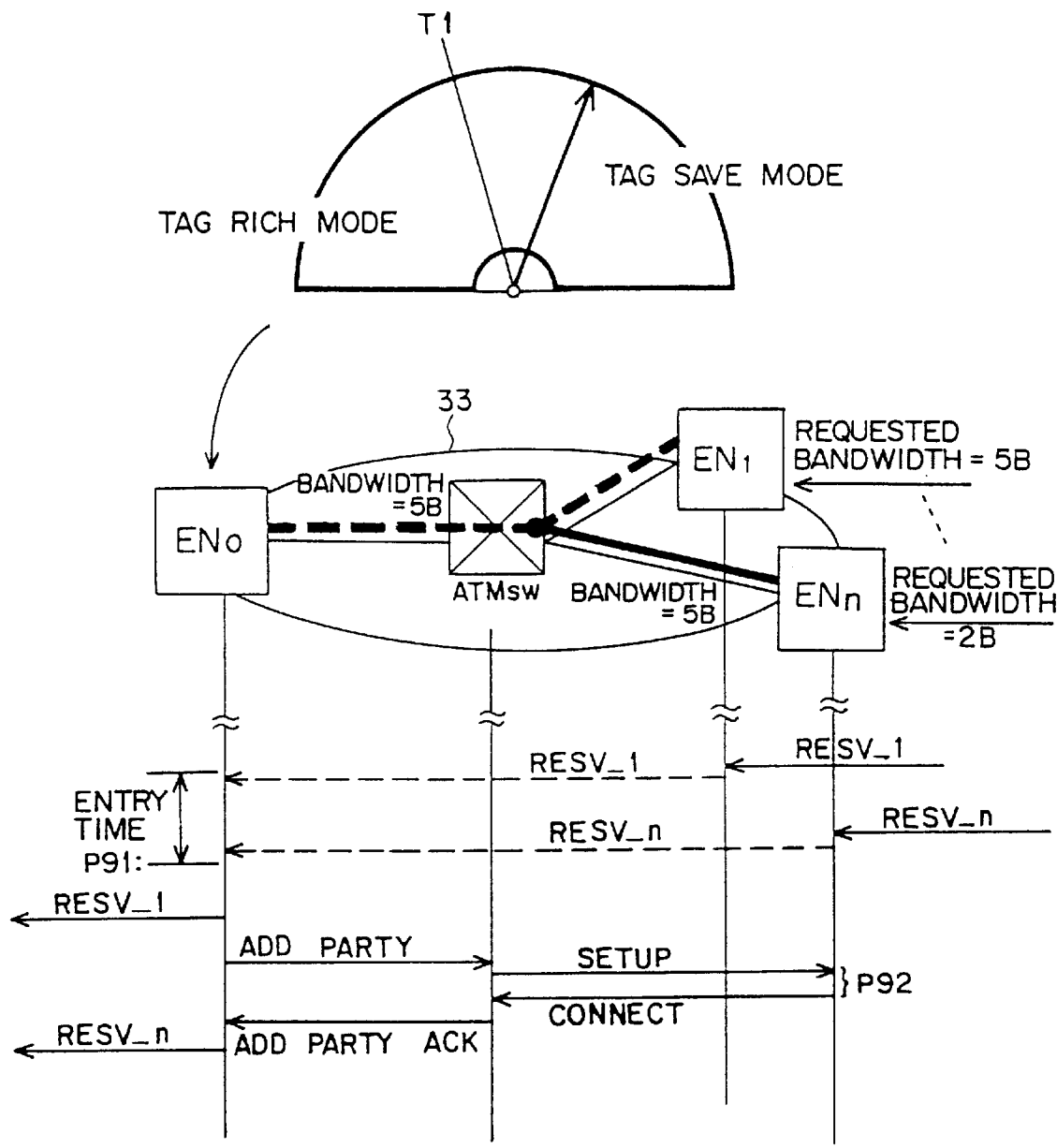
FIG. 31 shows a first tag save mode.

FIGS. 30 and 31 respectively show the operational sequences of the tag rich and the tag save modes. These figures assume that a point-to-multipoint connection having the bandwidth of 5B is already established between the boundary devices $EN_0$ and $EN_1$.

Since the consumption ratio of VPI/VCIs is smaller than a threshold value T1 in FIG. 30, the sending side boundary device $EN_0$ establishes a new connection in response to a new resource request. The operational sequence in this case is as follows.

P81: When entry time elapses, the resource reservation messages RESV_1 and RESV_2 respectively from the boundary devices $EN_1$ and $EN_n$ have been accepted. A connection is already allocated to the bandwidth 5B in response to the message RESV_1, which is immediately transferred to the sending terminal S. Then, the boundary device $EN_0$ starts to establish a connection in response to the new resource reservation message RESV_n.

P82: The boundary device $EN_0$ establishes a point-to-multipoint connection in the requested bandwidth 2B between the boundary device $EN_n$ and $EN_0$ itself.

Additionally, since the consumption ratio of VPI/VCIs is higher than the threshold value T1 in FIG. 31, the sending side boundary device $EN_0$ changes an existing connection in response to a new resource request. The operational sequence in this case is as follows.

P91: When entry time elapses, the resource reservation messages RESV_1 and RESV_n respectively from the boundary devices $EN_1$ and $EN_n$ have been accepted. A connection is already allocated to the bandwidth of 5B in response to the message RESV_1, which is immediately transferred to the sending terminal S. Then, the boundary device $EN_0$ starts to change the connection in response to the new resource reservation message RESV_n.

Figure 29:
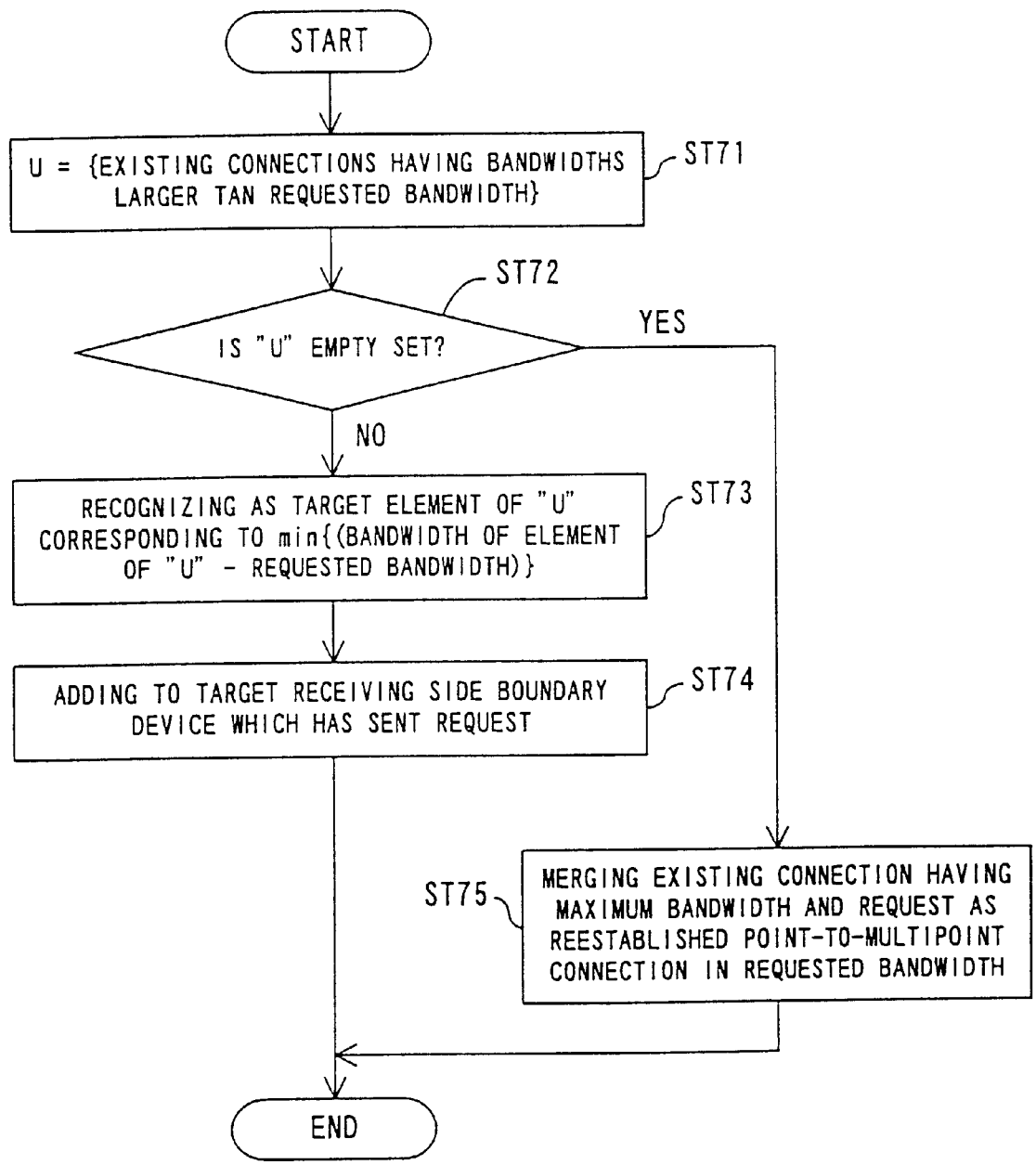
FIG. 29 is a flowchart showing the first process performed in a tag save mode.

The boundary device $EN_0$ selects a target connection with the operations shown in FIG. 29, and merges the target connection and the new resource request message RESV_n. Here, since the existing connection is only the connection having the bandwidth of 5B between the boundary devices $EN_0$ and $EN_1$ and the bandwidth requested by the message RESV_n is 2B, the element of the set "U" is only the connection between the boundary devices $EN_0$ and $EN_1$. Accordingly, this connection is recognized to be the target connection.

P92: The boundary device adds the link to the boundary device $EN_n$ to the existing connection having the bandwidth of 5B with a message ADD PARTY.

This system monitors the state where the VPI/VCI resources of a sending side boundary device are consumed, and restricts the number of point-to-multipoint connections according to the resource utilization (the use ratio of the resources). Accordingly, connection identifiers and bandwidths can be prevented from being wasted.

Figure 32:
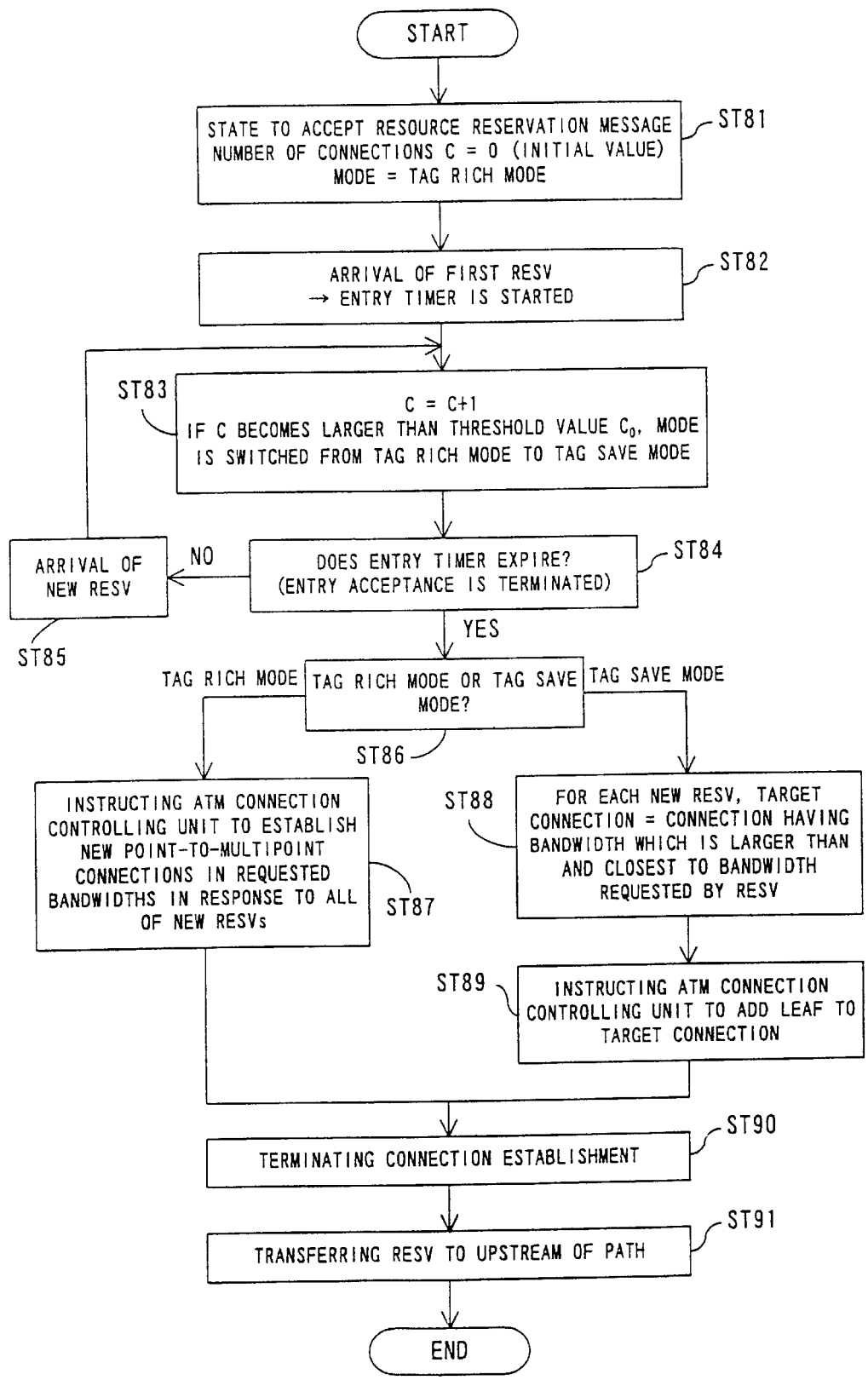
FIG. 32 is a flowchart showing the sixth process performed by the sending side boundary device.

FIG. 32 is a flowchart showing the operations that the sending side boundary device performs in the connection identifier threshold value system. After sending a path message to the receiving terminals $R_1$ through $R_n$, the sending side boundary device $EN_0$ enters the state to accept a resource reservation message RESV. At this time, the entry controlling unit 44 sets to "0" a control variable "C" indicating the number of arrived resource reservation messages (the number of connections), and further sets the mode to the tag rich mode (step ST81). Upon arrival of the first resource reservation message, the count operation by the entry timer 45 is started (step ST82).

Next, the entry controlling unit 44 sets C=C+1. If "C" becomes larger than a threshold value "$C_0$", the entry controlling unit 44 switches the tag rich mode to the tag save mode (step ST83). As the threshold value "$C_0$", for example, the value obtained by subtracting the number of already used VPI/VCIs from the number of VPI/VCIs corresponding to the threshold value T1 shown in FIG. 30 is used. When "C" reaches the threshold value "$C_0$", the consumption ratio of the VPI/VCIs becomes equal to the threshold value T1.

Then, the entry controlling unit 44 determines whether or not the entry timer 45 expires (step ST84). When a new resource reservation message (new RESV) arrives in the case where the count operation by the entry timer 45 is not terminated (step ST85), the operations in and after step ST83 are repeated for the arrived resource reservation message.

When the count operation by the entry timer 45 is terminated, the entry controlling unit 44 then determines whether the mode is either the tag rich or the tag save mode (step ST86). If the mode is determined to be tag rich mode, the entry controlling unit 44 instructs the ATM connection controlling unit 47 to respectively establish new point-to-multipoint connections in requested bandwidths in response to all of accepted resource reservation messages, via the ATM resource determining unit 46 (step ST87). The ATM connection controlling unit 47 then performs the instructed operation.

If the mode is determined to be the tag save mode, the ATM resource determining unit 46 obtains a target connection with the operations shown in FIG. 29 for each of the accepted resource reservation messages (step ST88). Next, the ATM resource determining unit 46 instructs the ATM connection controlling unit 47 to add a leaf to the target connection (step ST89). The ATM connection controlling unit 47 then performs the instructed operation.

When the establishment of connections is terminated (step ST90), the packet sending unit 50 transfers the resource reservation messages to the upstream of the path (ST91). Here, the operations are terminated.

Provided next is the explanation about the details of the policing capability of the system of FIG. 16, which mixes and uses point-to-multipoint and point-to-point connections. This system falls into 5 types depending on the determination policy at the time of connection establishment: a fixed class system, a variable class system, a connection identifier threshold value system a bandwidth threshold value system, and a dual threshold value system.

The fixed class system is fundamentally the same as that explained by referring to FIGS. 23 and 24. A difference is that a point-to-point connection is provided in response to the first resource request among resource requests classified into respective classes, and existing point-to-point connections are changed to point-to-multipoint connections in response to the second and subsequent requests.

This system is a system for providing an optimum solution of an ATM connection by combining point-to-point and point-to-multipoint connections. Because resource requests are fixedly classified into classes, the determination made by a sending side boundary device is simple. Therefore, this system is considered to be efficient. Additionally, since the number of classes "x" and the maximum bandwidth "Bmax" can be determined according to a network configuration, this system is superior also in flexibility.

The sending side boundary device $EN_0$ in this system performs the connection establishment operations shown in FIG. 33 after it classifies the resource reservation messages accepted in one entry into fixed classes by performing the operations in steps ST31 through ST34 in FIG. 25.

Here, the entry controlling unit 44 selects one class, and examines whether or not a new resource reservation message (new RESV) exists in the selected class (step ST101). If the new RESV is determined to exist, the entry controlling unit 44 further examines whether or not there is an existing connection (step ST102). If there is no existing connection, the entry controlling unit 44 examines whether the number of new RESVs is either plural or singular (step ST103).

If the number of new RESVs is singular, the entry controlling unit 44 instructs the ATM connection controlling unit 47 to establish the point-to-point connection corresponding to the new RESV via the ATM resource determining unit 46 (step ST104). The ATM connection controlling unit 47 then performs the instructed operation.

If the number of new RESVs is plural, the entry controlling unit 44 instructs the ATM connection controlling unit 47 to establish the point-to-multipoint connection corresponding to the new RESVs (step ST105). The ATM controlling unit 47 then performs the instructed operation.

Additionally, if there is an existing connection in step ST102, the entry controlling unit 44 examines whether this connection is either a point-to-multipoint or a point-to-point connection (step ST106).

If the existing connection is a point-to-point connection, the entry controlling unit 44 instructs the ATM connection controlling unit 47 to change the point-to-point connection to a point-to-multipoint connection (step ST107). The ATM connection controlling unit 47 then performs the instructed operation.

If the existing connection is a point-to-multipoint connection, the entry controlling unit 44 instructs the ATM connection controlling unit 47 to add the receiving side boundary device which has sent the new RESV to the point-to-multipoint connection as a leaf (step ST108). The ATM controlling unit 47 then performs the instructed operation.

When the connection establishment operations in the selected class are terminated in this way (step ST109), the entry controlling unit 44 then determines whether or not there is a class yet to be selected (step ST110). If no new resource reservation message exists in step ST101, the operations in and after step ST109 are performed.

If there is a class yet to be selected in step ST110, the operations in and after step ST101 are repeated. When there is no other class yet to be selected, the packet sending unit 50 transfers the resource reservation messages to the upstream of the path (step ST111). Here, the operations are completed.

Next, the variable class system is fundamentally the same as that explained by referring to FIGS. 26 and 27. A difference is that point-to-point connections are provided until the number of connections reaches "x", when a sending side boundary device assigns variable classes to new resource requests. The (x+1)th resource request is merged in the connection having the bandwidth closest to the newly requested bandwidth among the existing "x" point-to-point connections, and this point-to-point connection is changed to a point-to-multipoint connection.

This system is a system providing an optimum solution of an ATM connection by combining point-to-point and point-to-multipoint connections. Because resource requests are variably classified into classes, this system can flexibly cope with the case where the bandwidths of the resource requests from receiving terminals are biased. Additionally, since the number of classes "x" and the maximum bandwidth "Bmax" can be determined according to a network configuration, this system is superior also in flexibility.

The sending side boundary device $EN_0$ in this system performs the connection establishment operations shown in FIG. 33 after it classifies the resource reservation messages accepted in one entry into variable classes by performing the operations in steps ST51 through ST57 in FIG. 28.

Next, the connection identifier threshold value system is fundamentally the same as that explained by referring to FIGS. 30 and 31. A difference is that a point-to-point connection is established in response to a new resource request in the tag rich mode, while a new resource request is merged in an existing point-to-point connection as a reestablished point-to-multipoint connection in the tag save mode.

Note that, however, if a target connection to be merged is a point-to-multipoint connection, a leaf corresponding to a new resource request is added to the connection with a message ADD PARTY.

Figure 34:
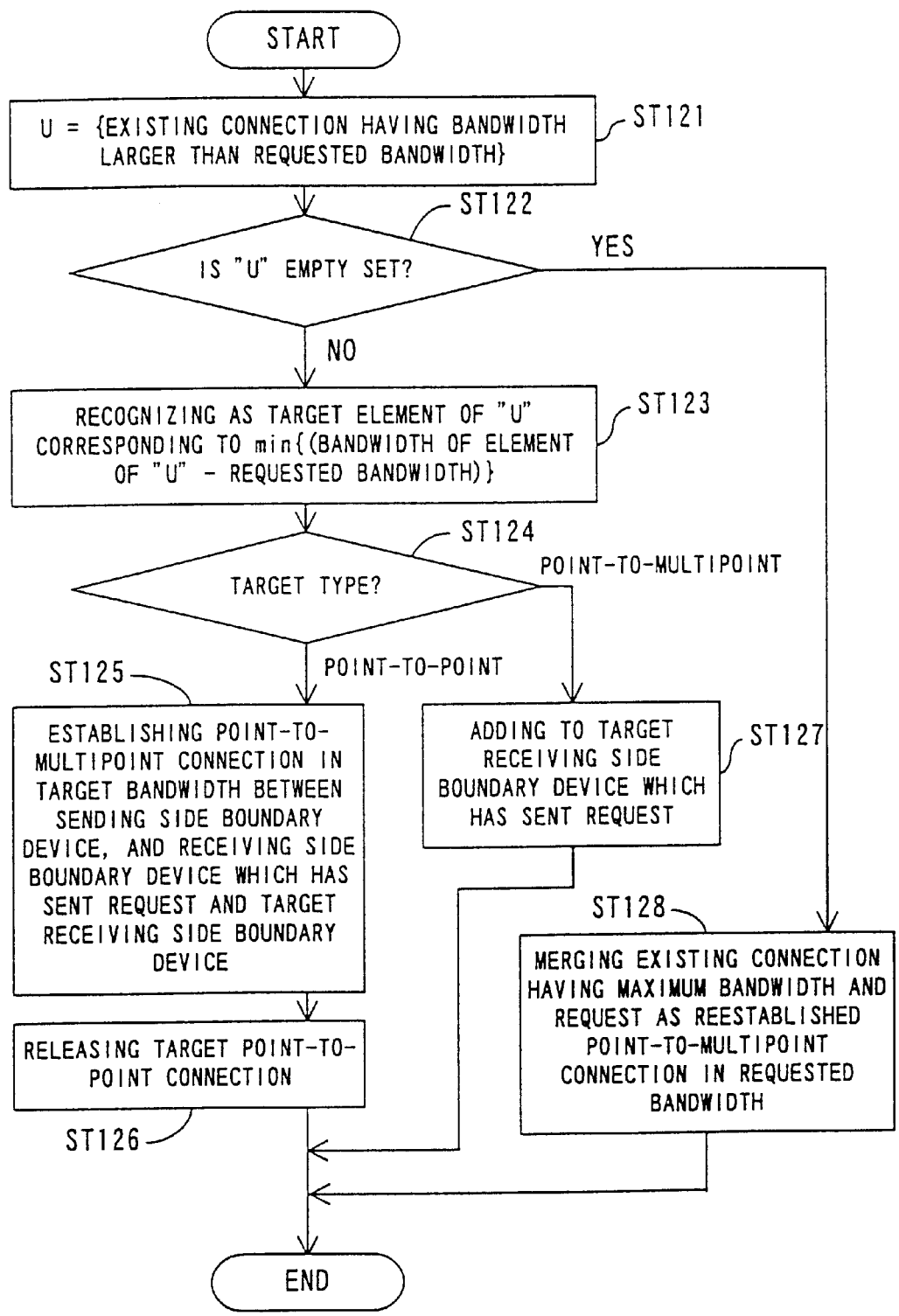
FIG. 34 is a flowchart showing the second process performed in the tag save mode.

FIG. 34 shows the operations that the sending side boundary device performs in the tag save mode. Here, the operations for determining a target connection, which are performed in steps ST121 through ST123, are similar to those in steps ST71 through ST73 in FIG. 29. Next, the ATM resource determining unit 46 determines the type of a target connection (step ST124).

If the target connection is a point-to-point connection, the ATM connection controlling unit 47 establishes a point-to-multipoint connection in the bandwidth of the target connection between the sending side boundary device, and the receiving side boundary device which sends the new resource request and the receiving side boundary device belonging to the target connection (step ST125). The point-to-point connection being the target connection is then released (step ST126), and the operations are terminated.

If the target connection is a point-to-multipoint connection, the ATM connection controlling unit 47 adds the receiving side boundary device which sends the new resource request to the target connection with a message ADD PARTY (step ST127). Here, the operations are terminated.

If the set "U" is empty in step ST122, the connection having the maximum bandwidth among existing connection and the new resource request are merged as a reestablished point-to-multipoint connection in the requested bandwidth (step ST128). Here, the operations are terminated.

Figure 35:
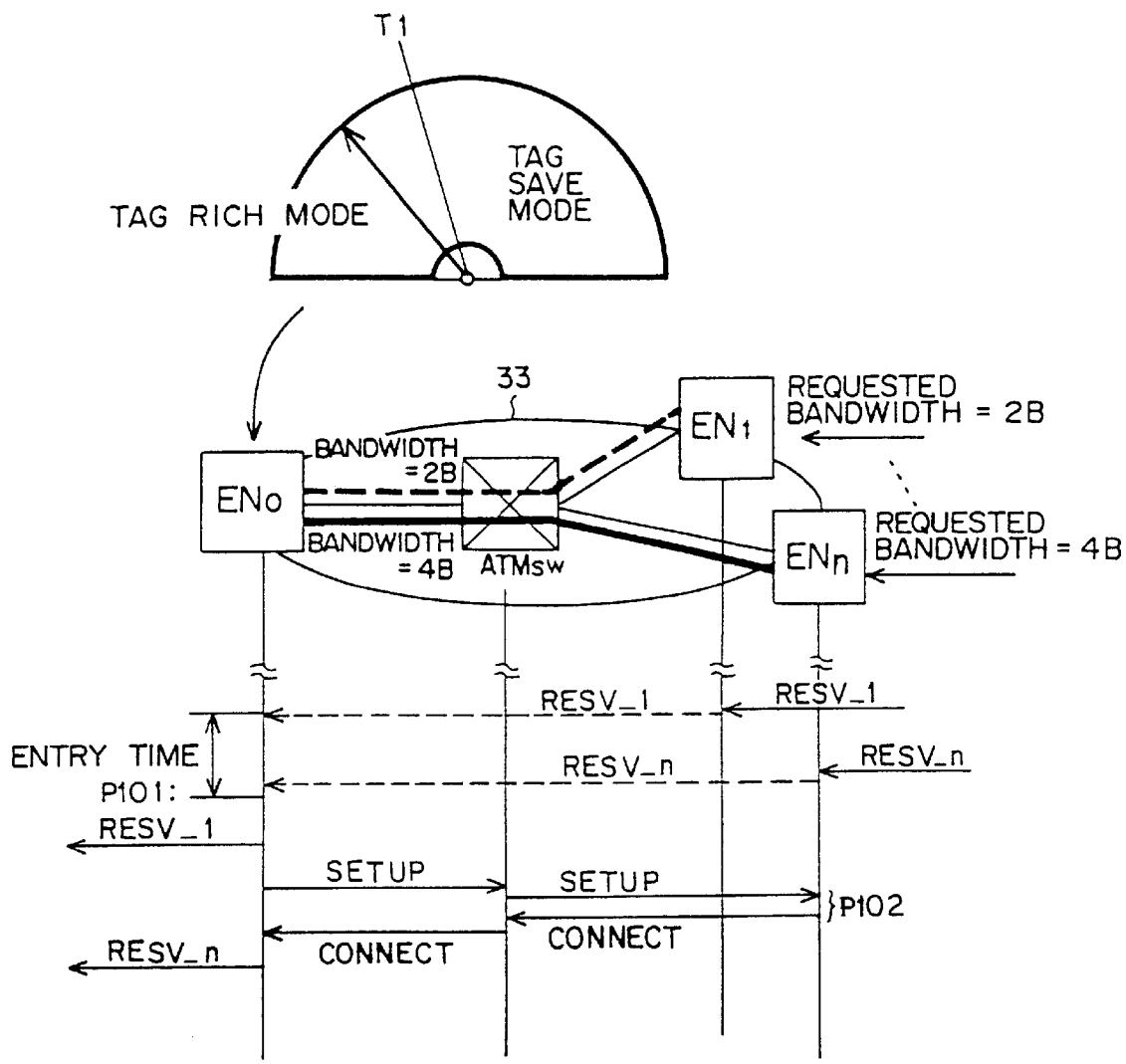
FIG. 35 shows a second tag rich mode.
Figure 36:
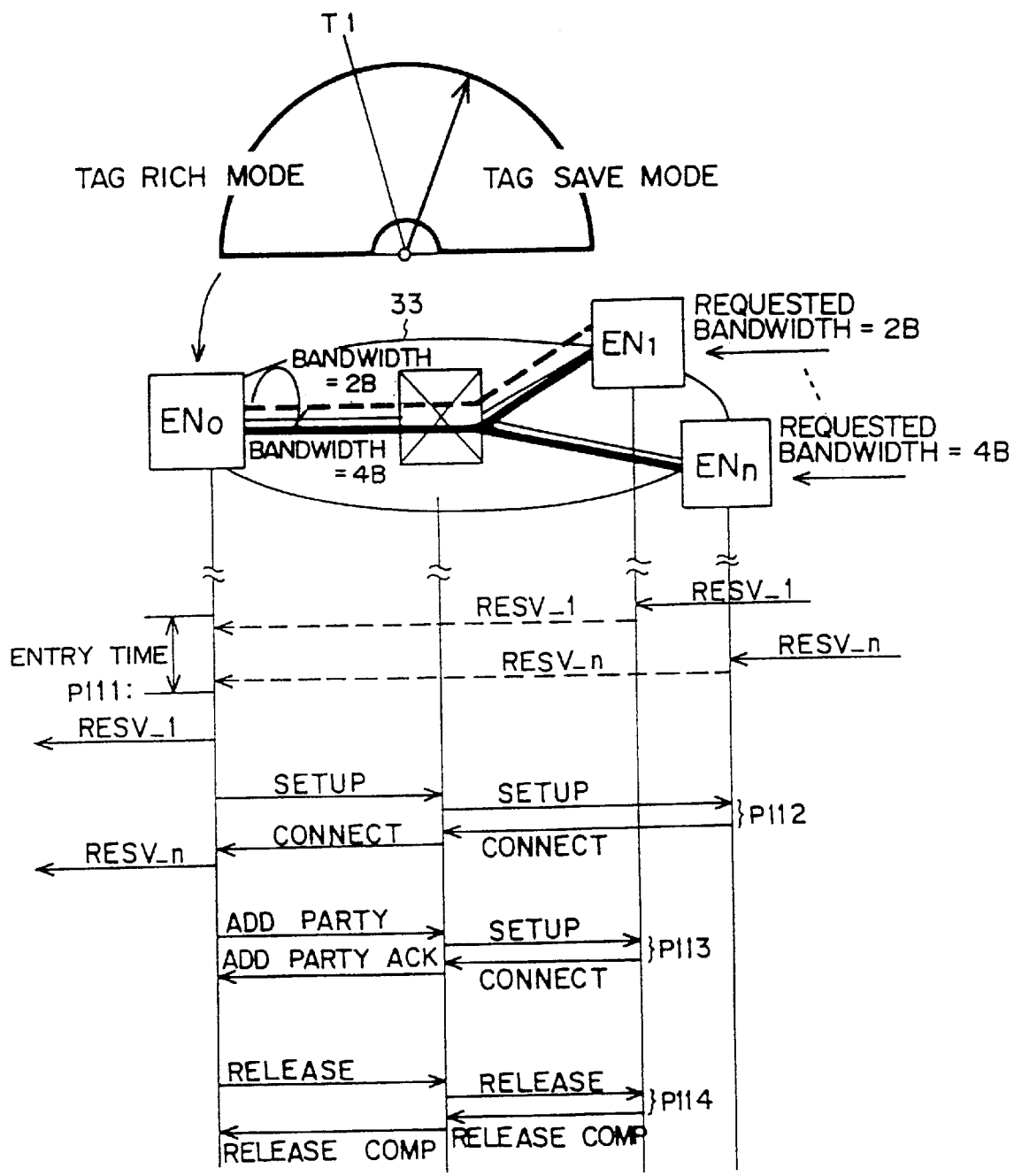
FIG. 36 shows a second tag save mode.

FIGS. 35 and 36 respectively show the operational sequences of the tag rich and the tag save modes. These figures assume that a point-to-point connection of the bandwidth of 2B is already established between the boundary devices $EN_0$ and $EN_1$.

Since the consumption ratio of VPI/VCIs is smaller than the threshold value T1 in FIG. 35, the sending side boundary device $EN_0$ establishes a new point-to-point connection in response to a new resource request. The operational sequence in this case is as follows.

P101: When entry time elapses, the resource reservation messages RESV_1 and RESV_n respectively from the boundary devices $EN_1$ and $EN_n$ have been accepted. A connection is already allocated to a bandwidth 2B in response to the message RESV_1, which is immediately transferred to the sending terminal S. Then, the boundary device $EN_0$ starts to establish a connection in response to the new resource reservation message RESV_n.

P102: The boundary device $EN_0$ establishes a point-to-point connection in a requested bandwidth 4B between the boundary devices $EN_0$ and $EN_n$.

In the meantime, since the consumption ratio of VPI/VCIs is larger than the threshold value T1 in FIG. 36, the sending side boundary device changes the existing connection in response to the new resource request. The operational sequence in this case is as follows.

P111: When entry time elapses, the resource reservation messages RESV_1 and RESV_n respectively from the boundary devices $EN_1$ and $EN_n$ have been accepted. A connection is already allocated to a bandwidth 2B in response to the message RESV_1, which is immediately transferred to the sending terminal S. The boundary device $EN_0$ then starts to change the existing connection in response to the new resource reservation message RESV_n.

The boundary device $EN_0$ attempts to select a target connection by performing the operations shown in FIG. 34. Here, the existing connection is only the connection having the bandwidth of 2B between the boundary devices $EN_0$ and $EN_1$. Because the bandwidth requested by the message RESV_n is 4B, the set "U" is empty. Therefore, the connection between the boundary devices $EN_0$ and $EN_1$ is recognized to be the existing connection having the maximum bandwidth, so that this connection and the message RESV_n are merged as a single reestablished point-to-multipoint connection.

P112: The boundary device $EN_0$ establishes a point-to-point connection having the bandwidth of 4B between the boundary device $EN_n$ and $EN_0$ itself.

P113: The boundary device $EN_0$ adds the link to the boundary device $EN_1$ to the established point-to-multipoint connection with a message ADD PARTY.

P114: The point-to-point connection between the boundary devices $EN_0$ and $EN_1$ is released.

If point-to-point connections are fundamentally provided in response to all of resource requests as described above, VPI/VCIs the number of which is equal to that of the receiving side boundary devices that transfer the resource requests is consumed in one session. If the number of receiving side boundary devices joining the session increases, the VPI/VCI resources of the sending side boundary device naturally decreases.

Therefore, if the consumption ratio of VPI/VCIs exceeds a threshold value, point-to-point connections are sequentially changed to point-to-multipoint connections. Thus, the system shifts to the state to save the VPI/VCIs of the sending side boundary device. Furthermore, since an existing connection closest to a requested bandwidth and a resource request are merged, the bandwidth resources of the link closest to a receiving side boundary device are promisingly prevented from being wasted too much in a generated point-to-multipoint connection.

Figure 37:
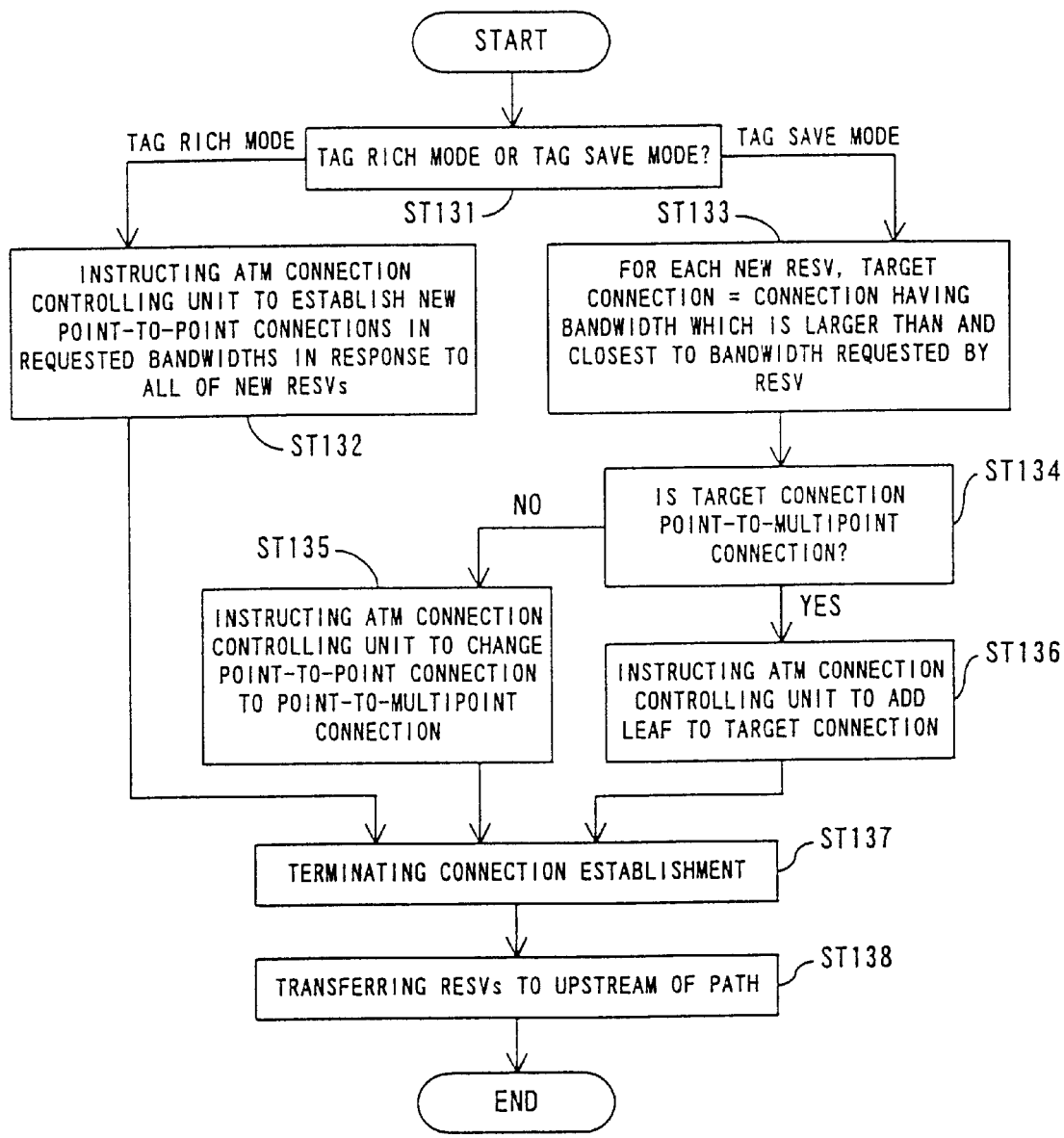
FIG. 37 is a flowchart showing the eighth process performed by the sending side boundary device.

The sending side boundary device $EN_0$ in this system performs the connection establishment operations shown in FIG. 37 after accepting a resource reservation message by performing the operations in steps ST81 through ST85 in FIG. 32.

The entry controlling unit 44 first determines whether the mode is either the tag rich mode or the tag save mode (step ST131). If the mode is determined to be the tag rich mode, the entry controlling unit 44 instructs the ATM connection controlling unit 47 to establish new point-to-point connections in response to all of accepted resource reservation messages via the ATM resource determining unit 46 (step ST132). The ATM connection controlling unit 47 then performs the instructed operation.

If the mode is determined to be the tag save mode, the ATM resource determining unit 46 obtains a target connection by performing the operations shown in FIG. 34 for each of the accepted resource reservation messages (step ST133), and determines the type of the target connection (step ST134).

If the target connection is a point-to-point connection, the entry controlling unit 44 instructs the ATM connection controlling unit 47 to change the target connection to a point-to-multipoint connection (step ST135). The ATM connection controlling unit 47 then performs the instructed operation.

If the target connection is a point-to-multipoint connection, the entry controlling unit 44 instructs the ATM connection controlling unit 47 to add a leaf to the target connection (step ST136). The ATM connection controlling unit 47 then performs the instructed operation.

Upon termination of the connection establishment (step ST137), the packet sending unit 50 transfers the resource reservation messages to the upstream of the path (step ST138). Here, the operations are terminated.

Next, the bandwidth threshold value system is explained. With this system, a sending side boundary device monitors a used bandwidth (bandwidth resource utilization), and a point-to-point connection is established in response to a new resource request if the bandwidth has a space. If the bandwidth exceeds a certain use ratio, a new resource request is merged with an existing connection without establishing a new connection, so that the connection is changed to a point-to-multipoint connection.

To implement these operations, a threshold value is arranged for a used bandwidth of the sending side boundary device in a similar manner to the above described connection identifier threshold value system. The state where the used bandwidth is equal to or smaller than the threshold value is called a bandwidth rich mode, while the state where the used bandwidth is larger than the threshold value is called a bandwidth save mode.

The sending side boundary device monitors the change of the used bandwidth, and allocates point-to-point connections in response to all of resource requests in the bandwidth rich mode.

In the bandwidth save mode, the sending side boundary device selects as a target connection the connection having the bandwidth which is larger than and closest to a requested bandwidth among existing connections in response to the new resource request. Then, the target connection is changed to a point-to-multipoint connection, and the link corresponding to the new resource request is added. The operations that the sending side boundary device performs in the bandwidth save mode are similar to those in the tag save mode, which are shown in FIG. 34. In this way, the consumption of bandwidth resources can be restricted to a certain level or lower, and can be prevented from increasing.

Figure 38:
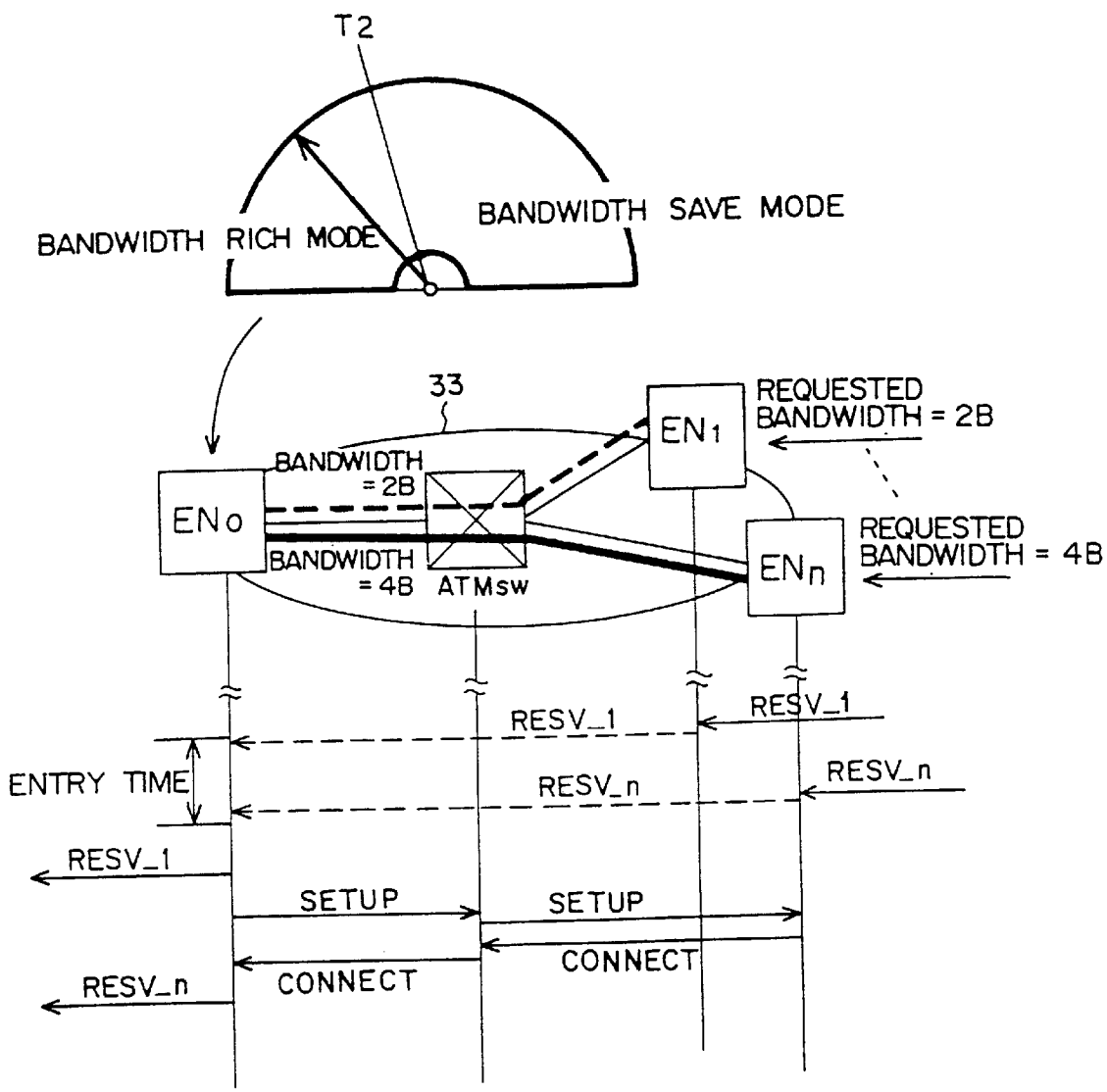
FIG. 38 shows a bandwidth rich mode.
Figure 39:
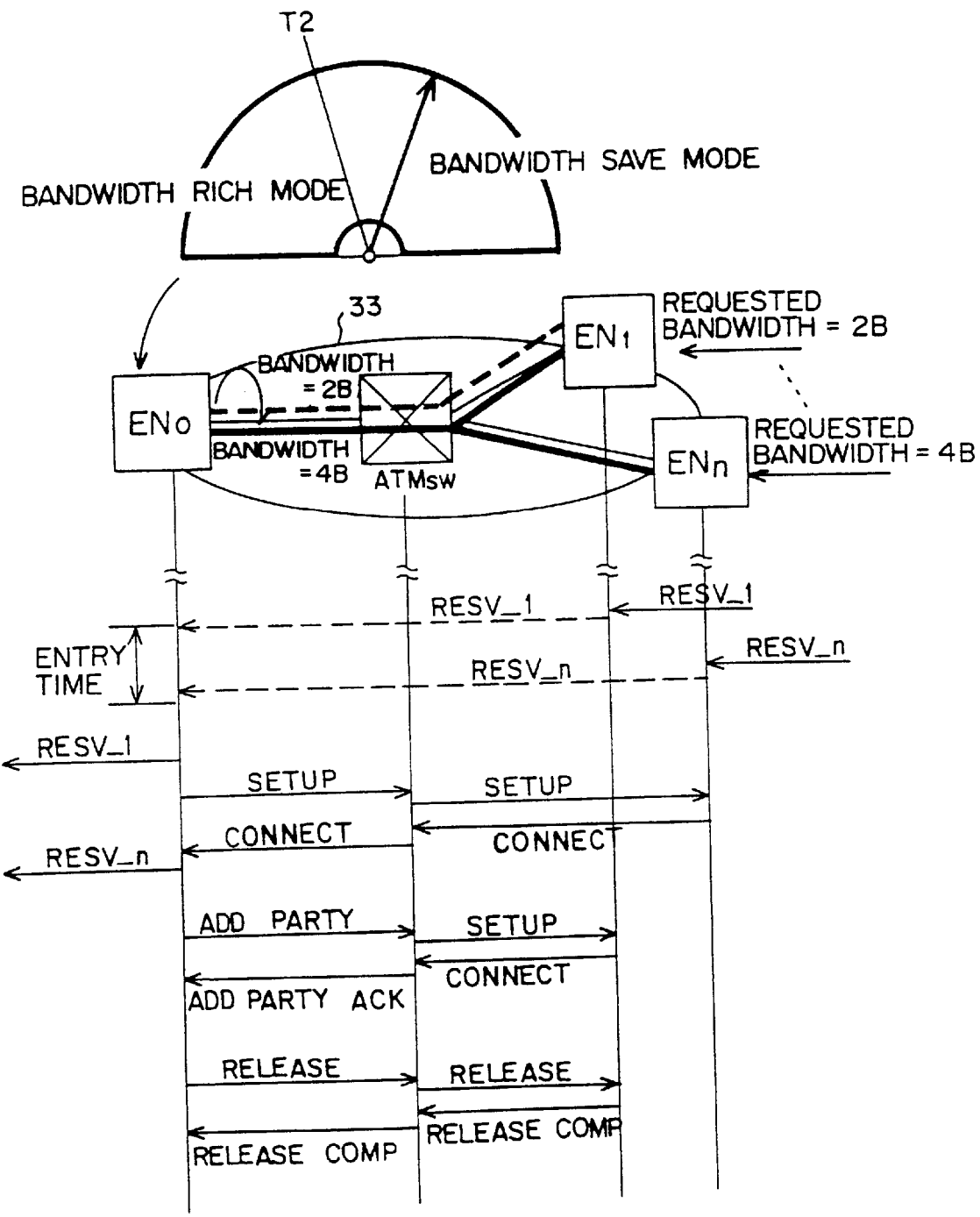
FIG. 39 shows a bandwidth save mode.

FIGS. 38 and 39 respectively show the operational sequences of the bandwidth rich and the bandwidth save modes. These operational sequences are similar to those shown in FIG. 35 and 36. Differences are that a monitor target is not VPI/VCIs but a bandwidth, and that a threshold value T2 is used for a used bandwidth instead of the threshold value T1.

Assume that the physical bandwidths of links in the entire ATM network 33 are homogeneous. In this case, the bandwidth of a link closer to the sending side boundary device starts to be used and decreased if point-to-point connections are fundamentally provided in response to all of resource requests. Accordingly, if the used bandwidth exceeds a threshold value, point-to-point connections are sequentially changed to point-to-multipoint connections. Thus, the system shifts to the state to save the bandwidth of the sending side boundary device.

Furthermore, since an existing connection closest to a requested bandwidth and a resource request are merged, the bandwidth resources of the link closer to the receiving side boundary device are promisingly prevented from being wasted too much in a generated point-to-multipoint connection.

Figure 40:
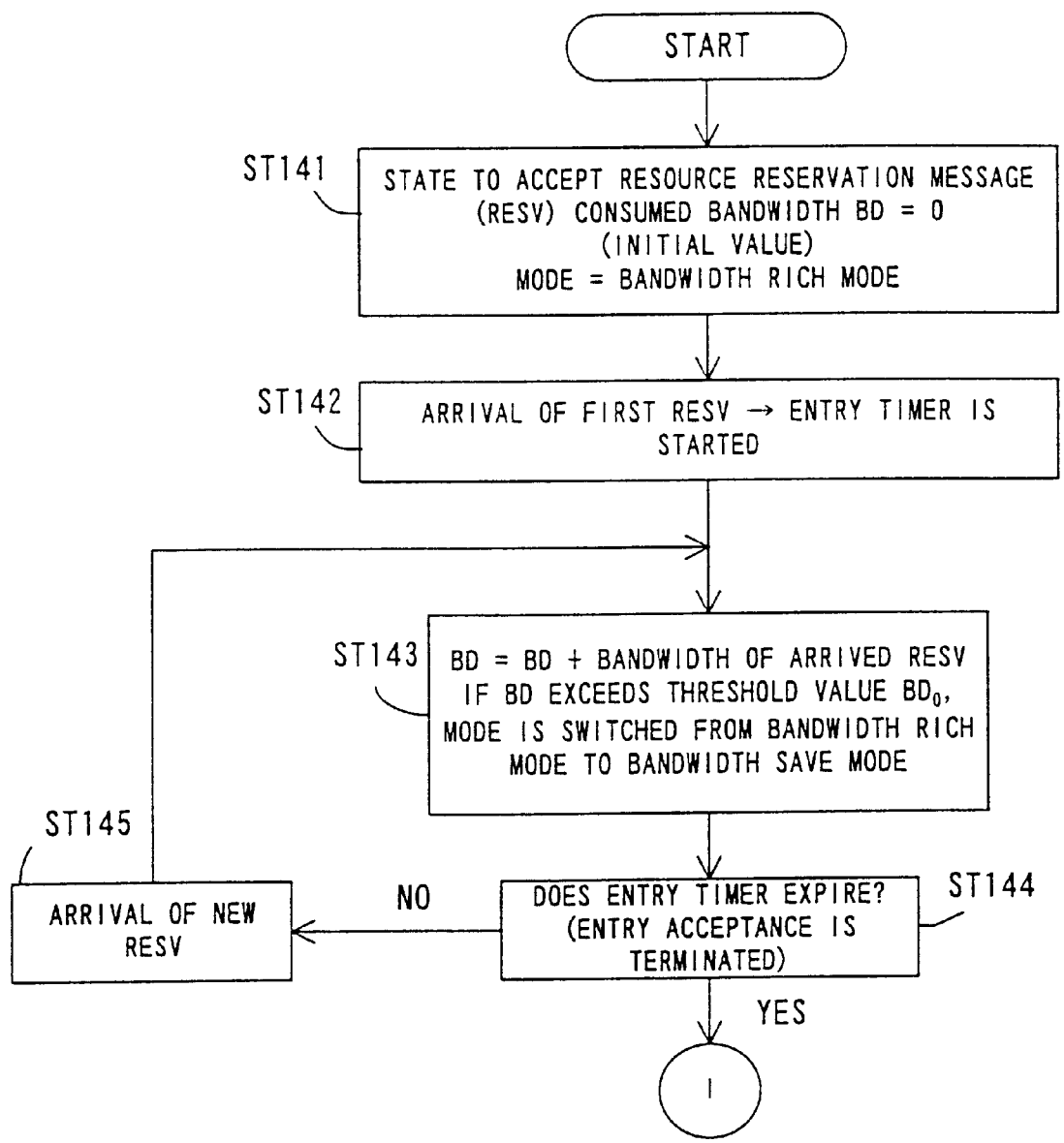
FIG. 40 is a flowchart showing the ninth process performed by the sending side boundary device (No. 1)
Figure 41:
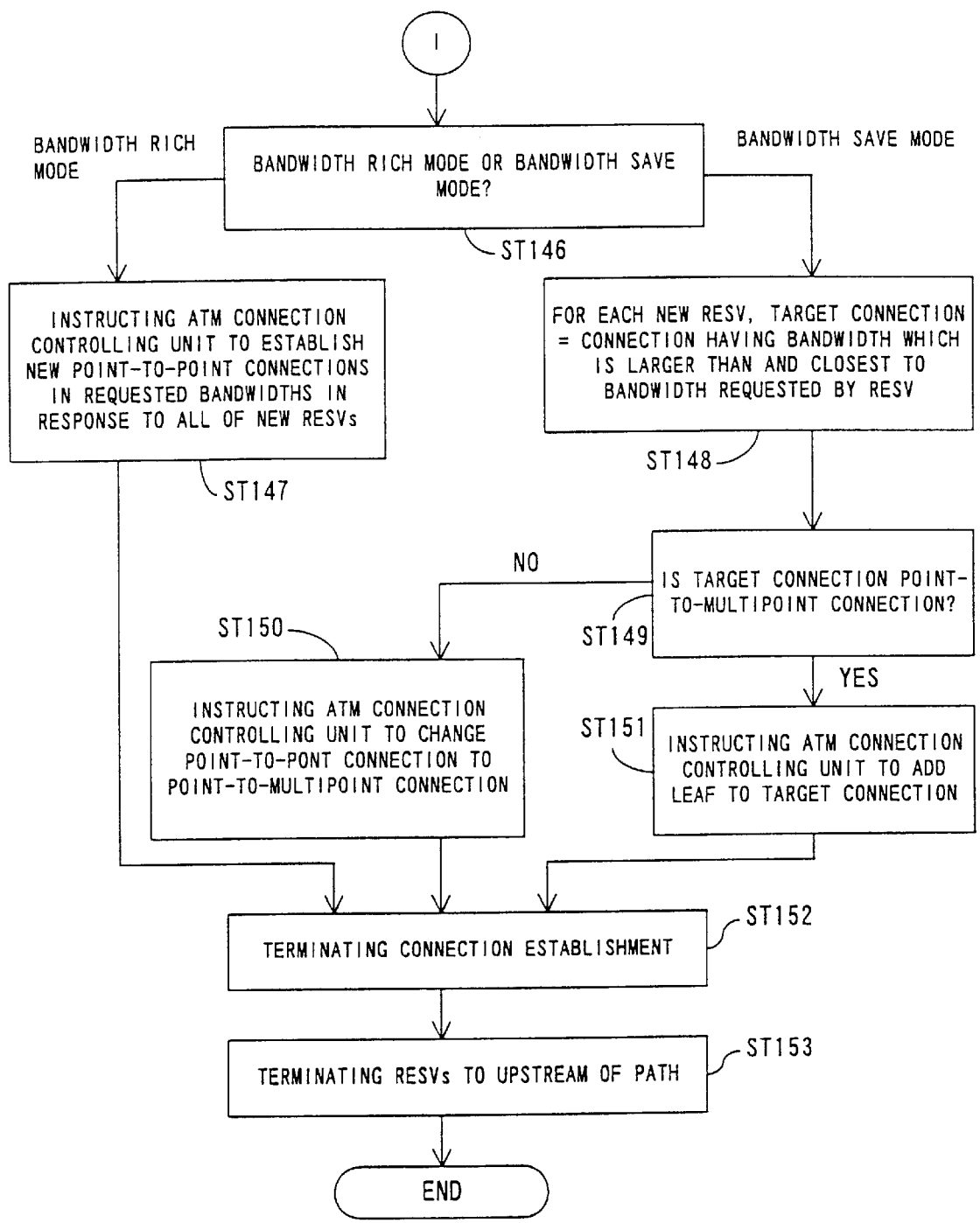
FIG. 41 is a flowchart showing the ninth process performed by the sending side boundary device (No. 2)

FIGS. 40 and 41 are flowcharts showing the operations that the sending side boundary device $EN_0$ performs in the bandwidth threshold value system. The boundary device $EN_0$ enters the state to accept a resource reservation message RESV after sending a path message to the receiving terminals $R_1$ through $R_n$. The entry controlling unit 44 sets to "0" a control variable "BD" indicating the bandwidth requested by an arrived resource reservation message (consumed bandwidth), and further sets the mode to the bandwidth rich mode (step ST141 in FIG. 40). Upon arrival of the first resource reservation message, the count operation by the entry timer 45 is started (step ST142).

Then, the entry controlling unit 44 adds the bandwidth requested by the arrived resource reservation message to "BD", and sets the result of the addition to the variable "BD" (step ST143). If the variable "BD" exceeds a threshold value "$BD_0$", the bandwidth rich mode is switched to the bandwidth save mode. For example, the value obtained by subtracting the already used bandwidth from the threshold value T2 shown in FIG. 38 is used as the threshold value $BD_0$. When BD reaches the threshold value "$BD_0$", the used bandwidth becomes equal to the threshold value T2.

Next, the entry controlling unit 44 determines whether or not the entry timer expires (step ST144). When a new resource reservation message (new RESV) arrives in the case where the count operation by the entry timer 45 is not terminated (step ST145), the operations in and after step ST143 are repeated in response to the arrived resource reservation message.

When the count operation by the entry timer 45 is terminated, the entry controlling unit 44 then determines whether the mode is either the bandwidth rich or the bandwidth save mode (step ST146 in FIG. 41). If the mode is the bandwidth rich mode, the operation similar to that in step ST132 in FIG. 37 is performed in step ST147. If the mode is the bandwidth save mode, the operations similar to those in steps ST133 through ST136 in FIG. 37 are performed in steps ST148 through ST 151.

Upon termination of the connection establishment (step ST152), the packet sending unit 50 transfers the resource reservation messages to the upstream of the path (step ST153). Here, the operations are terminated.

Next, the dual threshold value system is explained. This system is a system which uses both the above described connection identifier threshold value and bandwidth threshold value systems. A sending side boundary device simultaneously monitors the consumption ratio of VPI/VCIS and a consumed bandwidth. If both of the resources are consumed in small amounts, a point-to-point connection is established in response to a new resource request. If the consumption of either of the resources exceeds a certain threshold value, a new resource request is merged with an existing connection without establishing a new connection, so that the existing connection is changed to a point-to-multipoint connection.

Here, the state where the consumption ratio of VPI/VCIs is equal to or smaller than a threshold value T1 and a consumed bandwidth is equal to or smaller than a threshold value T2 is called a resource rich mode, while the state where the consumption ratio of VPI/VCIs exceeds the threshold value T1 or the consumed bandwidth is larger than the threshold value T2 is called a resource save mode. In other words, the state being both the tag rich and the bandwidth rich modes corresponds to the resource rich mode, whereas the state being the tag save or the bandwidth save modes corresponds to the resource save mode.

The sending side boundary device respectively allocates point-to-point connections in response to all of resource requests in the resource rich mode.

Meanwhile, in the resource save mode, the connection having the bandwidth which is larger than and closest to a requested bandwidth among existing connections is selected as a target connection in response to a new resource request. The target connection is then changed to a point-to-multipoint connection, and the link corresponding to the new resource request is added. The operations that the sending side boundary device performs in the resource save mode are similar to those in the tag save mode, which are shown in FIG. 34.

Figure 42:
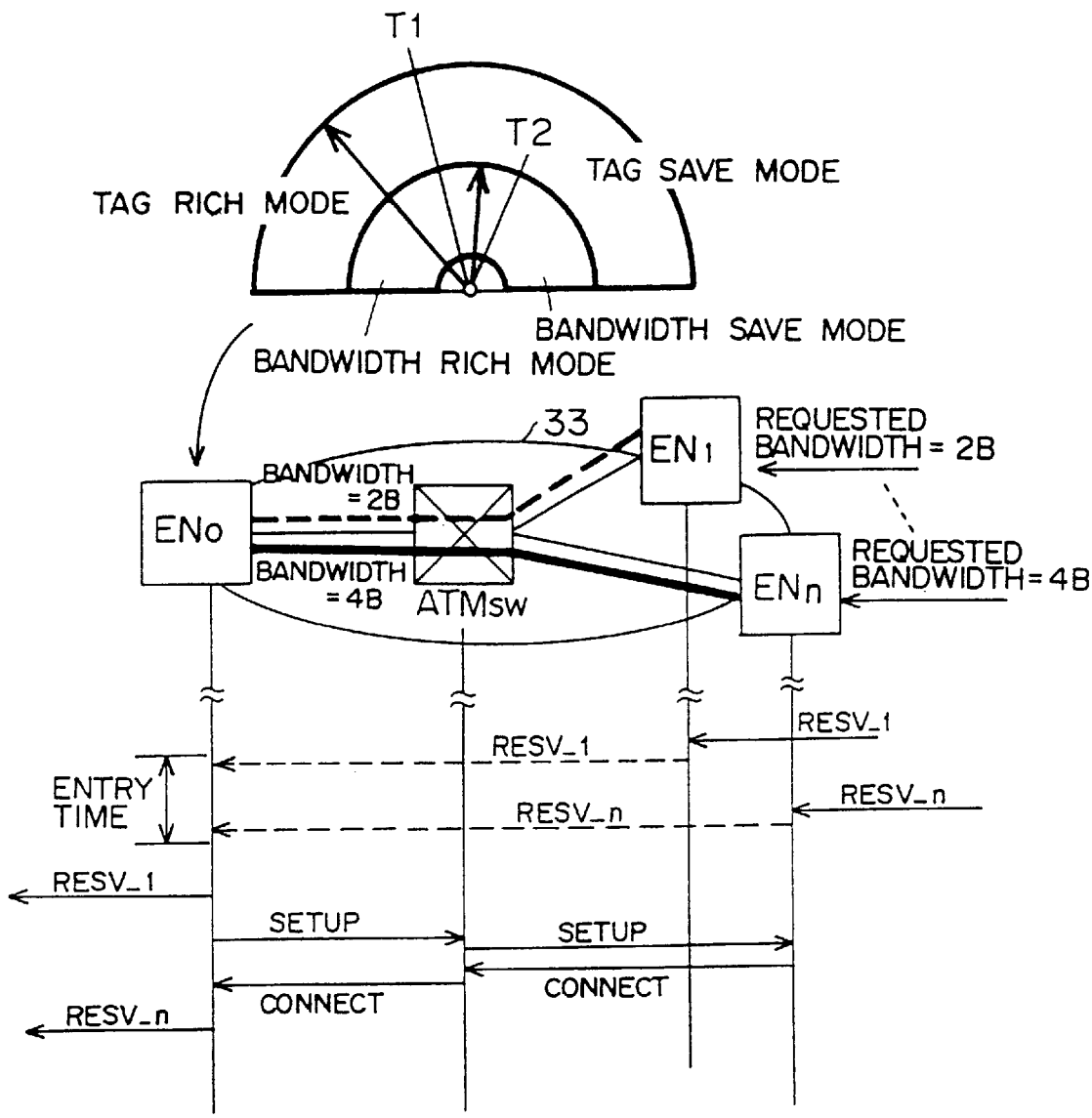
FIG. 42 shows a resource rich mode.
Figure 43:
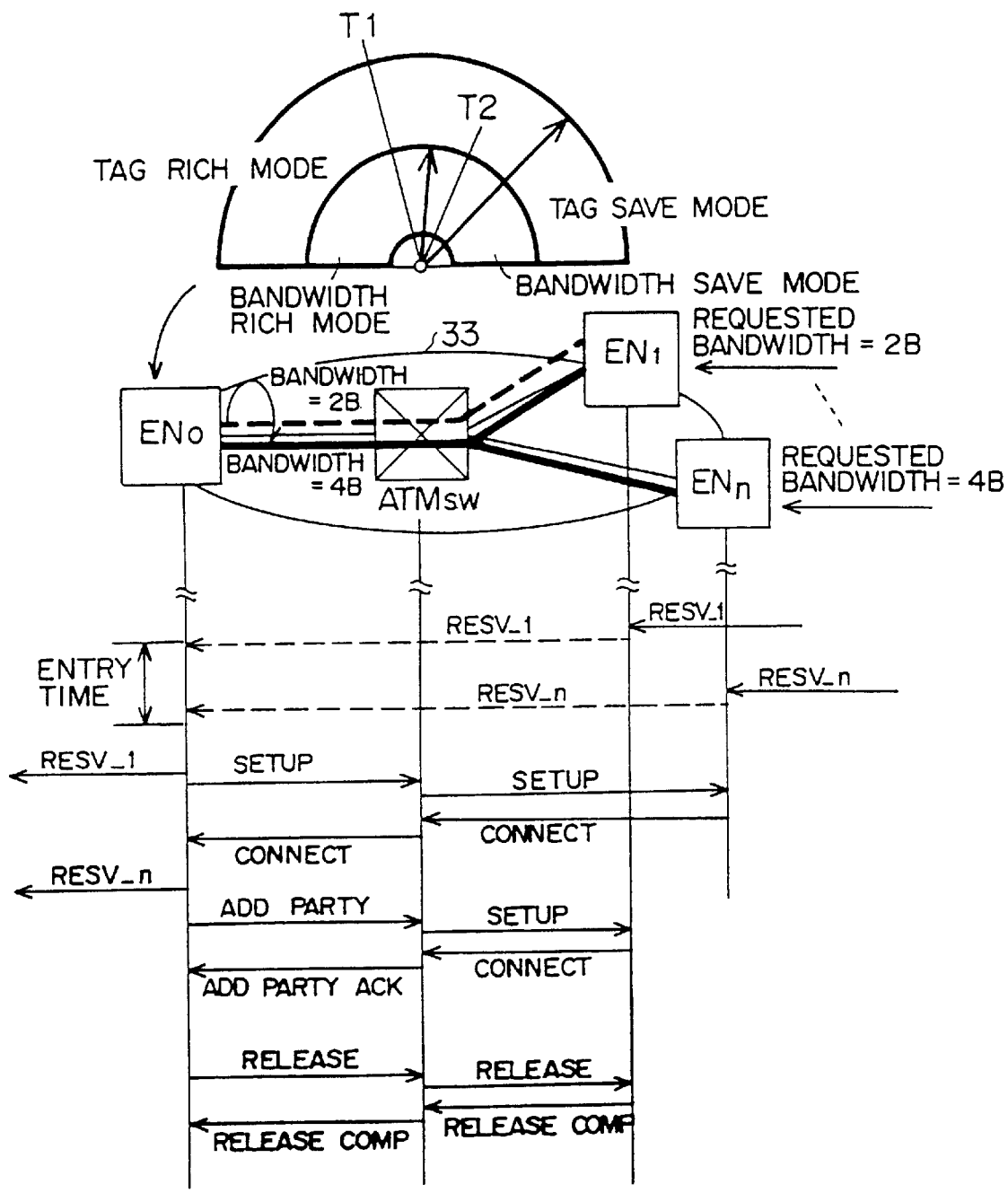
FIG. 43 shows a resource save mode.

FIGS. 42 and 43 respectively show the operational sequences of the resource rich and. the resource save modes. Since the sending side boundary device $EN_0$ is assumed to be in the tag rich and the bandwidth rich modes in FIG. 42, it is in the resource rich mode. In the meantime, since the sending side boundary device is assumed to be in the tag save and the bandwidth rich modes in FIG. 43, it is in the resource save mode. The operational sequences of the resource rich and the resource save modes are similar to those of the tag rich and the tag save modes, which are shown in FIGS. 35 and 36.

This system monitors the VPI/VCI and the bandwidth resources of the sending side boundary device, and can provide an optimum connection by suitably using both point-to-point and point-to-multipoint connections according to the use ratios of the resources.

Figure 45:
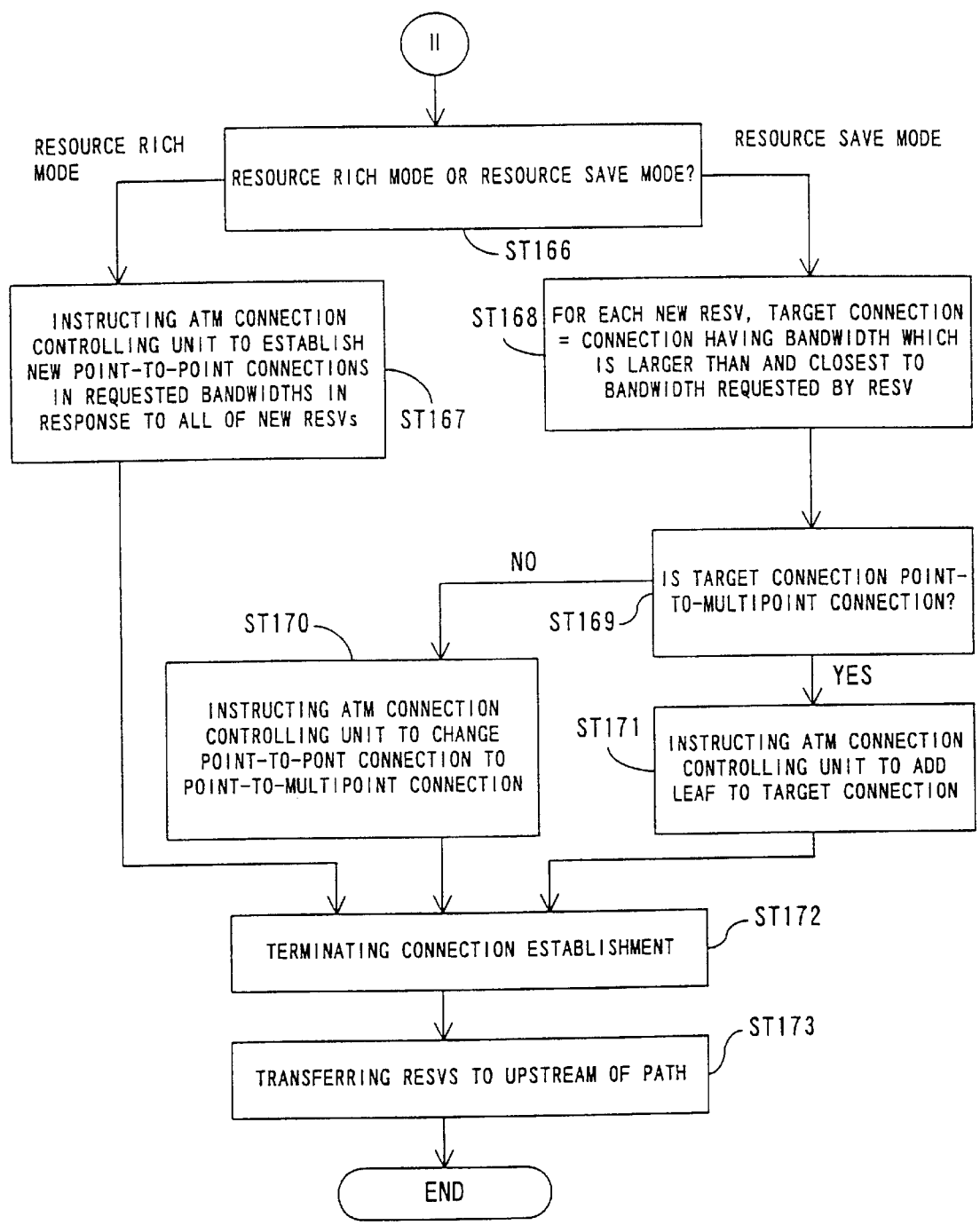
FIG. 45 is a flowchart showing the tenth process performed by the sending side boundary device (No. 2)

FIGS. 44 and 45 are flowcharts showing the operations that the sending side boundary device $EN_0$ performs in the dual threshold value system. The boundary device $EN_0$ enters the state to accept a resource reservation message RESV after sending a path message to the receiving terminals $R_1$ through $R_n$.

At this time, the entry controlling unit 44 sets to "0" a control variable "C" indicating the number of arrived resource reservation messages (the number of connections), sets to "0" a control variable "BD" indicating the bandwidth requested by an arrived resource reservation message (consumed bandwidth), and further sets the mode to the resource rich mode (step ST161 in FIG. 44). Upon arrival of the first resource reservation message, the count operation by the entry timer 45 is started (step ST162).

Next, the entry controlling unit 44 sets C=C+1, adds the bandwidth requested by the arrived resource reservation message to "BD", and sets the result of the addition to the variable "BD" (step ST163). If "C" exceeds the above described threshold value "$C_0$", or if the variable "BD" exceeds the above described threshold value "$BD_0$", the entry controlling unit 44 switches the resource rich mode to the resource save mode.

Next, the entry controlling unit 44 determines whether or not the entry timer 45 expires (step ST164). When a new resource reservation message (new RESV) arrives in the case where the count operation by the entry timer 45 is not terminated (step ST165), the operations in and after step ST163 are repeated in response to the arrived resource reservation message.

When the count operation by the entry timer 45 is terminated, the entry controlling unit 44 then determines whether the mode is either the resource rich mode or the resource save mode. If the mode is the resource rich mode, the operation similar to that in step ST132 in FIG. 37 is performed in step ST167. If the mode is the resource save mode, the operations similar to those in steps ST133 through 136 are performed in steps ST168 through ST171.

Upon termination of the connection establishment (step ST172), the packet sending unit 50 transfers the resource reservation messages to the upstream of the path (step ST173). Here, the operations are terminated.

If the entry time is set to "0" in the above described system for establishing an entry-type connection, the connection establishment operations can be immediately started upon acceptance of a resource request from a receiver.

Figure 46:
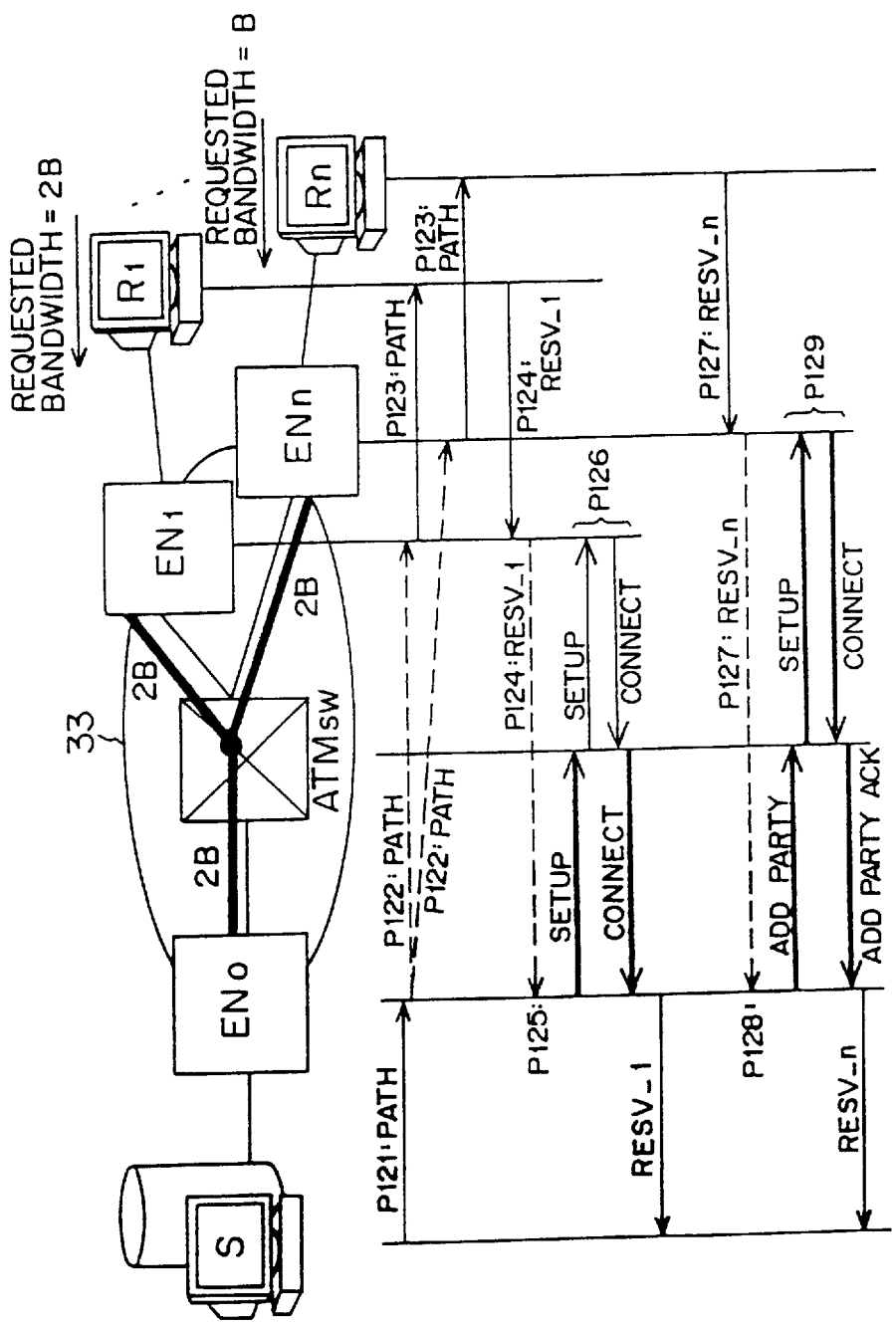
FIG. 46 shows the sequence for immediately establishing a connection.

FIG. 46 shows the sequence of such immediate connection establishment operations. In this example, a point-to-multipoint connection is established within the ATM network 33 according to such a sequence.

P121: A path message PATH is sent from a sending terminal S to all of receiving terminals $R_1$ through $R_n$ in a certain session.

P122: The path message is transferred to respective receiving side boundary devices $EN_1$ through $EN_n$ over a control message connection within the ATM network 33.

P123: The path message arrives at all of the receiving terminals $R_1$ through $R_n$.

P124: The resource reservation message RESV_1 from the receiving terminal $R_1$ arrives at the sending side boundary device $EN_0$ via the boundary device $EN_1$.

P125: Since the entry time is set to "0", the sending side boundary device $EN_0$ immediately starts to establish the connection between the boundary devices $EN_1$ and $EN_0$ itself.

P126: The boundary device $EN_0$ establishes a point-to-multipoint connection between the boundary devices $EN_0$ and $EN_1$ according to the above described signaling procedure.

P127: The resource reservation message RESV_n from the receiving terminal $R_n$ arrives at the sending side boundary device $EN_0$ via the boundary device $EN_n$.

P128: Since the entry time is set to "0", the sending side boundary device $EN_0$ immediately starts to establish the connection between the boundary devices $EN_n$ and $EN_0$ itself.

P129: The sending side boundary device $EN_0$ adds the link to the boundary device $EN_n$ to the point-to-multipoint connection between the boundary devices $EN_0$ and $EN_1$ as a leaf according to the above described signaling procedure.

This system establishes a connection the moment that a resource reservation message arrives at a sending side boundary device. Therefore, it can be said that this is a system faithful to the RSVP operations for sequentially reserving link resources from a downstream each time a resource reservation message passes through. However, if the RSVP operations which can freely change a requested resource at an arbitrary time are faithfully performed, the ATM network 33 is filled with the signaling messages such as the connection establishment/release messages. For this reason, practically, the entry time must be set to a suitable value.

The above described preferred embodiments principally refer to the root-initiated connection establishment methods with which a sending side boundary device establishes an ATM connection. However, a receiving side boundary device may sometimes establish an ATM connection. Next, such leaf-initiated connection establishment methods are explained.

With the leaf-initiated connection establishment method, a receiving side boundary device starts to establish an ATM connection or to request the establishment of an ATM connection at the timing of receiving a resource reservation message from a receiving terminal.

As described above, a resource reservation request is made from a receiving to a sending side according to the RSVP. A receiving terminal writes a requested resource (such as a bandwidth) to a resource reservation message and transfers the message to an upstream device (such as a router) having an RSVP capability, so that the procedure for reserving a resource is started.

Each relay device having the RSVP capability determines whether or not the requested resource can be secured. If the requested resource can be secured, the resource reservation message is transferred to a further upstream device. Eventually, the resource reservation message reaches a sending terminal. If the requested resource is secured at each device on the way to the sending terminal, the resource is finally secured between the sending and the receiving terminal.

Also in the leaf-initiated connection establishment, point-to-point and point-to-multipoint connection are considered as ATM connections to be established.

Initially, the system for establishing a point-to-point connection is explained. FIG. 47 shows the leaf-initiated operations for establishing a point-to-point connection. This figure assumes that a resource is reserved and an ATM connection is established according to RSVP control messages before a sending terminal S transfers actual data. The control messages are transferred between boundary devices by using the above described control message connection.

A receiving side boundary device $EN_n$ which has received a resource reservation message from a receiving terminal $R_n$ establishes an ATM point-to-point connection with the above described signal procedure.

The boundary device $EN_n$ comprises an IP-to-ATM address conversion table memory which makes a correspondence between the IP address and the ATM address of the sending side boundary device $EN_0$ as described above.

Upon receipt of the resource reservation message, the boundary device $EN_n$ learns the IP address of the sending side boundary device $EN_0$ from the information within the message, obtains the corresponding ATM address from the IP-to-ATM address conversion table memory, and establishes a point-to-point connection to the obtained ATM address. The procedure for learning the IP address of the sending side boundary device from the information within the resource reservation message is same as that described earlier.

If the boundary device $EN_n$ does not comprise the IP-to-ATM address conversion table memory, the correspondence between the IP and the ATM address can be obtained, for example, by inquiring an address solution server arranged within the ATM network 33. Such an address solution method is referred to, for example, in the "Classical IP and ARP over ATM" of RFC 1577.

FIG. 48 exemplifies the IP-to-ATM address conversion table memory that the boundary device $EN_n$ comprises. Here, the correspondences between the IP address "2" and the ATM address "A" of the boundary device $EN_0$, and between the IP address "3" and the ATM address "2" of the boundary device $EN_n$ are registered. The establishment of the point-to-point connection shown in FIG. 47 is performed with the following procedure.

P131: The receiving side boundary device $EN_n$ receives a resource reservation message from the receiving terminal $R_n$.

P132: The receiving side boundary device $EN_n$ references the flow state corresponding to the flow identifier "F" of the resource reservation message, and obtains the IP address "2" of the upstream side device corresponding to the flow identifier "F". If the destination IP address is used as the flow identifier, "F" is "4". This is because the IP address of the receiving terminal $R_n$ being the transfer destination of data is "4".

P133: The receiving side boundary device $EN_n$ obtains the ATM address "A" corresponding to the obtained IP address "2" from the IP-to-ATM address conversion table memory shown in FIG. 48.

P134: The receiving side boundary device $EN_n$ establishes a point-to-point connection to the sending side boundary device $EN_0$ having the ATM address "A" according to the ATM signaling procedure.

Even if the establishment of the connection from the receiving side boundary device $EN_n$ is completed within the ATM network 33, the sending side boundary device $EN_0$ cannot flow data in this state. This is because it is not known which flow the connection corresponds to. As the methods for making a correspondence between an established ATM connection and an RSVP flow, a first method using the information of an ATM data connection, and a second method using the information of an ATM control message connection are considered.

With the first method for making a correspondence, the receiving side boundary device $EN_n$ transfers a resource reservation message to the sending side boundary device $EN_0$ by using an established ATM data connection. The sending side boundary device $EN_0$ then makes a correspondence between an RSVP flow and the ATM connection by using the ATM connection information included in the message.

Since the sending side boundary device $EN_0$ stores the VPI/VCIs of established ATM connections, it can make a correspondence between a flow identifier of a resource reservation message and VPI/VCI of a particular ATM connection by receiving the resource reservation message through the ATM connection having the VPI/VCI.

If this correspondence is stored in a table memory, to which ATM connection a data packet is to be transferred can be known by referencing the flow identifier (destination IP address) of the data packet upon arrival of the data packet from a sending terminal S.

Figure 49:
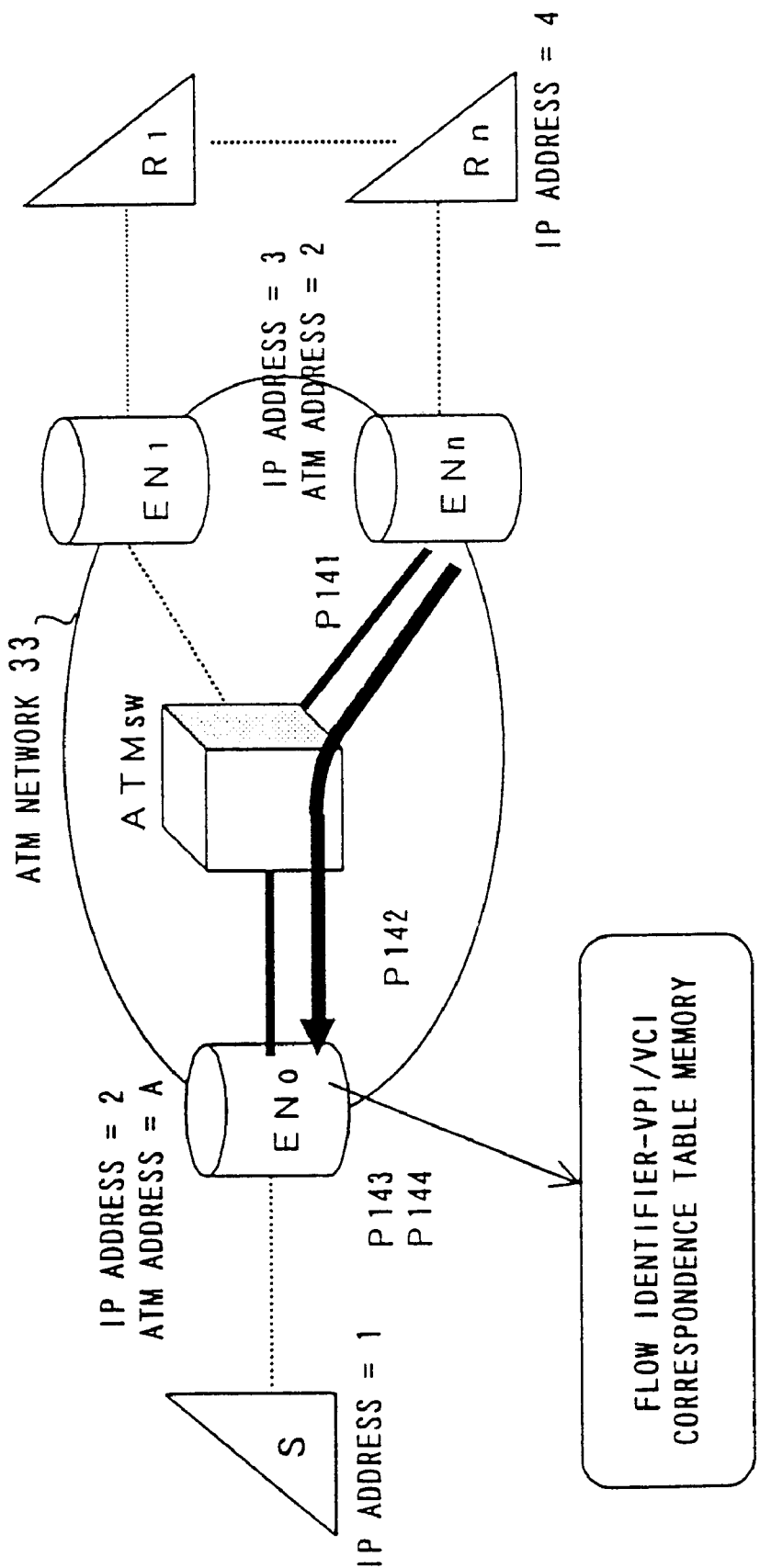
FIG. 49 shows the first method for making a correspondence.
Figure 50:
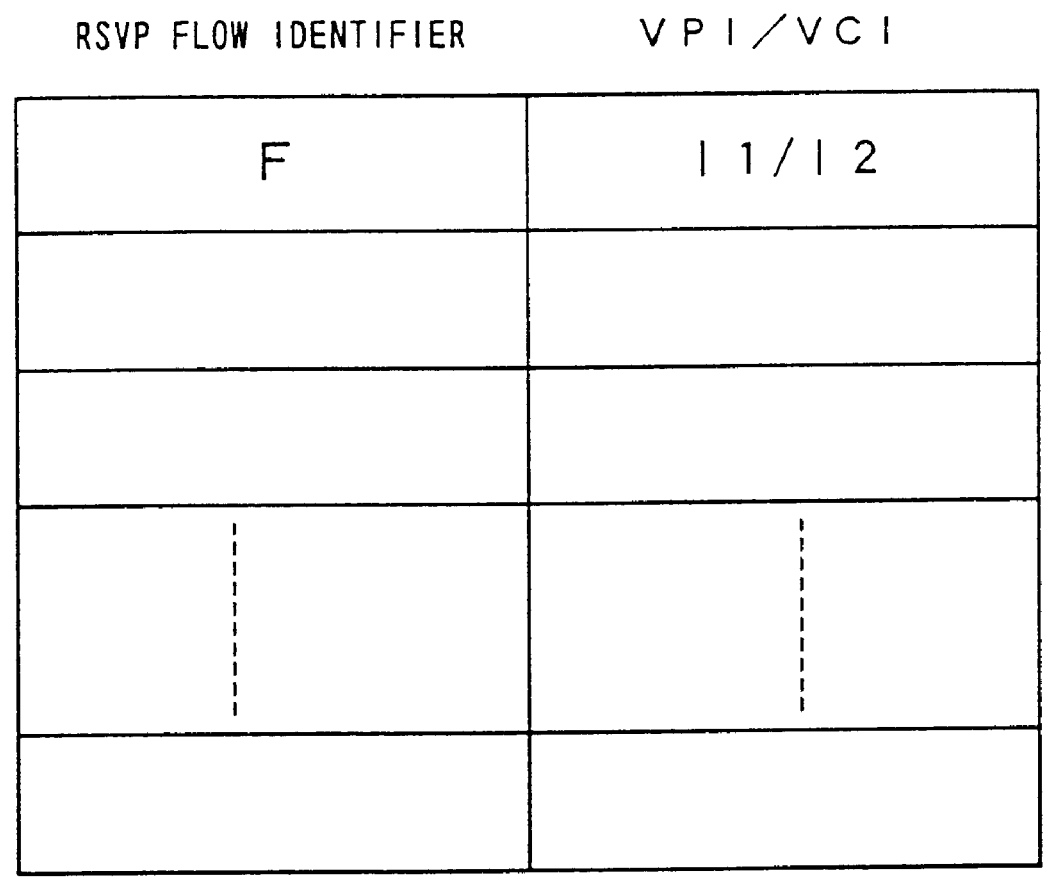

FIG. 49 shows the operations of the first method for making a correspondence. FIG. 50 exemplifies a flow identifier-VPI/VCI correspondence table memory, which is stored by the sending side boundary device $EN_0$. Here, the correspondence between the flow identifier "F" and the VPI=I1/VCI=I2 is registered. In FIG. 49, the correspondence between an ATM connection and an RSVP flow is made according to the following procedure.

P141: The receiving side boundary device $EN_n$ completes the establishment of a point-to-point connection.

P142: The receiving side boundary device $EN_n$ transfers the resource reservation message from the receiving terminal $R_n$ by using an established connection.

P143: Upon receipt of the resource reservation message, the sending side boundary device $EN_0$ registers the flow identifier "F" of the message and "I1/I2" being the VPI/VCI of the connection used for receiving the message to the flow identifier-VPI/VCI correspondence table memory, which is shown in FIG. 50. For example, the destination IP address "4" is used as the flow identifier.

P144: Upon receipt of the data packet from the sending terminal S, the sending side boundary device $EN_0$ references the destination IP address "4", recognizes this address as the flow identifier "F", and obtains "I1/I2" being the corresponding VPI/VCI from the flow identifier-VPI/VCI correspondence table memory, which is shown in FIG. 50. Next, the sending side boundary device $EN_0$ converts the data packet into an ATM cell, and sends the ATM cell to the connection corresponding to "I1/I2".

Figure 51:
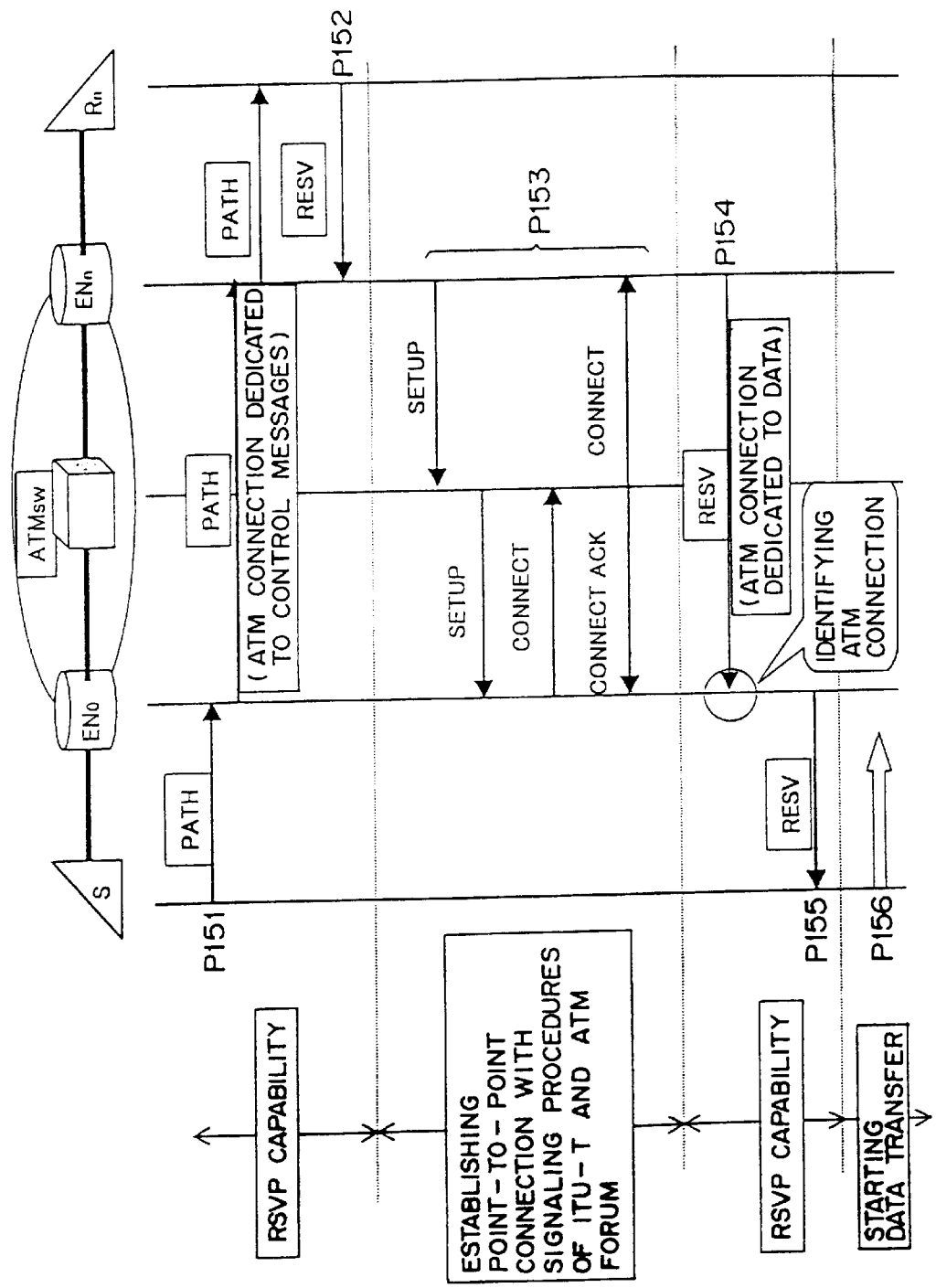
FIG. 51 shows the sequence for establishing a connection with the first method for making a correspondence.

FIG. 51 shows the sequence for establishing a point-to-point connection with the first method for making a correspondence. In this example, a point-to-point connection is established according to the following sequence.

P151: The path message PATH from the sending terminal S is transferred to the receiving terminal $R_n$ by using the control message connection.

P152: The receiving terminal $R_n$ sends a resource reservation message RESV to the receiving side boundary device $EN_n$.

P153: The receiving side boundary device $EN_n$ establishes a point-to-point connection according to the signaling procedure.

P154: The receiving side boundary device $EN_n$ transfers the resource reservation message RESV to the sending side boundary device $EN_0$ by using the established data connection. AT this time, the sending side boundary device $EN_0$ identifies a data connection, and registers necessary information to the flow identifier-VPI/VCI correspondence table memory.

P155: The receiving side boundary device $EN_n$ transfers the resource reservation message RESV to the sending terminal S.

P156: The sending terminal starts a data transfer by using the flow identifier of the received resource reservation message RESV.

As described above, the receiving side boundary device transfers the resource reservation message to the sending side boundary device by using the established ATM data connection, so that the connection and the flow can be corresponded.

FIG. 52 exemplifies the configuration of the receiving side boundary device using the first method for making a correspondence. The boundary device shown in FIG. 52 comprises a packet receiving unit 51, an RSVP message processing unit 52, an IP-to-ATM address conversion table memory 53, an ATM resource determining unit 54, an ATM connection controlling unit 55, a packet-to-cell converting unit 56, and a cell sending unit 57.

The packet sending unit 51 receives the IP packet from a receiving terminal, and transfers the IP packet to the RSVP message processing unit 52. If the received message is a resource reservation message, the RSVP message processing unit 52 notifies the ATM resource determining unit 54 of the resource reservation information included in the message.

Additionally, the RSVP message processing unit 52 stores as a path state a destination IP address and its previous hop IP address. The RSVP message processing unit 52 obtains from the path state the previous hop IP address corresponding to the destination IP address based on the destination IP address included in the message (that is, the IP address of the sending side boundary device), and notifies the IP-to-ATM address conversion table memory 53 of the obtained address. The text of the message is transferred to the packet-to-cell converting unit 56.

The IP-to-ATM address conversion table memory 53 outputs to the ATM connection controlling unit 55 the ATM address corresponding to the IP address notified from the RSVP message processing unit 52 (that is, the ATM address of the sending side boundary device).

The ATM resource determining unit 54 determines whether or not an ATM connection can be accepted for the resource reservation message from the RSVP message processing unit 52. If the ATM resource determining unit 54 determines that the ATM connection can be accepted, it sends an acceptance notification to the ATM connection controlling unit 55.

The ATM connection controlling unit 55 controls the setting of the ATM connection, generates an ATM signaling message at the timing of receiving the acceptance notification from the ATM resource determining unit 54, and transfers the generated message to the cell sending unit 57.

The packet-to-cell converting unit 56 converts the message in the form of the IP packet, which is received from the RSVP message processing unit 42, into an ATM cell, and transfers the obtained ATM cell to the cell sending unit 57. The cell sending unit 57 sends the ATM cell to the sending side.

FIG. 53 exemplifies the configuration of the sending side boundary device $EN_0$ using the first method for making a correspondence. The boundary device shown in FIG. 53 comprises a cell receiving unit 61, an RSVP message processing unit 62, a flow identifier-VPI/VCI correspondence table memory 63, a cell-to-packet converting unit 64, a packet sending unit 65, a packet receiving unit 66, an IP packet processing unit 67, a packet-to-cell converting unit 68, and a cell sending unit 69.

The cell receiving unit 61 receives the IP packet from the receiving side boundary device as an ATM cell, and transfers the message included in the ATM cell to the RSVP message processing unit 62. Then, the cell receiving unit 61 notifies the flow identifier-VPI/VCI correspondence table memory 63 of the VPI/VCI of the ATM link used for the reception.

If the received message is a resource reservation message, the RSVP message processing unit 62 notifies the flow identifier-VPI/VCI correspondence table memory 63 of the destination IP address (flow identifier) included in the message. The RSVP message processing unit 62 then transfers the text of the message to the cell-to-packet converting unit 64.

The flow identifier-VPI/VCI correspondence table memory 63 stores the VPI/VCI notified from the cell receiving unit 61 and the IP address notified from the RSVP message processing unit 62 as a pair.

The cell-to-packet converting unit 64 converts the message in the form of the cell received from the RSVP message processing unit 62 into an IP packet, and transfers the obtained IP packet to the packet sending unit 65. The packet sending unit 65 sends the IP packet received from the cell-to-packet converting unit 64 to the sending terminal.

The packet receiving unit 66 receives the IP packet from the sending terminal, and transfers the IP packet to the IP packet processing unit 67. The IP packet processing unit 67 notifies the flow identifier-VPI/VCI correspondence table memory 63 of the destination IP address of the received IP packet, and transfers the IP packet to the packet-to-cell converting unit 68.

At this time, the flow identifier-VPI/VCI correspondence table memory 63 outputs to the cell sending unit 69 the VPI/VCI corresponding to the IP address notified from the IP packet processing unit 67.

The packet-to-cell converting unit 68 converts the IP packet received from the IP packet processing unit 67 into an ATM cell, and transfers the ATM cell to the cell sending unit 69. The cell sending unit 69 sends the ATM cell received from the packet-to-cell converting unit 68 to the ATM connection on the receiving side, which corresponds to the VPI/VCI received from the flow identifier-VPI/VCI correspondence table memory 63.

Next, the second method for making a correspondence is explained. With this method, the receiving side boundary device $EN_n$ generates a control message including ATM connection information and RSVP flow information, and transfers the control message to the sending side boundary device $EN_0$ by using a preestablished control message connection. The sending side boundary device $EN_0$ makes a correspondence between the RSVP flow and the ATM connection by using the connection information included in the received control message.

With the second method, the connection information stored by the boundary devices on both of the sides are used instead of the VPI/VCI of a connection, which is used with the first method.

In a device having an ATM call establishment capability, it is a normal routine to include in a signaling message a pair of an ATM address of a destination and an ATM connection (call) reference identifier for uniquely identifying an ATM connection, and to send the signaling message when establishing a connection. This ATM connection reference identifier is defined as a call reference in the UNI 4.0 and the Q.2931 recommendation, and is included all of signaling messages.

Accordingly, the devices on a call originating and terminating side respectively store both a pair of the ATM address and the ATM connection reference identifier of an established connection, and the corresponding VPI/VCI.

Accordingly, if the receiving side boundary device $EN_n$ notifies an RSVP flow identifier and a pair of the ATM address and the ATM connection reference identifier of an established connection, the sending side boundary device $EN_0$ which receives the above described identifier and pair can learn to which flow the connection having the ATM address and the ATM connection reference identifier corresponds. For the notification of the flow identifier and the pair of the ATM address and the ATM connection reference identifier, the control packet which is newly generated by the receiving side boundary device $EN_n$ is used.

Figure 54:
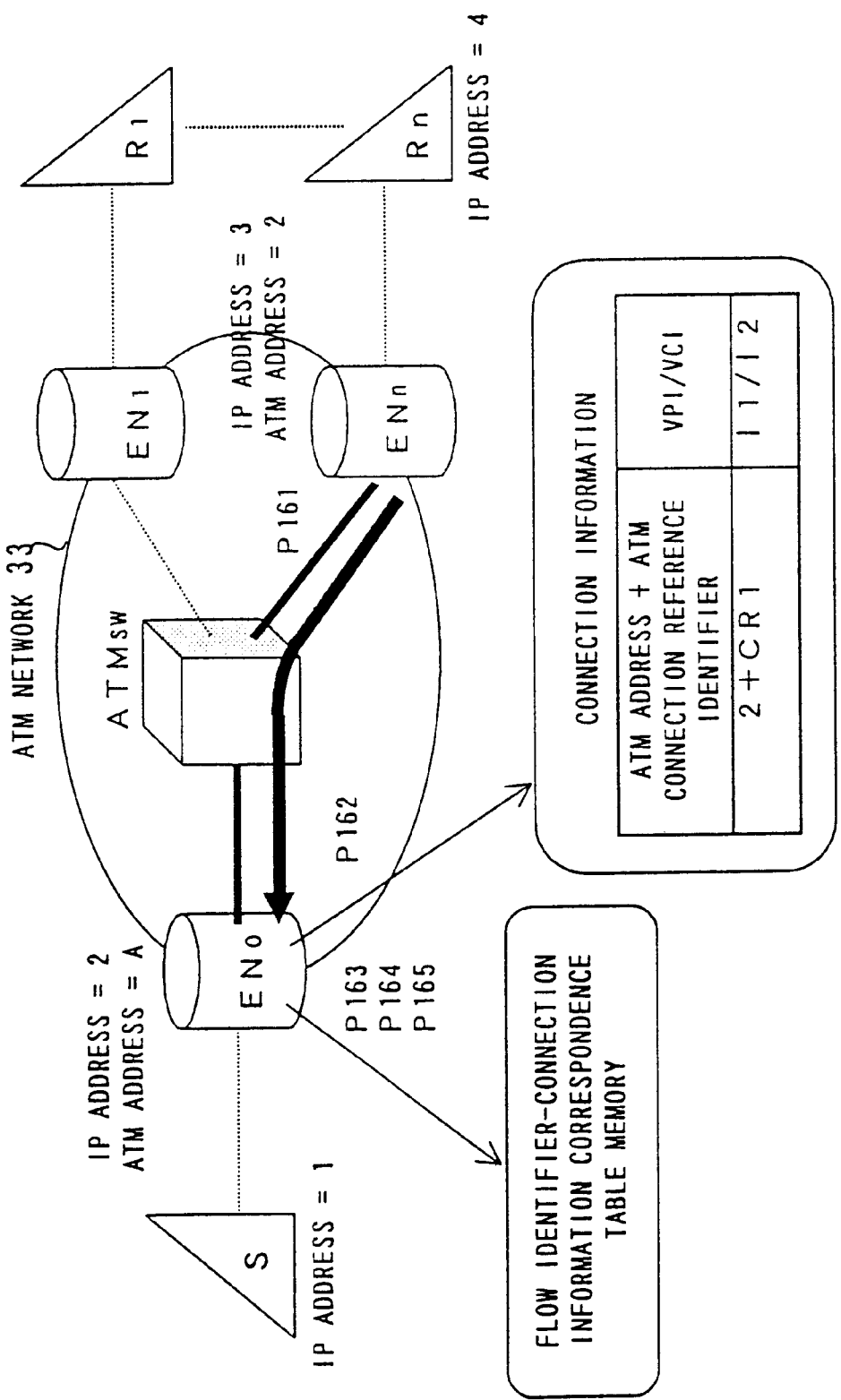
FIG. 54 shows the second method for making a correspondence.

FIG. 54 shows the operations of the second method for making a correspondence. FIG. 55 exemplifies the flow identifier-connection information correspondence table memory stored by the sending side boundary device $EN_0$. Here, the correspondence between the flow identifier "F" and the pair of the ATM address "2" and the ATM connection reference identifier "CR1" is registered. In FIG. 54, the correspondence between the ATM connection and the RSVP flow is made with the following procedure.

P161: The receiving side boundary device $EN_n$ completes the establishment of a point-to-point connection. At this time point, the sending side boundary device $EN_0$ obtains as connection information the pair of the ATM address and the ATM connection reference identifier relating to the established data connection and the VPI/VCI. Here, the correspondence between the pair of the ATM address "2" of the receiving side boundary device $EN_n$ and the ATM connection reference identifier "CR1", and VPI=I1/VCI=I2 is registered.

P162: The receiving side boundary device $EN_n$ transfers to the sending side boundary device $EN_0$ the connection information notification message including the flow identifier "F" and the pair of the ATM address "2" and the ATM connection reference identifier "CR1" by using the control message connection.

P163: Upon receipt of the connection information notification message, the sending side boundary device $EN_0$ registers the notified flow identifier "F" and the pair of the ATM address "2" and the ATM connection reference identifier "CR1" to the flow identifier-connection information correspondence table memory shown in FIG. 55. For example, the destination IP address "4" is used as the flow identifier. Use of the registered information at this time and the connection information registered in P161 allows the correspondence between a flow and a data connection to be identified.

P164: Upon receipt of the data packet from the sending terminal S, the sending side boundary device $EN_0$ references its destination IP address, recognizes that the address indicates the flow identifier "F", and obtains the corresponding pair of the ATM address "2" and the ATM connection reference identifier "CR1" from the flow identifier-connection information correspondence table shown in FIG. 55.

P165: The sending side boundary device $EN_0$ obtains the VPI/VCI "I1/I2" corresponding to the pair of the ATM address "2" and the ATM connection reference identifier "CR1". Then, the data packet is converted into an ATM cell, which is sent to the connection corresponding to "I1/I2".

Figure 56:
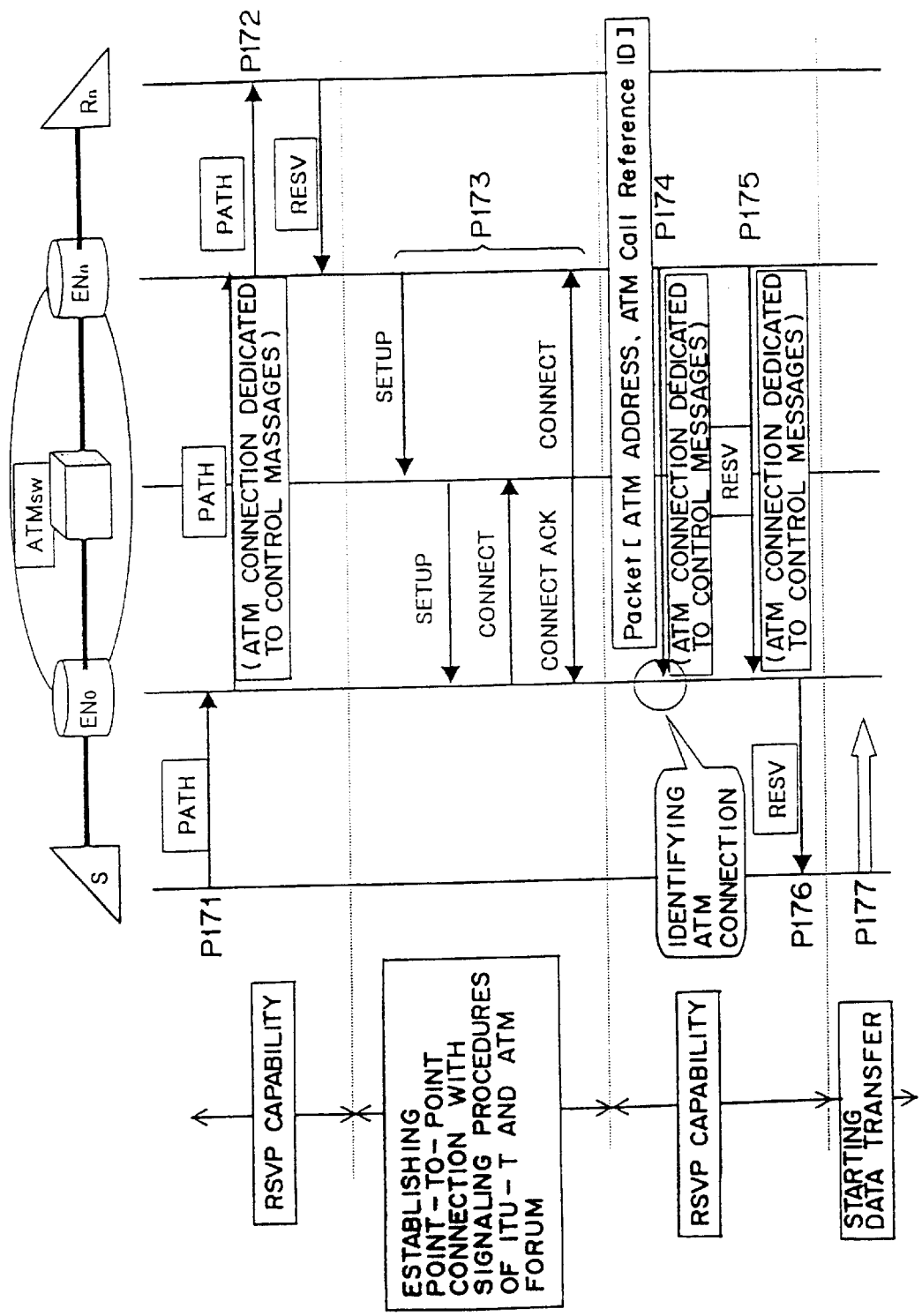
FIG. 56 shows the sequence for establishing a connection with the second method for making a correspondence.

FIG. 56 shows the point-to-point connection establishment sequence using the second method for making a correspondence. In this example, a point-to-point connection is established according to the following sequence.

P171: A path message PATH from the sending terminal S is transferred to the receiving terminal $R_n$ by using the control message connection.

P172: The receiving terminal $R_n$ sends a resource reservation message RESV to the receiving side boundary device $EN_n$.

P173: The receiving side boundary device establishes a point-to-point connection according to the signaling procedure.

P174: The receiving side boundary device $EN_n$ transfers a connection information notification message to the sending side boundary device $EN_0$ by using the control message connection. At this time, the sending side boundary device $EN_0$ registers necessary information to the flow identifier-connection information correspondence table memory based on the connection information notification message, and identifies a data connection.

P175: The receiving side boundary device $EN_n$ transfers the resource reservation message RESV to the sending side boundary device $EN_0$ by using the control message connection.

P176: The sending side boundary device $EN_0$ transfers the resource reservation message RESV to the sending terminal S.

P177: The sending terminal S starts a data transfer by using the flow identifier of the received resource reservation message RESV.

As described above, the receiving side boundary device transfers the control message including the connection information of an established ATM data connection and the RSVP flow information to the sending side boundary device, so that the connection and the flow can be corresponded.

FIG. 57 exemplifies the configuration of the receiving side boundary device using the second method for making a correspondence. The boundary device shown in FIG. 57 comprises a packet receiving unit 71, an RSVP message processing unit 72, an IP-to-ATM address conversion table memory 73, an ATM resource determining unit 74, an ATM connection controlling unit 75, a packet-to-cell converting unit 76, a cell sending unit 77, and a message generating unit 78.

The fundamental operations of the packet receiving unit 71, the RSVP message processing unit 72, the IP-to-ATM address conversion table memory 73, the ATM resource determining unit 74, the ATM connection controlling unit 75, the packet-to-cell converting unit 76, and the cell sending unit 77 are similar to those of the packet receiving unit 51, the RSVP message processing unit 52, the IP-to-ATM address conversion table memory 53, the ATM resource determining unit 54, the ATM connection controlling unit 55, the packet-to-cell converting unit 56, and the cell sending unit 57, which are shown in FIG. 52. Furthermore, this boundary device performs the following operations.

The RSVP message processing unit 72 notifies the message generating unit 78 of the destination IP address (flow identifier) within the resource reservation message received from the packet receiving unit 71 and the corresponding previous hop IP address. Additionally, the ATM connection controlling unit 75 transfers the pair of the destination ATM address and the ATM connection reference identifier of an established ATM connection to the message generating unit 78.

The message generating unit 78 generates an IP packet of the connection information notification message including the pair of the destination ATM address and the ATM connection reference identifier, which is received from the ATM connection controlling unit 75. The message generating unit 78 then transfers the generated IP packet to the packet-to-cell converting unit 76 by using as a destination the previous hop IP address (that is, the IP address of the sending side boundary device) received from the RSVP message processing unit 72.

FIG. 58 exemplifies the configuration of the sending side boundary device $EN_0$ using the second method for making a correspondence. The boundary device shown in FIG. 58 comprises a cell receiving unit 81, a message processing unit 82, a flow identifier-connection information correspondence table memory 83, a cell-to-packet converting unit 84, a packet sending unit 85, a packet receiving unit 86, an IP packet processing unit 87, a packet-to-cell converting unit 88, a cell sending unit 89, and an ATM connection controlling unit 90.

The fundamental operations of the packet sending unit 85, the packet receiving unit 86, the packet-tocell converting unit 88, and the cell sending unit 89 are similar to those of the packet sending unit 65, the packet receiving unit 66, the packet-to-cell converting unit 68, and the cell sending unit 69, which are shown in FIG. 53. Furthermore, this boundary device performs the following operations.

The cell receiving unit 81 receives the IP packet from the receiving side boundary.device as an ATM cell, and transfers the message included in the IP packet to the message processing unit 82. If the received message is a connection information notification message, the message processing unit 82 notifies the flow identifier-connection information correspondence table memory 83 of the destination IP address (flow identifier) included in the message and the pair of the ATM address and the ATM connection reference identifier. The message processing unit 82 then transfers the text of the message to the cell-to-packet converting unit 84.

The flow identifier-connection information correspondence table memory 83 stores the destination IP address and the pair of the ATM address and the ATM connection reference identifier notified from the message processing unit 82. The cell-to-packet converting unit 84 converts the message in the form of the cell received from the message processing unit 82 into an IP packet, and transfers the IP packet to the packet sending unit 85.

The packet receiving unit 86 receives the IP packet from the sending terminal, and transfers the IP packet to the IP packet processing unit 87. The IP packet processing unit 87 notifies the flow identifier-connection information correspondence table memory 83 of the destination IP address of the received IP packet, and transfers the IP packet to the packet-to-cell converting unit 88.

At this time, the flow identifier-connection information correspondence table memory 83 outputs the pair of the ATM address and the ATM connection reference identifier corresponding to the IP address notified from the IP packet processing unit 87 to the ATM connection controlling unit 90.

The ATM connection controlling unit 90 stores as connection information the correspondence between a pair of an ATM address and an ATM connection reference identifier, and a VPI/VCI. The ATM connection controlling unit 90 notifies the cell sending unit 89 of the VPI/VCI corresponding to the pair of the ATM address and the ATM connection reference identifier, which is received from the flow identifier-connection information correspondence table memory 83.

The packet-to-cell converting unit 88 converts the IP packet received from the IP packet processing unit 87 into an ATM cell, and transfers the ATM cell to the cell sending unit 89. The cell sending unit 89 sends the ATM cell received from the packet-to-cell converting unit 88 to the ATM connection on the receiving side, which corresponds to the VPI/VCI received from the ATM connection controlling unit 90.

Next, the system for establishing a leaf-initiated point-to-multipoint connection is explained. In this system, when one receiving side boundary device receives a resource reservation message, a message requesting to join the point-to-multipoint connection established between a sending side boundary device and another receiving side boundary device is sent to the sending side boundary device.

Specifically, the signaling procedure of the Root LIJ (Leaf Initiated Join) stipulated by the ATM Forum are used. With this procedure, after an ATM switch on a leaf side issues the request to join a point-to-multipoint connection to an ATM switch on a root side, the ATM switch which has received the request adds a leaf.

With such a system, the device on the leaf side sends a join requesting message LEAF SETUP REQUEST to the device on the root side. The ATM address of the device as the destination of the join requesting message and the LIJ call identifier of the point-to-multipoint connection to be joined are written to the message. The LIJ call identifier corresponds to, what is called, a program in an ATM layer.

Figure 59:
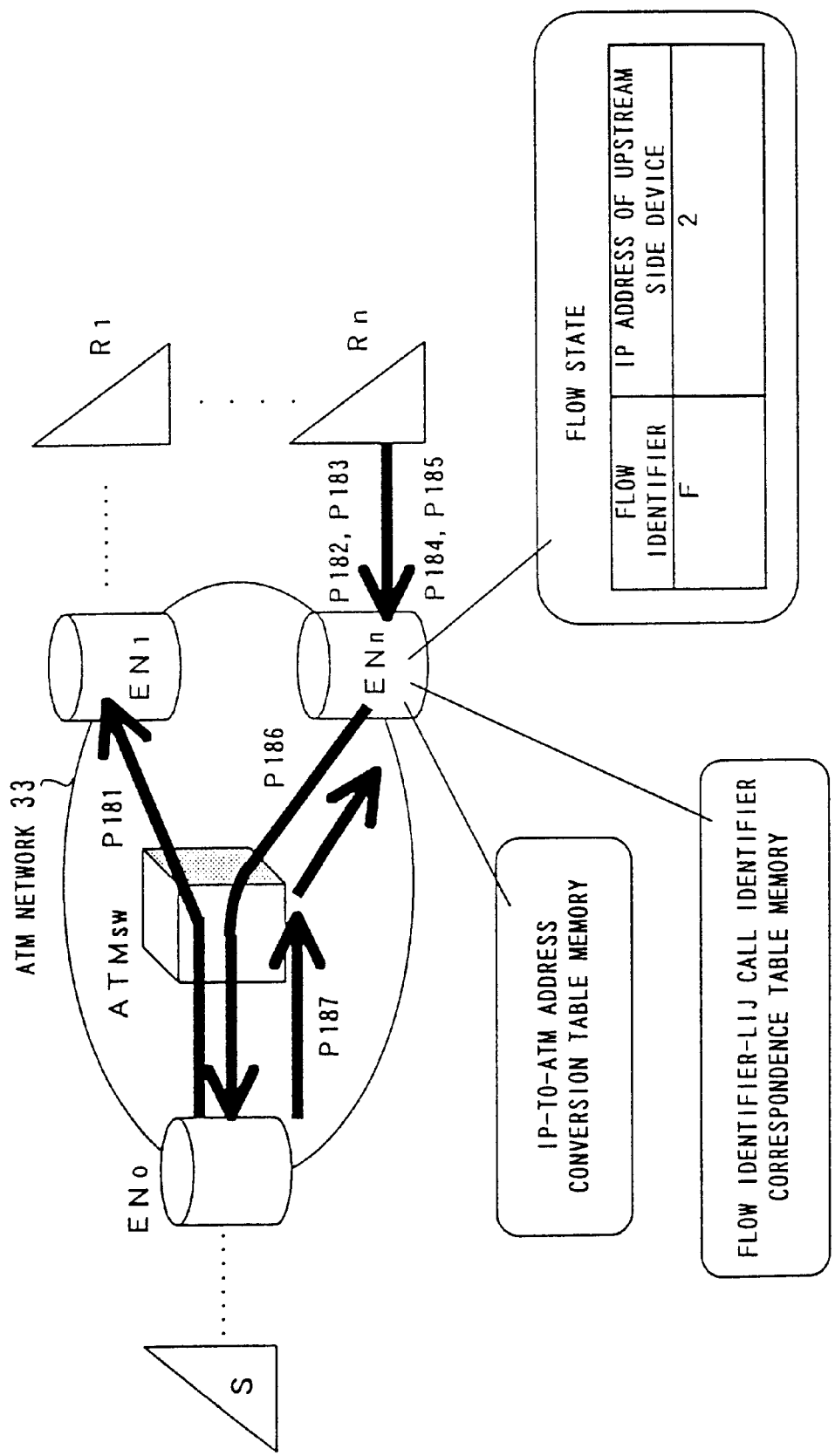
FIG. 59 shows the operations for establishing a leaf-initiated point-to-multipoint connection.

FIG. 59 shows the operations for establishing a leaf-initiated point-to-multipoint connection. Upon receipt of the resource reservation message from the receiving terminal $R_n$, the receiving side boundary device $EN_n$ must obtain the ATM address of the requested sending side boundary device $EN_0$ and the LIJ call identifier of a point-to-multipoint connection to be joined in order to make a join request to the point-to-multipoint connection.

To learn the ATM address of the sending side boundary device $EN_0$, the receiving side boundary device comprises an IP-to-ATM address conversion table memory which makes a correspondence between the IP address and the ATM address of the sending side boundary device $EN_0$ in the same way as in the point-to-point connection shown in FIG.

47. The procedure for obtaining an ATM address from an IP address is similar to that of a point-to-point connection. The receiving side boundary device transfers a join request message LEAF SETUP REQUEST to the obtained ATM address.

Additionally, to learn the LIJ call identifier, the receiving side boundary device $EN_0$ utilizes the multicast IP address written to the received resource reservation message. This multicast IP address is equivalent to the destination IP address, and can be used as a flow identifier. This multicast IP address corresponds to a program in an IP layer.

The receiving side boundary device $EN_n$ comprises the flow identifier-LIJ call identifier correspondence table memory corresponding to a program schedule which makes a correspondence between a flow identifier (multicast IP address) and an LIJ call identifier, so that the device can learn the LIJ call identifier corresponding to the multicast IP address of a resource reservation message. The receiving side boundary device $EN_n$ writes the obtained LIJ call identifier to the join request message LEAF SETUP REQUEST and tranfers the message to the receiving side boundary device $EN_0$.

FIG. 60 exemplifies the flow identifier-LIJ call identifier correspondence table memory comprised by the receiving side boundary device $EN_n$. Here, the correspondence between a multicast IP address "M" and an LIJ call identifier "I3" is registered. The information of the flow identifier-LIJ call identifier correspondence table memory are distributed, for example, by a network administrator to respective boundary devices within the network. In FIG. 59, the join request to a point-to-multipoint connection is made with the following procedure.

P181: A point-to-multipoint connection is established between the sending side boundary device $EN_0$ and the receiving side boundary device $EN_1$. At this time point, the correspondence between the flow identifier "F" and the LIJ call identifier "I3" is registered to the flow identifier-LIJ call identifier correspondence table memory shown in FIG. 60.

P182: The receiving side boundary device $EN_n$ receives a resource reservation message from the receiving terminal $R_n$.

P183: The receiving side boundary device $EN_n$ references the flow state corresponding to the flow identifier "F" of the resource reservation message, and obtains the IP address "2" of the device on the upstream side, which corresponds to the flow "F". If a multicast address is used as the flow identifier, "F" becomes 4.

P184: The receiving side boundary device $EN_n$ obtains the ATM address "A" corresponding to the obtained address "2" from the IP-to-ATM address conversion table memory shown in FIG. 48.

P185: The receiving side boundary device $EN_n$ obtains the LIJ call identifier "I3" corresponding to the flow identifier "F" within the resource reservation message from the flow identifier-LIJ call identifier correspondence table memory shown in FIG. 60.

P186: The receiving side boundary device $EN_n$ generates a join request message LEAF SETUP REQUEST by using the obtained ATM address "A" and LIJ call identifier "I3", and transfers the generated message to the sending side boundary device $EN_0$.

P187: The sending side boundary device $EN_0$ adds as a leaf the receiving side boundary device $EN_n$ to the point-to-multipoint connection between the sending side boundary device $EN_0$ and the receiving side boundary device $EN_1$ by sending a message ADD PARTY.

Figure 61:
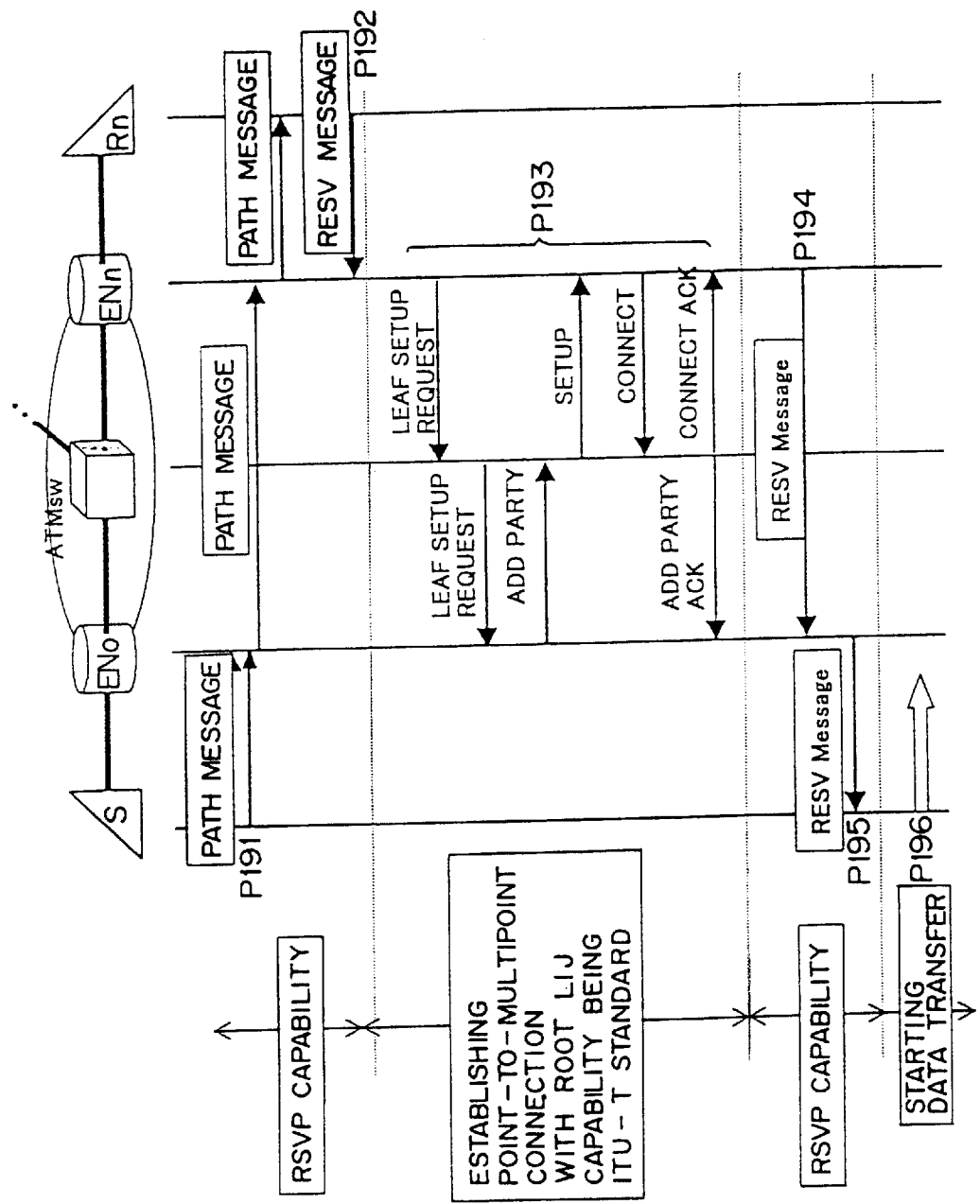
FIG. 61 shows the sequence for establishing a leaf-initiated connection.

FIG. 61 shows the sequence for establishing a point-to-multipoint connection in such a system. In this example, a point-to-multipoint connection is established with the following procedure.

P191: A path message PATH from the sending terminal S is transferred to the receiving terminal $R_n$ by using a control message connection.

P192: The receiving terminal $R_n$ sends a resource reservation message RESV to the receiving side boundary device $EN_n$.

P193: The receiving side boundary device $EN_n$ joins an existing point-to-multipoint connection according to the signaling procedure of the Root LIJ.

P194: The receiving side boundary device $EN_n$ transfers the resource reservation message to the sending side boundary device $EN_0$ by using the control message connection.

P195: The sending side boundary device $EN_0$ transfers the resource reservation message RESV to the sending terminal S.

P196: The sending terminal S starts a data transfer by using the flow identifier of the received resource reservation message RESV.

As described above, use of the leaf-initiated connection establishment method allows an ATM connection to be established from a receiving side boundary device. This method allows an ATM connection to be provided in response to an RSVP resource request from a receiving side faster than with the root-initiated connection establishment method.

The above described preferred embodiments refer to the boundary device located at the boundary between an IP and an ATM network. However, the boundary device according to the present invention can be used at the boundary between arbitrary two types of communications networks. For example, the boundary device can be used also at the boundary between a connectionless communications network which routes and transfers data packets for each hop, and a connection-oriented communications network.

Additionally, in the above described fixed class and variable class systems, a requested bandwidth is a target to be classified as a class. However, also an arbitrarily requested resource such as a transmission line, a memory resource, etc. may be classified as a class in a similar manner.

According to the present invention, a communication quality control protocol such as an RSVP in an IP communication can be linked to a connection control in an ATM communication. Consequently, an ATM connection can be provided based on the communication quality requested from an IP layer, so that the quality control can be implemented in an ATM layer.

What is claimed is:

1. A boundary device for controlling communications in a network including first and second networks that route and transfer packets in units of hops, and a third network that is arranged between the first and second networks and transfers cells based on an established connection, at a boundary between the first and third networks, comprising:

a message processing unit to process a message of a communication quality control protocol in the first and second networks, and to perform a communication quality control; and a connection controlling unit to establish a control connection for transferring the message between the first and second networks, within the third network.

2. A boundary device for controlling communications at a boundary between a first network that routes and transfers packets in units of hops, and a second network that transfers cells based on an established connection, comprising:

a message processing unit to process a message of a communication quality control protocol in the first network, and to perform a communication quality control; and a connection controlling unit to establish a control connection for transferring the message within the second network, wherein said message processing unit processes as the message a resource reservation message which is sent from at least one of a plurality of receiving terminals when a one-to-multiple communication is made between a sending terminal of data the plurality of receiving terminals.

3. The boundary device according to claim 1, wherein said connection controlling unit establishes a point-to-point connection as the control connection.

4. A boundary device for controlling communications at a boundary between a first network that routes and transfers packets in units of hops, and a second network that transfers cells based on an established connection, comprising:

a message processing unit to process a message of a communication quality control protocol in the first network, and to perform a communication quality control; and a connection controlling unit to establish a control connection for transferring the message within the second network, said connection controlling unit establishes a point-to-point connection as a control connection from a sending side of data to a receiving side, and establishes a point-to-multipoint connection as a control connection from the receiving side to the sending side.

5. A boundary device for controlling communications at a boundary between a first network that routes and transfers packets in units of hops, and a second network that transfers cells based on an established connection, comprising:

a receiving unit to receive a resource reservation message of a communication quality control protocol in the first network via the second network;

a message processing unit to parse the resource reservation message; and a connection controlling unit to establish a first connection within the second network based on information of the resource reservation message.

6. The boundary device according to claim 5, wherein said connection controlling unit establishes the first connection upon receipt of the information of the resource reservation message, without waiting for an arrival of another resource reservation message.

7. The boundary device according to claim 5, further comprising an entry controlling unit to accept another resource reservation message for a predetermined amount of time from timing of receiving a first resource reservation message, wherein said connection controlling unit establishes the first connection based on information of one or more resource reservation messages accepted for the predetermined amount of time.

8. The boundary device according to claim 7, wherein said entry controlling unit allocates a point-to-point connection to each of one or more receiving side devices that send the one or more resource reservation messages.

9. The boundary device according to claim 7, wherein said entry controlling unit allocates a single point-to-multipoint connection as the first connection to one or more receiving side devices that send the one or more resource reservation messages.

10. The boundary device according to claim 9, wherein said connection controlling unit establishes the point-to-multipoint connection in a maximum bandwidth among bandwidths requested by the one or more resource reservation messages.

11. The boundary device according to claim 9, wherein said connection controlling unit establishes the point-to-multipoint connection in a bandwidth determined based on a path message from a sending terminal of data.

12. The boundary device according to claim 9, wherein when a maximum bandwidth among bandwidths requested by the one or more resource reservation messages is larger than a bandwidth of an existing point-to-multipoint connection, said connection controlling unit reestablishes the existing point-to-multipoint connection in the maximum bandwidth.

13. The boundary device according to claim 9, wherein when a maximum bandwidth among bandwidths requested by the one or more resource reservation messages is equal to or smaller than a bandwidth of an existing point-to-multipoint connection, said connection controlling unit adds the one or more receiving side devices to the existing point-to-multipoint connection.

14. The boundary device according to claim 7, wherein said entry controlling unit allocates a plurality of point-to-multipoint connections as the first connection to one or more receiving side devices that send the one or more resource reservation messages.

15. The boundary device according to claim 14, wherein said entry controlling unit fixedly classifies resource levels into a predetermined number of classes, groups the one or more resource reservation messages into suitable classes according to requested resource levels, and allocates a point-to-multipoint connection to each of the classes.

16. The boundary device according to claim 14, wherein said connection controlling unit adds, for a class including an existing point-to-multipoint connection, a receiving side device of a corresponding resource reservation message to the existing point-to-multipoint connection.

17. The boundary device according to claim 14, wherein said entry controlling unit variably groups the one or more resource reservation messages into suitable classes according to requested resource levels every time each of the one or more resource reservation messages is accepted, and allocates a point-to-multipoint connection to each of the classes.

18. The boundary device according to claim 14, wherein said entry controlling unit selects one of operations for establishing a new point-to-multipoint connection and an operation for changing an existing point-to-multipoint connection according to the number of used connection identifiers.

19. The boundary device according to claim 14, wherein said entry controlling unit selects one of operations for establishing a new point-to-multipoint connection and an operation for changing an existing point-to-multipoint connection according to resource utilization.

20. The boundary device according to claim 7, wherein said entry controlling unit allocates one or more point-to-multipoint connections and one or more point-to-point connections to one or more receiving side devices that send the one or more resource reservation messages, as the first connection.

21. The boundary device according to claim 20, wherein said entry controlling unit fixedly classifies resource levels into a predetermined number of classes, groups the one or more resource reservation messages into suitable classes according to requested resource levels, allocates a point-to-point connection to a class including only one resource reservation message, and allocates a point-to-multipoint connection to a class including a plurality of resource reservation messages.

22. The boundary device according to claim 20, wherein said entry controlling unit variably groups the one or more resource reservation messages into suitable classes according to requested resource levels every time each of the one or more resource reservation messages is accepted, allocates a point-to-point connection to a class including only one resource reservation message, and allocates a point-to-multipoint connection to a class including a plurality of resource reservation messages.

23. The boundary device according to claim 20, wherein said entry controlling unit selects one of operations for establishing a new point-to-point connection and an operation for changing an existing point-to-point connection to a point-to-multipoint connection according to the number of used connection identifiers.

24. The boundary device according to claim 20, wherein said entry controlling unit selects one of an operation for establishing a new point-to-point connection and an operation for changing an existing point-to-point connection to a point-to-multipoint connection according to bandwidth resource utilization.

25. The boundary device according to claim 20, wherein said entry controlling unit selects one of operations for establishing a new point-to-point connection and an operation for changing an existing point-to-point connection to a point-to-multipoint connection according to at least one of the number of used connection identifiers and bandwidth resource utilization.

26. The boundary device according to claim 20, wherein said entry controlling unit selects one of an operation for establishing a new point-to-point connection and an operation for changing an existing point-to-point connection to a point-to-multipoint connection according to resource utilization.

27. A boundary device for controlling communications at a boundary between a first network that routes and transfers packets in units of hops, and a second network that transfers cells based on an established connection, comprising:
    a receiving unit to receive a resource reservation message of a communication quality control protocol in the first network from a terminal within the first network;
    a message processing unit to parse the resource reservation message; and
    a connection cotrolling unit to establish a first connection in the second network based on information of the resource reservation message.

28. The boundary device according to claim 27, further comprising
    an address table unit to store a correspondence between a first address of a sending side device in the first network and a second address of the sending side device in the second network, wherein:
    said message processing unit obtains the first address from the information of the resource reservation message;
    said address table unit outputs the second address corresponding to the first address; and
    said connection controlling unit establishes the first connection to the second address.

29. The boundary device according to claim 28, further comprising a sending unit to send the resource reservation message to the first connection so that the sending side device can identify the first connection based on a flow identifier of the resource reservation message and a connection identifier of the first connection.

30. The boundary device according to claim 28, further comprising:
    a message generating unit to generate a control message including a flow identifier of the resource reservation message and connection information of the first connection; and
    a sending unit to send the control message to the sending side device so that the sending device can identify the first connection based on information of the control message.

31. The boundary device according to claim 27, wherein when a point-to-multipoint connection is already established as the first connection, said connection controlling unit performs a control for sending a message requesting to join the point-to-multipoint connection.

32. The boundary device according to claim 31, further comprising
    an address table unit to store a correspondence between a first address of a sending side device in the first network and a second address of the sending side device in the second network, wherein:
    said message processing unit obtains the first address from the information of the resource reservation message;
    said address table unit outputs the second address corresponding to the first address; and
    said connection controlling unit performs a control for sending the message requesting to join to the second address.

33. The boundary device according to claim 31, further comprising
    a leaf initiated join call identifier table unit to store a correspondence between a flow identifier and a leaf initiated join call identifier of the point-to-multipoint connection, and to output a leaf initiated join call identifier corresponding to the flow identifier of the resource reservation message, wherein
    said connection controlling unit writes an output leaf initiated join call identifier to the message requesting to join.

34. A boundary device for controlling communications at a boundary between a first network that routes and transfers packets in units of hops, and a second network that transfers cells based on an established connection, comprising:
    a receiving unit to receive a resource reservation message of a communication quality control protocol in the first network via a connection established within the second network; and
    a connection identifier table unit to store a correspondence between a flow identifier of the resource reservation message and a connection identifier of the connection, and to output a connection identifier corresponding to a given flow identifier.

35. The boundary device according to claim 34, further comprising
    a unit to identify a second connection corresponding to transmission data which includes a flow identifier by using said connection identifier table unit upon receipt of the transmission data.

36. A boundary device for controlling communications at a boundary between a first network that routes and transfers packets in units of hops, and a second network that transfers cells based on an established connection, comprising:

a receiving unit to receive via the second network a control message including a flow identifier of a resource reservation message of a communication quality control protocol in the first network and connection information of a first connection established within the second network; and a connection information table unit to store a correspondence between the flow identifier and the connection information, and to output connection information corresponding to a given flow identifier.

37. The boundary device according to claim 36, further comprising a unit to identify a second connection corresponding to transmission data which includes a flow identifier by using said connection information table unit upon receipt of the transmission data.

38. A communication controlling method for use in a network including first and second networks that route and transfer packets in units of hops, and a third network that is arranged between the first and second networks and transfers cells based on an established connection, comprising the steps of:

establishing within the third network a control connection for transferring a control message of a communication quality control protocol in the first and second networks, transferring the control message between the first and second networks by using the control connection; and establishing a connection within the third network based on information of the control message.

39. A communication controlling method for use in a network including first and second networks that route and transfer packets in units of hops, and a third network that is arranged between the first and second networks and transfers cells based on an established connection, comprising the steps of:

transferring a resource reservation message of a communication quality control protocol in the first and second networks from the second network to the first network via the third network;

parsing the resource reservation message at a boundary between the first and third networks; and establishing a connection within the third network based on information of the resource reservation message.

40. A communication controlling method for use in a network including first and second networks that route and transfer packets in units of hops, and a third network that is arranged between the first and second networks and transfers cells based on an established connection, comprising the steps of:

transferring a resource reservation message of a communication quality control protocol in the first and second networks from the second network to the first network via the third network;

parsing the resource reservations message at a boundary between the second and third networks, and establishing a connection within the third network based on information of the resource reservation message.

* * * * *